US011711785B2

(12) United States Patent
Rao et al.

(10) Patent No.: US 11,711,785 B2
(45) Date of Patent: Jul. 25, 2023

(54) SYSTEM AND METHOD FOR SIDELINK RESOURCE ALLOCATION IN USER EQUIPMENT GROUPS

(71) Applicant: HUAWEI TECHNOLOGIES CO., LTD., Shenzhen (CN)

(72) Inventors: Jaya Rao, Ottawa (CA); Sophie Vrzic, Kanata (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 16/988,409

(22) Filed: Aug. 7, 2020

(65) Prior Publication Data

US 2021/0045093 A1 Feb. 11, 2021

Related U.S. Application Data

(60) Provisional application No. 62/885,104, filed on Aug. 9, 2019.

(51) Int. Cl.
*H04W 72/04* (2023.01)
*H04W 72/23* (2023.01)

(52) U.S. Cl.
CPC ........... *H04W 72/04* (2013.01); *H04W 72/23* (2023.01)

(58) Field of Classification Search
CPC . H04W 72/04; H04W 72/14; H04W 72/1289; H04W 24/08; H04W 72/02;
(Continued)

(56) References Cited

U.S. PATENT DOCUMENTS

2016/0338095 A1* 11/2016 Faurie ............... H04W 28/0278
2018/0199312 A1* 7/2018 Wu .................... H04W 72/0413
(Continued)

FOREIGN PATENT DOCUMENTS

CN 107211430 A 9/2017
CN 107592984 A 1/2018
(Continued)

OTHER PUBLICATIONS

U.S. Appl. No. 62/876,411 (Year: 2019).*
(Continued)

*Primary Examiner* — Rushil Parimal Sampat

(57) ABSTRACT

Embodiments of the disclosure provide methods and systems for sidelink resource allocation in user equipment (UE) groups. The method includes, receiving, by a UE, from a radio access network (RAN) node, a first resource configuration message including configuration information for sidelink resources indicated by a sidelink resource grant and conditions for using sidelink resources of the sidelink resource grant. The method further includes receiving, from a second UE of the UE group, a second sidelink resource configuration message, the second sidelink resource configuration message including an activation indicator to activate at least a portion of the sidelink resources indicated by the sidelink resource grant. The method further includes determining the sidelink resources to be used for sidelink transmissions by combining the first and second sidelink resource configuration messages. The method further includes using the determined sidelink resources for data transmissions.

18 Claims, 32 Drawing Sheets

(58) Field of Classification Search
CPC ... H04W 72/042; H04W 76/11; H04W 76/14; H04W 92/18; H04W 72/0493; H04W 88/04
See application file for complete search history.

(56) References Cited

U.S. PATENT DOCUMENTS

| | | | | |
|---|---|---|---|---|
| 2018/0324882 | A1* | 11/2018 | Gulati | H04W 72/14 |
| 2020/0389900 | A1* | 12/2020 | Lee | H04W 72/0493 |
| 2021/0022173 | A1* | 1/2021 | Nam | H04W 72/02 |

FOREIGN PATENT DOCUMENTS

| | | |
|---|---|---|
| WO | 2018143786 A1 | 8/2018 |
| WO | 2019149182 A1 | 8/2019 |

OTHER PUBLICATIONS

WO 2018/208114 A1 (Year: 2018).*
Huawei, HiSilicon, Discussion on sidelink resource allocation mode 1. 3GPP TSG RAN WG1 Meeting #97, Reno, USA, May 13-17, 2019, R1-1906010, 9 pages.
MediaTek Inc., NR sidelink mode-1 resource allocation. 3GPP TSG RAN1 WG1 Meeting #97, Reno, USA, May 13-17, 2019, R1-1906554, 7 pages.
Ericsson, Feature lead summary #5 on Resource allocation for NR sidelink Mode 1. 3GPP TSG-RAN WG1 Meeting #97, Reno, USA, May 13-17, 2019, R1-1907947, 24 pages.
Fraunhofer Hhiet al: "Designs for NR V2XMode 2 Resource Allocation"; 3GPP Draft;R1-1900356, vol. RAN WG1,No. Taipei, Taiwan; Jan. 20, 2019, 10 pages.
Huawei et al: "Discussion on sidelink resource allocation mode 1",3GPP Draft; R1-1903950, 3rd Generation Partnershipproject (3GPP), Mobile Competence Centre ; 650, Route Deslucioles ; F-06921 Sophia-Antipolis Cedex ; FRANCE vol. RAN WG1, No. Xi"an, China; Apr. 8, 2019-Apr. 12, 2019 Apr. 2, 2019(Apr. 2, 2019), XP051707065,Retrieved from the Internet:URL:http://www.3gpp.org/ftp/tsg%5Fran/WG1%5FRL1/TSGR1%5F96b/Docs/R1.

* cited by examiner

SYSTEM AND METHOD FOR SIDELINK RESOURCE ALLOCATION IN USER EQUIPMENT GROUPS

CROSS-REFERENCE TO RELATED APPLICATIONS

This application claims the benefit of priority to U.S. patent application Ser. No. 62/885,104 entitled "SYSTEM AND METHOD FOR SIDELINK RESOURCE ALLOCATION IN USER EQUIPMENT GROUPS" filed Aug. 9, 2019, which is hereby incorporated by reference in its entirety.

FIELD OF THE INVENTION

The present invention generally pertains to the field of communications networks, and particular embodiments or aspects relate to system and methods for sidelink (SL) resource allocation in user equipment (UE) groups in a communication network.

BACKGROUND

To support 5G critical communications with very low latency, high reliability and high throughput (i.e. ultra-reliable low latency communication (URLLC) communication) between UEs in group scenarios, such as vehicle platoons and autonomous robots, higher emphasis is required on Radio Access Network (RAN) coordinated resource allocation and interference mitigation.

However, having to send all channel and load measurement information from UEs to the network (directly or indirectly), only for Radio Resource Management (RRM) and network-based scheduling purposes, may significantly increase latency and require high provisioning of uplink (UL)/downlink (DL) resources. The increased latency and high provisioning of resources can affect the performance of SL data communications of the UEs. This can be more severe in uses cases such as closed-loop control systems, where both the source and sink of data traffic is primarily within a UE group, and the network is used only for providing control plane and RRM related signaling (e.g. resource scheduling and mobility management).

Referring to a UE group, UE group communications pattern determines the transmission order, direction and timing information of the UEs in the UE group. Providing UE group communications pattern to a radio access network (RAN) allows the RAN to determine the resources to be used for SL transmission. However, since different UE groups may have different higher layer communication patterns and protocols, having to indicate each transmission attribute to the RAN when requesting resources and the RAN responding with the SL grant or SL configured grant with a particular format unnecessarily increases system design effort and overhead signaling.

As such, enabling an interruption free and interference free operation in UE groups for maximizing the use of the available radio resources (i.e. maximize the reuse of resources) over a wide area, while considering UE group mobility, are problems that are yet to be resolved.

Accordingly, there is a need for a system and method for SL resource allocation in UE groups that at least partially addresses one or more limitation of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

An aspect of the disclosure provides for a method, performed by a user equipment (UE) in a UE group. The method includes receiving, from a radio access network (RAN) node, a first resource configuration message including configuration information for sidelink resources indicated by a sidelink resource grant and conditions for using sidelink resources of the sidelink resource grant. The method further includes receiving, from a second UE of the UE group, a second sidelink resource configuration message, the second sidelink resource configuration message including an activation indicator to indicate at least a portion of the sidelink resources of the sidelink resource grant to be activated. The method further includes transmitting data using sidelink resources that are activated based on the configuration information, the conditions, and the activation indicator. In some embodiments, the conditions includes at least one of geographical area identifier (ID) range, time duration, channel condition thresholds, and loading condition thresholds. In some embodiments, the step of receiving, from a radio access network (RAN) node, a first resource configuration message including configuration information for sidelink resources indicated by a sidelink resource grant and the conditions for using the sidelink resources includes sending, to the RAN node, a request message including UE assistance information (UAI), the UAI containing a UE communications pattern, an identifier of the UE group and a request for configured resource grant. In some embodiments the step of receiving, from a radio access network (RAN) node, a first resource configuration message including configuration information for sidelink resources indicated by a sidelink resource grant and the conditions for using the sidelink resources further includes receiving, from the RAN node, a response message including the first sidelink resource configuration message. In some embodiments the step of receiving, from a radio access network (RAN) node, a first resource configuration message including configuration information for sidelink resource grant and the conditions for using the sidelink resources includes receiving the first resource configuration message through Radio Resource Control (RRC) signaling. In some embodiments the step of receiving, from a radio access network (RAN) node, a first resource configuration message including configuration information for sidelink resource grant and the conditions for using the sidelink resources includes receiving the first resource configuration message as part of a system information block (SIB) message. In some embodiments the second UE is at least one of a lead UE and an authorized UE. In some embodiments, the UE group is a RAN UE group having a group identifier assigned by the RAN. In some embodiments the configuration information for sidelink resource grant includes at least one of a SL resource allocation mode, wherein the mode is one of Mode 1 and Mode 2, a type of sidelink connection, a SL radio bearer, a logical channel, and a SL radio bearer identifier. In some embodiments, the activation indicator includes an indication specifying the portion of the sidelink resources indicated by the sidelink resource grant. In some embodiments the second sidelink resource configuration message including a deactivation indicator. In some embodiments, the configuration information for sidelink resources indicated by a sidelink resource grant and conditions for using sidelink resources of the sidelink resource grant comprises a configured sidelink map associated with a validity time duration and a validity location area. In some embodiments, the configured sidelink map is a dedicated sidelink map includes a set of non-overlapping and non-interfering resources for use by the UE. In some embodiments, the configured sidelink map is a common sidelink map indicative of resources for use by the UE and other UEs. In some embodiments, the method further includes performing sensing and reservation to resolve potential contention.

Another aspect of the disclosure provides a network node including at least one network interface, at least one processor, and a non-transient computer readable memory for storing instructions which when executed by the at least one processor configure the network node to execute the methods described here. For example, such a network node is configured to receive, from a radio access network (RAN) node, a first resource configuration message including configuration information for sidelink resources indicated by a sidelink resource grant and conditions for using sidelink resources of the sidelink resource grant. The network node is further configured to receive, from a second UE of the UE group, a second sidelink resource configuration message, the second sidelink resource configuration message including an activation indicator to indicate at least a portion of the sidelink resources of the sidelink resource grant to be activated. The network node is further configured to transmit data using activated sidelink resources based on the first and second sidelink resource configuration messages.

Another aspect of the disclosure provides for a method for sidelink radio resource allocation in a user equipment (UE) group, by a UE. The method includes receiving, from a radio access network (RAN) node, a resource configuration message including configuration information for sidelink resources indicated by a sidelink resource grant and conditions for using sidelink resources of the sidelink resource grant. The method further includes sending to at least one UE in the UE group, an activation message including the sidelink resources to be used for sidelink transmissions of at least one UE in the UE group according to the conditions and UE group context. In some embodiments, the receiving, from a radio access network (RAN) node, a resource configuration message including information for sidelink resources indicated by a sidelink resource grant and conditions for using sidelink resources of the sidelink resource grant includes sending, to the RAN node, a message including Group Assistance Information (GAI), the GAI including a request for aggregated configured sidelink resource grant for the UE group. In some embodiments, the resource configuration message is sent using Radio Resource Control (RRC) signaling. In some embodiments, the information for sidelink resources indicated by a sidelink resource grant and conditions for using sidelink resources of the sidelink resource grant includes a sidelink map associated with a validity time duration and a validity location area. In some embodiments the sidelink map is a dedicated sidelink map includes a set of non-overlapping and non-interfering resources for use by the UE. In some embodiments, the sidelink map is a common sidelink map indicative of resources for use by the UE and other UEs. In some embodiments, the method further includes the UE performing sensing and reservation to resolve potential contention. In some embodiments, the method further includes receiving, from the RAN node, an update to the sidelink map based on new information related to at least one of an access layer of the UE and a higher layer of the UE.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description of embodiments, taken in combination with the appended drawings, in which.

It will be noted that throughout the appended drawings, like features are identified by like reference numerals.

DETAILED DESCRIPTION

Figure 1:
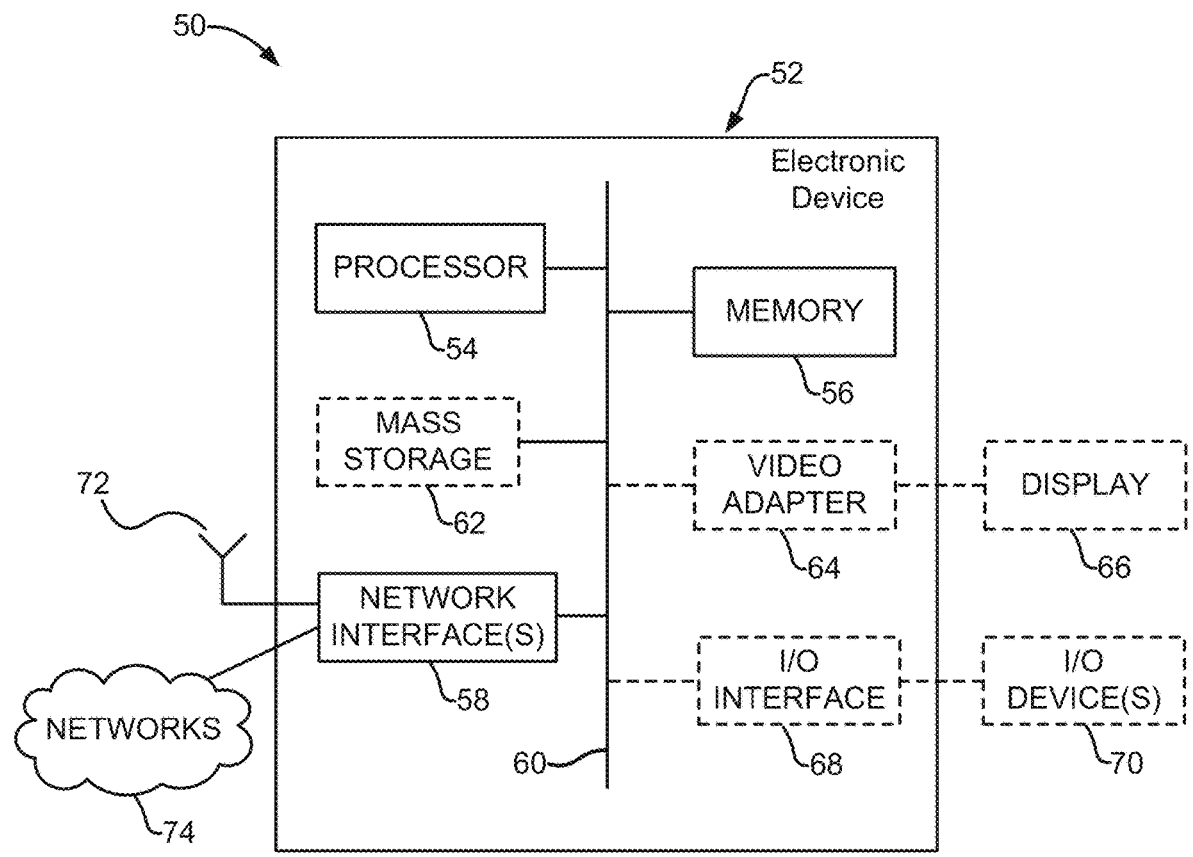
FIG. 1 is a block diagram of an electronic device (ED) illustrated within a computing and communications environment that may be used for implementing the devices and methods disclosed herein.

In 5G critical control systems, a group of UEs (referred to hereinafter as a UE group) performing a set of higher layer (e.g. application) tasks can be characterized based on shared common attributes. "Higher layer" may refer to the non-access stratum (NAS) layer or the application layer. The shared common attributes may include UE group communications pattern (e.g. closed control loop as in transmissions from a UE1 to a UE2, and from the UE2 back to the UE1), UE group topology (deterministic locations of UEs) and UE group mobility pattern (e.g. all UEs having common geographic start and end locations). Examples of 5G critical control systems include vehicle platooning control systems and autonomous robot control systems.

A UE group in 5G critical control system typically includes a Head or a Lead UE (L-UE) and one or multiple member UEs (M-UE). The inter-group communications between the L-UE and M-UEs can be on either the user plane (UP) (for data traffic) or the control plane (CP) (for signaling traffic), both of which may require satisfying different Quality of Service (QoS) requirements (e.g. throughput, priority, latency, reliability)

The source and destination of the intended data or signaling traffic within the UE group are typically located in close proximity. Accordingly, the intra-group communications between UEs of the UE group (i.e. data transmissions on the UP or signaling transmissions on the CP) can be performed directly over the sidelink (SL) between the UEs of the UE group with minimal reliance on the RAN or Core Network (CN). In this case, both the UP and the CP (i.e. radio resource control (RRC)) signaling over the SL may be performed in the form of different types of transmissions, which include unicast transmissions (1-to-1), groupcast transmissions (1-to-many with closed access) or broadcast transmissions (1-to-many with open access). Additionally, performing transmissions over the SL enables satisfying the extreme requirements which include ultra-low latency (e.g. <1 ms closed loop cycle time), ultra-high reliability (e.g. $10^{-8}$), high throughput (e.g. >5 Mbps) and high number of intra-UE group connections (>10).

At any given time, the UE group can undergo topological changes that can trigger group merging or splitting operations (i.e. by merging the UE group with other UE groups or splitting the UE group into at least two different UE groups). This can result in the UE group's resource requirements either increasing (e.g. if the UE group is merged with other UE groups), decreasing (e.g. if the UE group is split or a UE leaving the UE group) or being divided for supporting the inter-group communications in the newly formed UE groups (if the UE group is split).

Additionally, a UE group can also undergo changes in the controller structure, where the role of L-UE may change and transfer to another UE within or outside of the UE group. The change in the controller structure (i.e. location and identity of L-UE) affects the communication patterns for the UP and the CP, resource coordination and interference mitigation at the SL access stratum (AS) layer. In this regard, any changes in the controller structure at the higher layer should be translated to equivalent change in the AS layer while ensuring stability of the UE group at all times.

A mobile UE group, such as a vehicle platoon, can traverse through multiple cells of a RAN, where each cell is dimensioned with different sidelink resource pools (RPs) and the sidelink RPs may be typically subject to different loading conditions. In this case, the mobile UE group may encounter interfering mobile resource zones (e.g. another oncoming vehicle platoon using the same sidelink resource pool) or may cause interference and congestion to other UEs using the same set of SL resources of the RP as the incoming UE group. To ensure that the stringent communication patterns in the closed-loop control systems are satisfied, it is desirable for the controller in the mobile UE group, with assistance from RAN, to have certain capability to dynamically control the SL resource usage and mitigate interference/congestion when UEs of the mobile UE group are passing through different cells.

Further, it is beneficial to use a use a lightweight and flexible RRM at the access stratum (AS) layer within the UE group. The RRM may be used to determine the resource configuration with the awareness of group physical topology (i.e. locations of the UEs) and to translate the higher layer communication patterns to AS-layer resource management for supporting different connection/cast types with extreme requirements.

In vehicle-to-everything (V2X) scenarios, inter-group communications can take place between the vehicle UEs (V-UEs) and infrastructure (e.g. road side unit (RSU)). Specifically, in vehicle platooning, the L-UE, which functions as a controller, can perform groupcast transmissions to M-UEs following behind. The stability of the vehicle platoon, defined in terms of aligned inter-vehicle distance and vehicle platoon velocity, is ensured through the exchange of information among vehicle UEs on their current position, kinematics status and maneuvering intentions. The information sent by the L-UE (which functions as a controller and is responsible for regulating the acceleration/deceleration of the entire vehicle platoon) and feedback sent by each M-UE allows the UE group to collectively support complex maneuvers within the vehicle platoon. In the extended sensor use cases, the RSU can also send road traffic information in a broadcast transmission to a group of UEs within a small coverage area. The M-UEs can perform unicast transmissions and broadcast transmissions to surrounding UEs both within and outside of the UE group controlled by the RSU.

In the cyber-physical systems and industrial internet of things (IoT) environments such as manufacturing and mining, a controller UE in a UE group can perform groupcast transmission to multiple actuator robot UEs, and in-turn, receive unicast transmissions from each sensor UE in the UE group. The sensor UEs and actuator UEs can operate in control loops with varying degrees of latency and reliability performance. The typical group communications pattern in the cyber-physical systems and industrial IoT environments can be described as follows: the controller sends instructions to all actuators in a groupcast; the actuators perform the instructed actions and send ACKs/NACKs to the controller in unicast transmissions; the sensors send measurements and observations to the controller in unicast transmissions; the controller sends ACKs/NACKs to sensors in unicast transmissions; the controller retransmits to actuators that did not receive the first message, including instructions, in unicast; the sensors that did not get ACK from controller retransmit the measurements and observations in unicast transmissions.

Before discussing more details of embodiments of the disclosure, an electronic device which can be configured for implementing the devices and methods disclosed herein will be discussed.

FIG. 1 is a block diagram of an electronic device (ED) 52 illustrated within a computing and communications environment 50 that may be used for implementing the devices and methods disclosed herein. In some embodiments, the ED 52 may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or a User Plane Function (UPF) or various other nodes or functions within a core network (CN) or a Public Land Mobility Network (PLMN). In other embodiments, the ED 52 may be a device that connects to the network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some embodiments, ED 52 may be a road side unit (RSU), a vehicle UE (V-UE) or an infrastructure UE (I-UE). In some references, an ED 52 may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU), and may further include specialized processors such as a Graphics Processing Unit (GPU), neural processing unit (NPU), a tensor processing unit (TPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of a wired network interface and a wireless network interface. As illustrated in FIG. 1, network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the ED 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

Figure 2A:
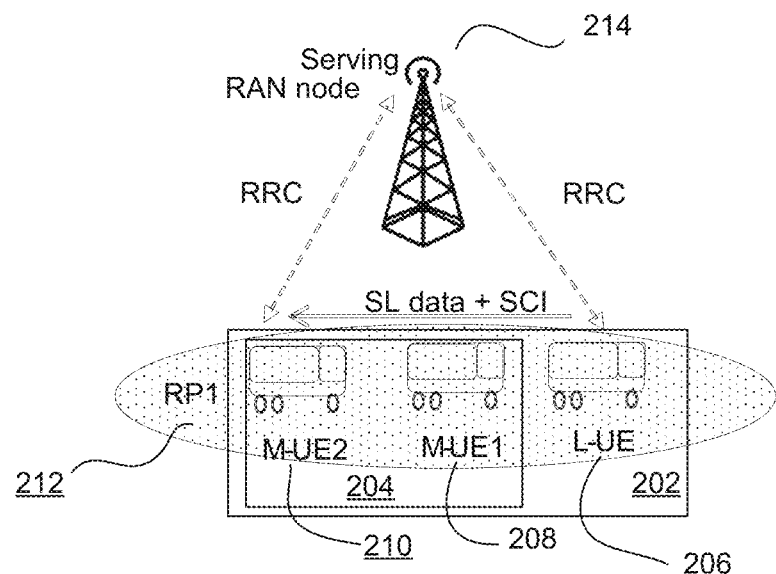
FIG. 2A is an illustration of Vehicle Platooning in V2X with a dedicated resource pool for sidelink transmissions, according to an embodiment of the present disclosure.

FIG. 2A is an illustration of Vehicle Platooning in V2X with a dedicated resource pool (RP) of allocated resources for sidelink transmissions, according to an embodiment of the present disclosure. Referring to FIG. 2A, the UE group 202 comprises an L-UE 206 and multiple M-UEs 204 including M-UE1 208 and M-UE2 210. Although FIG. 2A illustrates only two M-UEs, the UE group 202 may include any number of M-UEs. The UE group 202 communicates with a serving RAN node (e.g., gNB) 214 using control plane (CP) RRC signaling and user plane (UP) data messages. The L-UE 206 may provide (by sending) SL data and Sidelink Control Information (SCI) to the M-UEs 208, 210. In this embodiment, the UE group 202 (e.g., the L-UE 206 and the M-UEs 208, 210) are allocated a dedicated resource pool for SL transmissions, RP1 212.

Figure 2B:
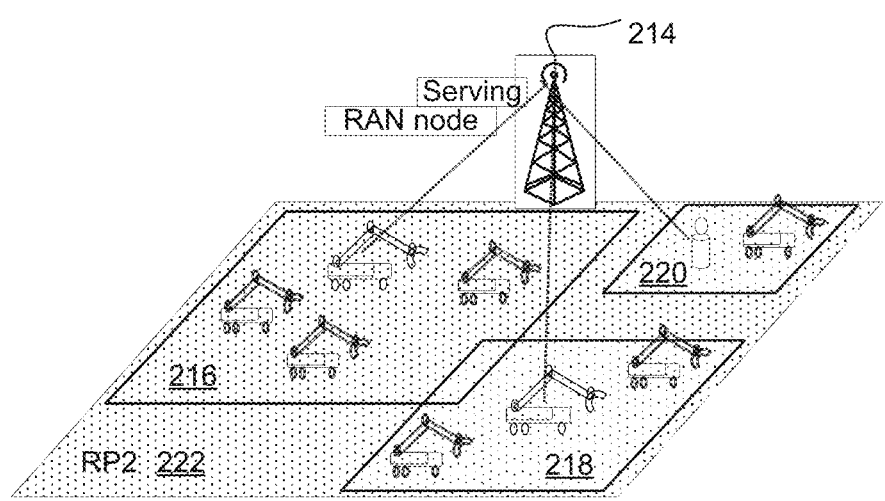
FIG. 2B is an illustration of multiple UE groups of autonomous robots of an autonomous robot control system, the multiple UE groups having been allocated a shared resource pool for sidelink transmissions, according to an embodiment of the present disclosure.

FIG. 2B is an illustration of multiple UE groups of autonomous robots of an autonomous robot control system that are allocated resources of the same RP for SL transmissions, according to an embodiment of the present disclosure. Referring to FIG. 2B, three UE groups (autonomous robots) 216, 218 and 220, are allocated with the same RP2 222 in non-overlapping geo-areas. Each UE group 216, 218, and 220 communicates with the serving RAN node (e.g. gNB) 214.

Sidelink resource management in existing Long Term Evolution (LTE) Device to Device (D2D) and new radio (NR) V2X scenarios are supported via Mode 1 and Mode 2 techniques for allocating resource to be used for SL transmission.

In Mode 1, the RAN is responsible for allocating resources to the UE (in RRC Connected state) in order to enable the UE to perform SL transmissions, based on the scheduling request (SR)/buffer status report (BSR) and channel reports provided by the UE. For successfully receiving and decoding the flow of packets sent by a transmitting (Tx) UE with specific QoS, the receiving (Rx) UE applies the RAN provided AS-layer configuration (i.e. SL radio bearers (SL-RBs), QoS profile). In other words, the RAN provides a configuration for the AS-layer of the Rx UE and the Rx UE configures its AS-layer based on the received configuration.

Alternatively in Mode 2, the UE (in RRC Idle state) autonomously selects the SL resources out of a RP indicated by RAN in a system information block (SIB) based on channel sensing and reservation. The Tx UE can use either pre-configured SL-RB settings or obtain the configuration after transitioning to RRC Connected state (temporarily) during initial access and registration with the network. For determining the resources, the UE may refer to its current location (zone identifier (ID)) and identify the RPs associated with the location. In NR V2X, the RAN is also responsible for mitigating interference in the SL by ensuring that the same resources are not allocated to a set/group of UEs in overlapping areas.

In both SL resource allocation modes, embodiments provide for a RAN authorized proxy/agent UE, which determines the resource allocation for a UE group and controls interference based on RAN provided regulations or rules and conditions. Such a UE is referred to as an authorized UE. As will be described further below, the RAN provided regulations or rules and conditions may include channel and loading thresholds for activating/deactivating the resource grants (e.g. SL-RSSI, CBR), geographical usage area restriction (indicated by geo-area ID range) and time duration restriction (indicated by validity time range). Thus, the RAN provided regulations or rules and conditions prevent the usage of the SL resources that may cause interference and congestion with other nearby UEs.

In mobility scenarios, a Mode 1 UE, which is handed over from a source cell (Scell) to a target cell (Tcell) of the RAN, can be indicated with either SL resources from an exceptional pool or with new Tx resources allocated by the Tcell in the handover (HO) command. A Mode 2 UE can access the exceptional pool indicated in the SIB or use the RP preconfigured in the UE when undergoing HO to the Tcell.

In both modes (i.e. in Model 1 and Mode 2), an individual UE can continue performing SL transmissions during HO. However, in the UE group mobility scenario, determining the SL resources without the awareness of the UE group topology (i.e. locations and traffic requirements of UE), as is done in existing NR V2X, may destabilize SL transmissions both within and outside the UE group. This is because the resources used by the L-UE (located at Scell edge) for SL transmissions to M-UEs (located deep within the Scell) may also be used by other UEs in Scell that can interfere with the SL transmissions among the L-UE and M-UEs. Likewise, the bidirectional SL transmissions performed by M-UEs, using the same resources assigned during HO, may cause interference to other UEs in Scell.

In these scenarios, it is necessary to have coordination capability both at the RAN and the L-UE, by managing the SL resource usage with the awareness of the UE group. It should be noted that reporting all channel and loading measurements to the RAN from individual UEs for resource coordination, as currently performed in NR V2X, may not be necessary. The SL resource usage and signaling over the Uu interface can be significantly reduced if the L-UE has the capability to control the resource allocation and SL resource usage within the UE group in the local area.

This disclosure provides embodiment solutions for addressing the problems related to local area SL resource allocation and interference/congestion mitigation in UE groups To address the challenges related to sidelink resource management in critical control systems with stringent QoS requirements, the present disclosure considers location aware resource allocation and congestion control based on RAN provided regulations, rules and conditions. The local area resource allocation (LARA) can be performed at certain authorized UEs, such as an RSU and a Lead UE, which are located in close proximity relative to the UE group comprising of other M-UEs (e.g. vehicle UEs and sensor/actuator UEs). In this regard, the L-UE functions as an agent for performing the CP configuration and RRM regulations provided by RAN while being aware of the UE group's higher layer attributes, such as group communications pattern, group topology and group mobility pattern/path. On the Uu interface with RAN, the L-UE can maintain the RRC connection and operate in Mode 1 for providing the SL channel and loading reports and requesting SL resources for the UE group. On the sidelink PC5 interface facing the M-UEs in the UE group, the L-UE operates in Mode 2 for determining the resource allocation autonomously for each connection between the L-UE and the M-UEs within the UE group.

Since the UE group topology and formation structure, which is managed at the higher layers, may change over time due to merging and splitting, the UE group context at the AS-layer can be modified or transferred to other UE groups with RAN assistance while ensuring that the CP and UP connectivity remain unaffected.

For supporting UE group mobility, the disclosure provides enhancements to the RAN handover procedure considering SL resource management and SL interference mitigation, both within and outside of the UE group.

Some aspects of the disclosure provide the following. An aspect of the disclosure provides for methods of performing location and communications pattern aware SL resource allocation for UE groups operating in Mode 1 and Mode 2. Another aspect of the disclosure provides for methods for supporting interference mitigation with RP usage coordination at L-UE. Another aspect of the disclosure provides for methods for supporting intra-UE group and inter-UE group operations at the AS-layer in response to higher layer UE group operations. Another aspect of the disclosure provides for methods for performing UE group handover with seamless SL resource (re)configuration.

Embodiments discussed herein provide for the minimization of RRM related latency (e.g. sensing and SR/BSR reporting), since certain RRM functions can be supported within UE group. Embodiments discussed herein further provide for support for scalable AS-layer UE group context management via PC5-RRC when supporting UE group operations and UE group mobility. Embodiments discussed herein further provide for integration and extension of data analytics functionality in RAN (and higher layers) to local area in UE group for handling SL RRM and SL interference mitigation.

For 5G critical control systems such as vehicle platooning (for example, as discussed above with reference to FIG. 2A) and autonomous robots control systems (for example, as discussed above with reference to FIG. 2B), a set of sidelink transmissions with stringent QoS are required to be supported in a UE group comprising a local area resource allocator UE (LARA-UE) and a number of member UEs (M-UE). The LARA-UE, which may also be a lead UE (L-UE) in a UE group, as designated by higher layer functions, may have the capability to determine and assign the SL resources to other M-UEs and mitigate interference based on resource allocation regulations indicated by RAN. Note that since the AS-layer is controlled by RAN, the selected L-UE for RRM purposes in the UE group may not be the same L-UE selected by the higher layers. Given the visibility of the L-UE to RAN (during L-UE selection procedure), however, it is also possible for the RAN to select the same L-UE as that selected by the higher layers.

Figure 3:
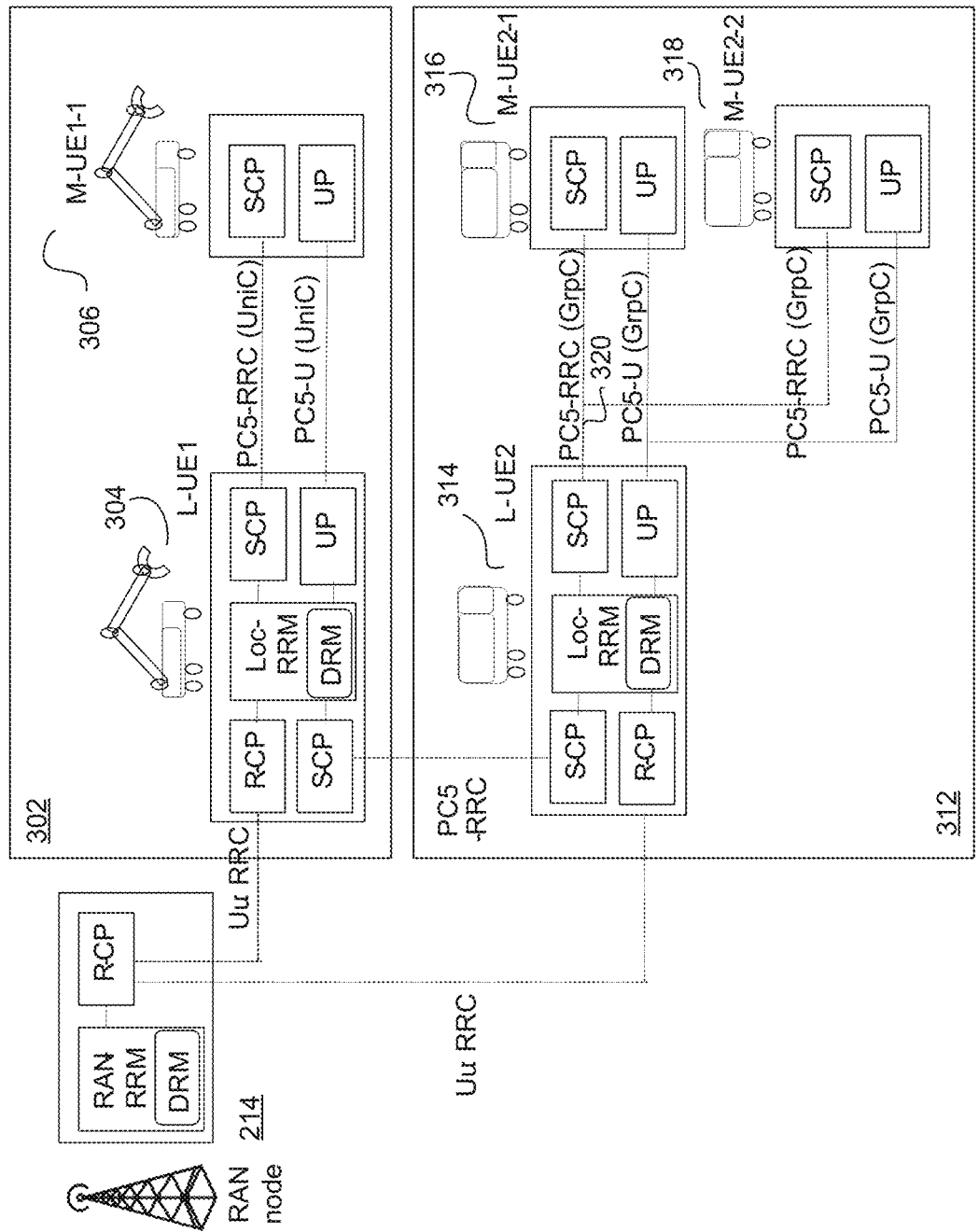
FIG. 3 is an illustration of user plane (UP) and control plane (CP) support in a first UE group and a second UE group, according to an embodiment of the present disclosure.

FIG. 3 is an illustration of user plane (UP) and control plane (CP) support in a first UE group 302 and a second UE group 312, according to an embodiment of the present disclosure. Referring to FIG. 3, the first UE group 302 may comprise an L-UE1 304 and M-UE1-1 306. The L-UE1 304 communicates with RAN node 214 via Uu RRC connection, and communicates with M-UE1-1 306 via PC5-RRC (unicast transmission) and PC5-U (unicast transmission). The second UE group 312 may comprise an L-UE2 314 and M-UE2-1 316 and M-UE2-2 318. The L-UE2 314 may communicate with the RAN node 214 via the Uu RRC connection. The L-UE2 314 may communicate with the M-UE2-1 316 and M-UE2-2 318 via the PC5-RRC connection (group cast transmission) and PC5-U connection (groupcast transmission). Further the L-UE1 304 and L-UE2 314 may communicate with each other through PC5-RRC connection.

Figure 4:
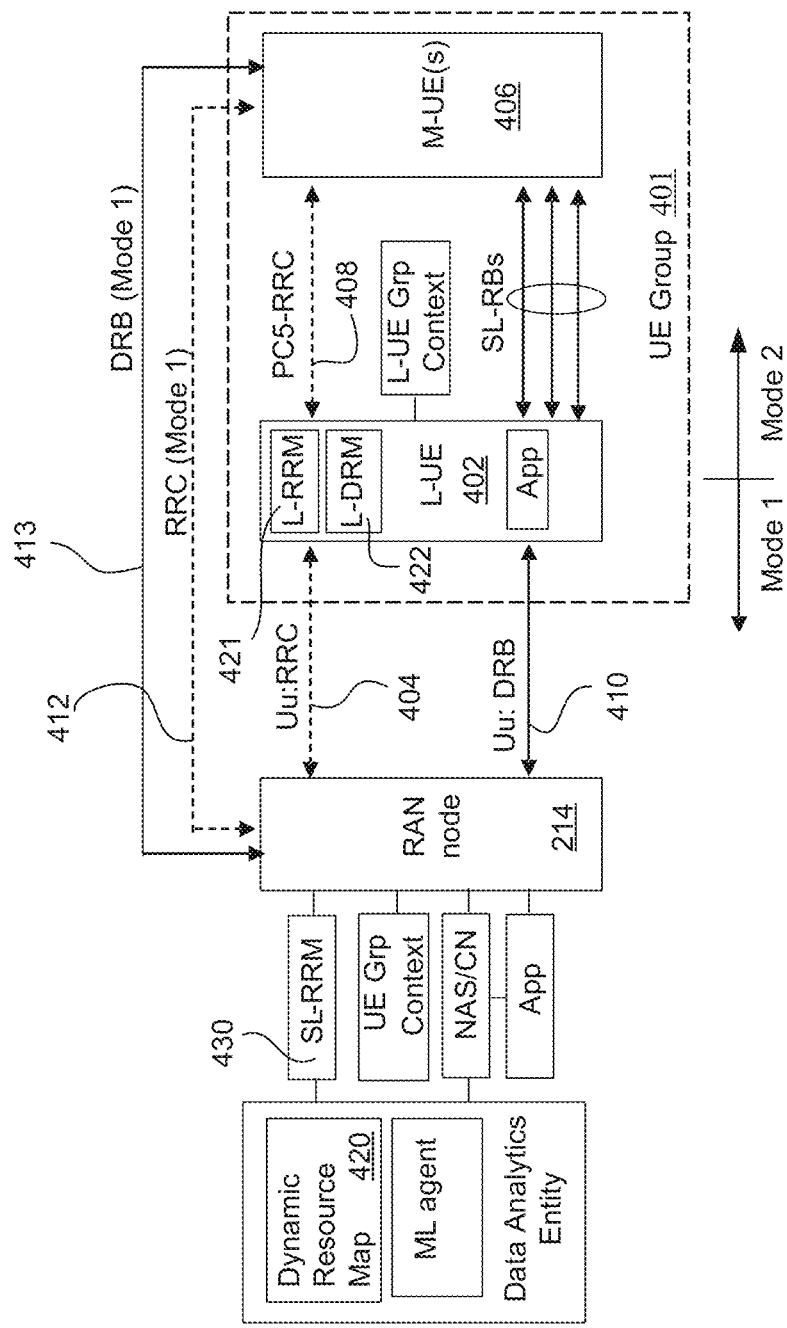
FIG. 4 is an illustration of a functional architecture of a RAN and a UE Group, according to an embodiment of the present disclosure.

FIG. 4 is an illustration of a functional architecture of RAN and a UE group 401, according to an embodiment of the present disclosure. Referring to FIG. 4, the L-UE 402 may operate in Mode 1 (in RRC Connected state) with an active RRC connection 404 with a serving RAN node (e.g., gNB 214) in RAN. This enables the L-UE 402 to receive SL dynamic resource grants or SL configured grants for performing SL transmissions. Each M-UE 406 in the UE group 401 may be associated with the L-UE 402 via a PC5-RRC connection 408. The active RRC connection 404 and the PC5-RRC 408 can be used for sending and receiving UE group related RRC configuration and NAS messages from the RAN and core network (CN). Additionally, the DRB connection 410 on the Uu interface can also be used for sending and receiving higher layer (application) messages intended for UE group operation from the CN and data network name (DNN), respectively. The L-UE 402 can also be configured by the CN with mapping rules in the NAS layer (above L2 AS-layer) to translate from higher layer messages (e.g. group operations) to operations at the AS-layer (e.g. resource reconfiguration, SL-RB configuration).

The M-UE 406 may also operate in Mode 1 with dedicated RRC connection 412 with RAN while maintaining the PC5-RRC connection 408 with the L-UE 402. This enables the M-UE 406 to be supported directly by the serving RAN node gNB 214 in the RAN for resource allocation, RRM, interference mitigation, congestion control, AS-layer configuration (e.g. for dynamic SL grant and semi-persistent scheduling (SPS) resource allocation, SL-RB configuration) and mobility (handover) while being associated with the UE group 401 via the L-UE 402 (using PC5-RRC connection 408). Alternatively, the M-UE 406 in Mode 1 may be configured to switch to Mode 2 by releasing the RRC connection 412 with RAN while being supported indirectly for RRM and AS-layer configuration by the L-UE 402 (using PC5-RRC connection 408). The M-UE 406 may also be configured to switch from Mode 2 to Mode 1 (e.g. when leaving the UE group 401) where the required resources and configuration (i.e. preambles, UE identifiers, access resources) for establishing connection with the RAN node 214 may be provided by the L-UE 402 via PC5-RRC connection 408.

In regards to SL resource allocation, the SL resources provided by RAN to the L-UE 402 may be either SL dynamic resource grants (based on SR/BSR) or SL configured grants (based on RRC, Type 1 (RRC-based activation/deactivation) or Type 2(PDCCH/DCI based activation/deactivation)) for use in sidelink transmissions in the UE group 401. The UE group 401 can be provided by RAN with one or multiple resource pools (RP) via the L-UE 402 which in-turn, reassigns the SL resources to support SL transmissions within the UE group 401 based on higher layer attributes (e.g. communications pattern). It may be possible for the allocated SL dynamic resource grants to overlap with that of the SL configured grants (i.e. both grants indicate the use of the same time-frequency resources). In this scenario, based on the regulations, rules, or conditions provided by RAN (e.g. priority), the allocation of the SL dynamic resource grants may override the SL configured grants. Note that in addition to RPs, the RAN may also configure multiple SL carriers or SL subchannels (time-frequency resources) for supporting SL transmissions within UE group 401. As such, any references to RPs or resources in the disclosure may also imply SL carriers or SL channels or SL subchannels. Accordingly the term SL resource grant can refer to SL dynamic resource grant and/or SL configured grant.

The SL resource allocation (for a UE or a UE group) of either the SL dynamic resource grants or SL configured grants can be made by restricting the SL resources to one or many SL radio bearers (SL-RBs) or by not restricting the resources to any SL radio bearers (SL-RBs). For instance, the RAN may limit the usage of the SL resources only to specific SL radio bearers by indicating the SL radio bearer identifiers (SL-RB IDs). Alternatively, the SL resources may be provided without any limitations by not indicating the SL radio bearer identifiers, and it is up to the UE or L-UE in UE group to map the provided resources to corresponding SL-RBs.

When an L-UE, for example L-UE 402, requests for SL resources (i.e. by sending SR/BSR or UE Assistance Information) it may be assigned with SL dynamic resource grants or SL configured grants for using RP(s) with specific geo-area and time duration/periodicity restrictions, indicating the validity of the RPs as determined by validity conditions. In this case, provided that validity conditions are satisfied (i.e. UE group is within the regulated/conditioned geo-area and time duration), the L-UE 402 may reallocate the SL resources to other M-UEs 406. This permits the L-UE 402 to have the capabilities of or behave similar to the RAN node 214, and function as a time and location restricted RAN node with resource allocation and scheduling capability. In other words, the validity conditions include conditions for using sidelink resources of the sidelink resource grant based on a validity time duration and a validity location area. Accordingly, a UE can utilize the SL resources of the sidelink resource graph provided the current time and the location of the UE area are valid (i.e, satisfy the conditions).

In the case when the L-UE 402 transitions to Mode 2 (e.g. due to releasing RRC connection 404 or radio link failure (RLF), the UE group 401 can still obtain the AS-layer assistance from the RAN via the M-UE 406 operating in Mode 1 (RRC connected 412). In this scenario, the functions provided by the RAN for the UE group 401, which include resource allocation, RRM, interference mitigation, congestion control, AS-layer configuration and mobility may be supported via the M-UE 406.

In another alternative, the UE group 401 may entirely operate in Mode 2 where both the L-UE 402 and the associated M-UEs 406 function in Mode 2 without any RRC connections with the RAN. In this scenario, given the group configuration via PC5-RRC connection 408 at the AS-layer, the L-UE 402 may assist other M-UEs 406 for determining the SL resources required for performing SL transmissions within the UE group 401. Note that the L-UE 402 may determine the SL resources for the M-UE 406 in the group 401 based on either the resource pool information obtained from the SIBs (in coverage scenario), pre-configured resource pools (out of coverage), or coordination with other UEs (within and outside of group 401) in order to rapidly and dynamically identify the SL resources without having to apply the conventional sensing and reservation SL resource selection procedure in Mode 2.

For assisting with the resource allocation and mitigation of SL interferences in the under-laying cell, the L-UE 402 may configure the M-UEs 406 in Mode 2, in the UE group 401, to make measurements of the channel (sidelink received signal strength indicator (SL-RSSI), sidelink reference signal received power (SL-RSRP), signal to interference-plus-noise ratio (SINR)) and loading conditions (channel busy ratio (CBR), channel occupancy ratio (CoR)) on one or many channels or resource pools and report the measurements to the L-UE 402. Next, the L-UE 402 aggregates the measurements reported by all M-UE 406 and reports the aggregated measurements over the configured channels/resources pools to the RAN node 214 by indicating the UE Group identifier and L-UE identifier, to enable the RAN node 214 to distinguish the measurements in the aggregated measurements attributed to the UE group 401 from the measurements in the aggregated measurements attributed to the individual UEs (e.g. M-UEs 406 or other UEs). Individual UEs may comprise of a first Individual UE type, which refers to UEs within the UE group 401, and a second individual UE type, which refers to UEs outside of the UE group 401. The RAN node 214 can configure 2 measurement report types, a Group report (aggregated) and a Single UE report (applies for both types of individual UEs). For Mode 1 M-UEs 406, the serving RAN node 214 may directly configure one or many M-UEs 406 in a UE group 401 to make channel and loading measurements and report the measurement results to the L-UE 402. Likewise, the L-UE 402 may configure one or many Mode 1 M-UEs 406 in the UE group 401 to make channel and loading measurements and report the measurement results directly to serving RAN node. In addition, the serving RAN node 214 may configure the UE group 401 to indicate the RP assignment and reservation (along with the RP usage restrictions/conditions) to other UEs operating in Mode 2. The RP assignment may be indicated by the following: in the SCI, in a (open access) MAC CE, or in a broadcast message sent via PC5-RRC connection 408 when performing SL transmissions.

The resource allocation capability of the L-UE 402 may be augmented by accessing a dynamic resource map (DRM) 420 which is managed by the RRM entity 430 in the RAN. The DRM 420 provides SL RP attributes based on resource usage location (geo-area IDs), time duration and connection type (L2 ID). Additionally, within the coverage area of the UE group 401, the L-UE 402 may maintain and manage its own local DRM 422.

Since the UE group 401 may support higher layer group operations, which include intra-group operations (i.e. joining, leaving, role transferring) and inter-group operations (merging, splitting), the RP allocation at the AS-layer can be increased and contracted dynamically based on the type of the executed group operation. In the case of UE group mobility, the RRM capability of the L-UE for allocating resources and mitigating interference in the UE group 401 as well as coordination between the source cell (SCell) and target cell (Tcell) during HO may be performed with the assistance of the RAN.

A summary of the resource allocation and RRM related functions that may be supported for the UE group 401 (L-UE 402 and M-UE(s) 406) operating in Mode 1 and Mode 2 is provided in the Table 1.

TABLE 1

Summary of UE group operational modes and resource allocation and RRM functions.

| Lead UE (L-UE) | Member UE (M-UE) | Resource Allocation | Interference/Congestion Control | RRM (Channel/Load measurements) |
|---|---|---|---|---|
| Mode 1 | Mode 1 | Dynamic grant RP for UE Group<br>Configuration & dynamic activation/deactivation of configured grants (CGs) for UE Group<br>Use of configured geo-area/zone based resource allocation | Handled by RAN for both L-UE and M-UE(s) with UE group context (e.g. Group Assistance Information) | RRC to config measurement reporting in L-UE and M-UE. M-UE can either report directly to RAN or indirectly via L-UE using PC5-RRC. L-UE reports the aggregated measurements |
| Mode 1 | Mode 2 | L-UE receives dynamic grant RP for UE Group<br>L-UE received configuration & dynamically activates/deactivates CG for M-UE(s) (UE Group)<br>Use of configured geo-area/zone based resource allocation | Handled by RAN via L-UE with UE group context (e.g. Group Assistance Information) | RRC to config measurement reporting in L-UE for UE group. M-UE can be configured by L-UE via PC5-RRC |
| Mode 2 | Mode 1 | M-UE receives dynamic grant RP for UE Group<br>M-UE receives configuration & dynamically activates/deactivates CG for M-UE(s) (UE Group)<br>Use of configured geo-area/zone based resource allocation | Handled by RAN via M-UE with UE group context (e.g. Group Assistance Information) | RRC to config measurement reporting in M-UE for UE group. L-UE can be configured by M-UE via PC5-RRC |
| Mode 2 | Mode 2 | Either L-UE or M-UE(s) identify RPs from SIB and perform sensing<br>When using configured geo-area/zone based resource allocation, either L-UE or M-UE identify RPs based on service attributes | Handled by both L-UE and M-UE for UE group based on sensing and coordination via PC5-RRC | L-UE and M-UE may be configured (in coverage case) to sense and report measurement results for UE group |

A summary of the mobility and handover related functions that may be supported for the UE group 401 (L-UE 402 and M-UE(s) 406) operating in Mode 1 and Mode 2 is provided in the Table 2.

TABLE 2

Summary of UE group operational modes and mobility related functions.

| Lead UE (L-UE) | Member U (M-UE) | Mobility |
|---|---|---|
| Mode 1 | Mode 1 | Coordinated HO for UE group<br>Configuration of regulated RP and fast activation/deactivation of regulated RP<br>Use of configured geo-area/zone based HO<br>Use of enhanced conditional handover (CHO). Apply activation/deactivation signaling to trigger CHO |
| Mode 1 | Mode 2 | Coordinated HO for UE group<br>Configuration of regulated RP and fast activation/deactivation of regulated RP<br>Use of configured geo-area/zone based HO<br>Use of enhanced CHO. Apply activation/deactivation signaling to trigger CHO |
| Mode 2 | Mode 1 | Coordinated HO for UE group<br>Configuration of regulated RP and fast activation/deactivation of regulated RP<br>Use of configured geo-area/zone based HO<br>Use of enhanced CHO. Apply activation/deactivation signaling to trigger CHO |

TABLE 2-continued

Summary of UE group operational modes and mobility related functions.

| Lead UE (L-UE) | Member U (M-UE) | Mobility |
|---|---|---|
| Mode 2 | Mode 2 | Determine new RP for UE group based on location info and SIB (in coverage)<br>Use preconfigured RP and group location info (out-of-coverage (OOC))<br>Obtain (long-term wide area) RPs from higher layer (HL) based on UE group service attributes<br>UE Group can be mobile (in SL) in RRC Inactive state and use coordinated/enhanced CHO/Regulated RP. Use RAN paging if RPs are changed<br>Use of configured geo-area/zone based HO |

The UE functionality will now be discussed.

The functionalities that may be supported by the L-UE 402 can be divided into two (2) categories, namely higher layer functions and AS layer functions. At the higher layer, the L-UE 402 may support a set of distributed control system features which may include: providing synchronization timing information to the M-UEs 406 in UE group; managing all connections (i.e. unicast transmissions, groupcast transmissions, broadcast transmissions) and the higher layer UE group contexts; controlling the SL transmissions among M-UEs 406 with awareness of higher layer communications pattern; stabilizing the group topology by making adjustments and controlling the M-UE positions in response to intra-group UE operations (e.g. joining, leaving, transfer of L-UE role).

At the AS layer, the local area RRM related features that can be supported by the L-UE 402 include allocation and coordination of resource usage with other M-UEs 406 in the UE group intending to transmit on either the SL (on PC5 interface) or the uplink (on Uu interface). In some embodiment such RRM features include reassigning the RPs received from the RAN to individual M-UEs 406 as either SL dynamic resource grants or SL configured grants (including configuration and activation/deactivation of SL resources). Specifically, for Mode 1 M-UE 406, the RAN may provide directly a set of SL configured grants (including RPs, SL carriers, SL subchannels) to the M-UE 406 and indicate to the L-UE 402 the SL configured grants provided to M-UE 406. Next, the L-UE 402 may activate/deactivate the SL configured grants based on higher layer (communications pattern, traffic bursts, priority) and AS-layer conditions (channel and loading) in order to support the M-UE's SL transmissions. The activation/deactivation indication may be provided either via a PC5-RRC connection, in a MAC CE, or in the sidelink control information (SCI) message. For Mode 2 M-UE 406, the L-UE 402 may directly provide both the SL configured grants and activation/deactivation indications to the M-UE 406.

The L-UE 402 may control congestion by coordinating the sensing of the RAN configured channels within UE group, provide aggregated channel/load sensing reports to the RAN and indicate the RP reservation to other Mode 1 and 2 UEs in the vicinity of the L-UE 402. Additionally, the L-UE 402 may activate or deactivate the Tx RPs and Rx RPs configured in the M-UEs 406 to mitigate interference.

As part of distributed interference mitigation, the L-UE 402 may transmit a request-to-send (RTS)-like message prior to a broadcast transmission of a message indicating all RPs (RP identities) that are to be used in SL transmissions within the UE group 401. The RTS-like broadcast message includes the RP reservation, SL transmission timing (start time, periodicity, end time) and usage geo-area information (geo-area IDs, SL RP zone ID). The RTS-like broadcast message can be sent either in the SCI or a MAC CE that can be decoded and accessed by the M-UEs 406 within the UE group 401, as well as, other Mode 1 and Mode 2 UEs in the vicinity of the L-UE 402 to prevent the other UEs, outside of the UE group, from using the same resources during the duration of inter-group transmissions. The M-UEs 406 in the UE group 401 may individually transmit a clear-to-send (CTS)-like message in either the SCI or MAC CE to indicate the reception channel quality (SINR, RSSI) and loading conditions (CBR) perceived at each M-UE's location. In some embodiments, such a CTS-like message may include the identities of a set of down-selected RPs, a reduced list/set of RPs or shortlisted RPs, from those initially selected by the L-UE 402. In some embodiments, the CTS-like messages may also indicate to other Mode 1 and Mode 2 UEs in the vicinity of M-UE 406 to withhold from accessing the RPs during the duration of inter-group transmissions (both unidirectional and bidirectional). From the received individual CTS-like messages, the L-UE 402 may then select the best RPs that will ensure reliable and interference-free transmissions within the UE group 401 in the transmission duration and usage area. An alternative method to send the RTS-like broadcast message and CTS-like broadcast messages is via an open access (decodable) broadcast PC5-S or PC5-RRC connection 408.

For improving spectral efficiency, the L-UE 402 may have certain control to maximize the reuse of the allocated bulk resources in RP(s) over both time domain and frequency domain. Likewise, in the spatial domain, the L-UE 402 can facilitate the support for SL power control in all M-UEs 406 to ensure short range SL transmissions in a small coverage area and high SL-SINR. Additional features supported by L-UE 402 at the AS-layer may include: ensuring low and deterministic latency/jitter by coordinating packet buffering and SL transmissions at each UE based on timing information; ensuring high reliability by using mechanisms such as packet retransmissions and activation/deactivation of packet duplication; providing security assurance by ensuring all intra-group connections are protected/encrypted; translate higher layer attributes, such as L2 IDs (indicating logical packet forwarding/routing path), to AS-layer attributes, such as activation/deactivation of sidelinks, packet prioritization and congestion control at sidelink level with the awareness of end-to-end SL higher layer latency bound, reliability and throughput requirements. Other mechanisms supported in response to traffic bursts, unexpected interference and handling of SL transmission link interruptions/blockages may include: using conditional grant free SL resource configuration within the UE group (with time duration and area restrictions/conditions), fast SL access with dynamic activation/deactivation of SL configured grants, and opportunistic accessing of unused SL resources locally without RAN reconfiguration.

The UE group establishment and L-UE selection will now be discussed.

Figure 5:
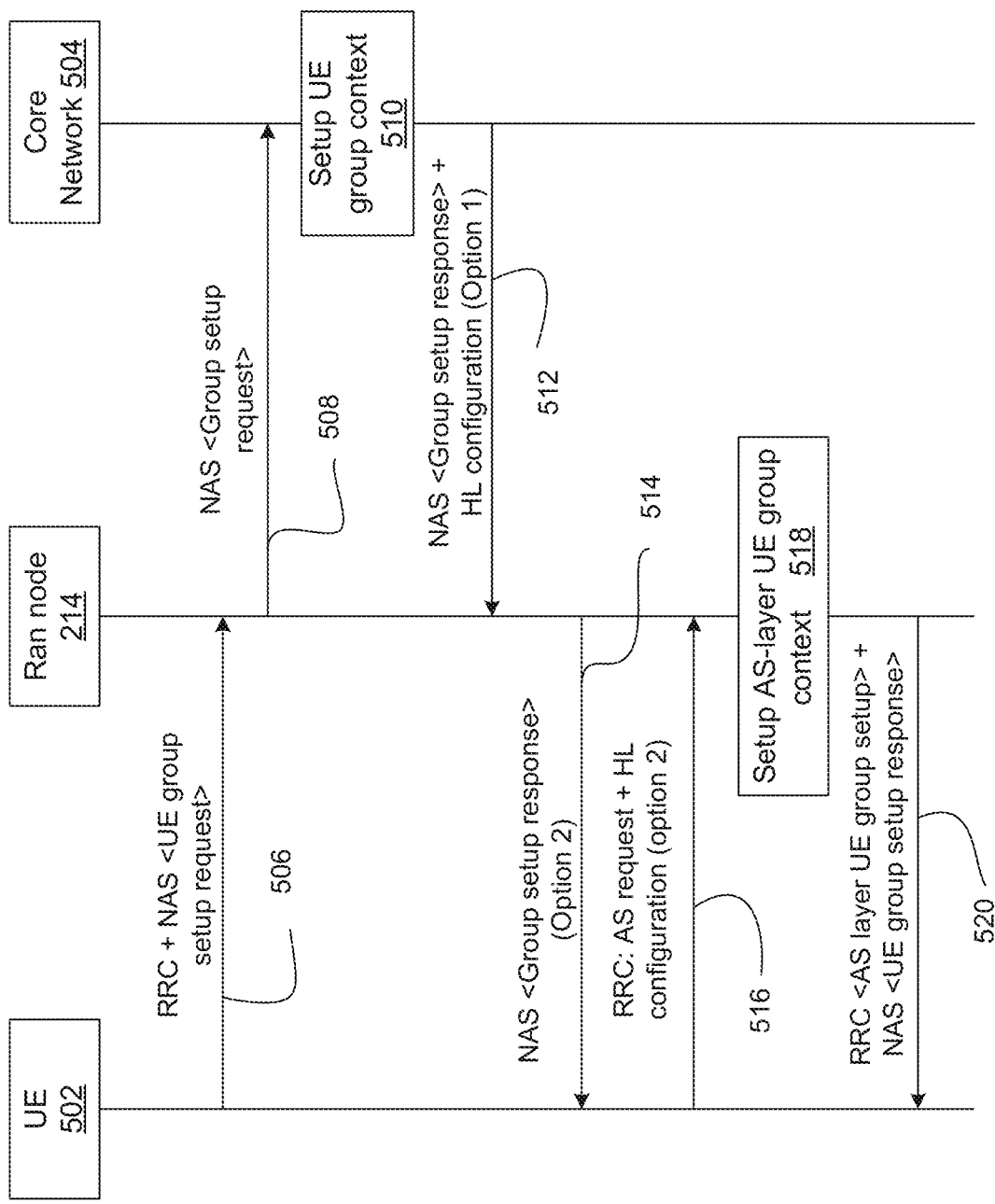
FIG. 5 is a call flow illustration of the procedure for a UE group establishment and an L-UE selection, according to an embodiment of the present disclosure.

FIG. 5 is a call flow illustration of the method for UE group establishment and L-UE selection, according to an embodiment of the present disclosure. Referring to FIG. 5, a UE group 401 can be formed after a UE 502 sends the initial attach request 506, including a higher layer NAS request with the intention to form a UE group. Next, based on the authorization and selection of the UE, as an L-UE (for example L-UE 402), which may be UE 502, the RAN node 214 in the serving RAN establishes the AS-layer UE group context and performs AS-layer configuration in the L-UE 502. The procedure for UE group establishment at the RAN node (i.e. gnB 214) in the serving RAN involves the following. The gNB 214 receives the higher layer (NAS) request message 506 from UE in RRC for UE group establishment and authorization for L-UE. The gNB 214 may then send the NAS message 508 to the CN function(s) 504 responsible for authorizing L-UE and establishing UE group. After the core network function(s) 504 setup UE group context 510, the gNB 214 receives the NAS message response 512 intended for the L-UE. The gNB 214 may establish AS-layer UE group context 518 and assigns UE group identifier (ID) based on the UE group related configuration and authorization information received from CN function(s) 504. The gNB 214 may then forward the NAS message to L-UE and configure the L-UE (UE 502) with the AS-layer UE group context (i.e. including UE Group ID) via RRC 520. Note that after establishing the L-UE and UE group context at the RAN node 214 and configuring L-UE with the AS-layer parameters, the L-UE (UE 502) becomes a regulated RAN node (static: RSU, mobile: lead UE(L-UE)) with capability to support certain RAN functionalities (e.g. SL resource allocation) with restrictions.

Alternatively, the RAN node 214 in the serving RAN may initially forward the NAS message 514 (received from CN functions 504 and includes higher layer configuration) to L-UE (UE 502) and establish the AS-layer UE group context 518 only after the L-UE sends the AS-layer establishment message containing the higher layer configuration information (e.g. UE Group Identifier, L-UE Identifier, QoS flow identifier, QFI/PQI mapping) in RRC 516. This is because the L-UE (UE 502) may transition into RRC idle state after receiving the NAS message 514, causing the RAN node 214 in the serving RAN to release the UE group context. In this case, the L-UE can send the AS-layer establishment message 516 (containing previously received or pre-configured higher layer configuration and authorization information from CN functions 504) in RRC to a new RAN node in the serving RAN, which can now establish the UE group context and configure the AS-layer 518 (e.g. UE group ID allocation, SL-RBs, QFI/PQI to SL-RB mapping) in L-UE based on the provided information. Higher layer configuration may refer to configuration related to NAS layer or application layer, which may be above or higher than the PDCP layer as illustrated, for example, in FIG. 8A.

Other M-UEs, which may be similar to the M-UE 406, intending to join the UE group may determine L2 ID (indicating the higher layer service ID) along with the L-UE ID and UE Group ID as part of the discovery procedure over the PC5-S interface. Alternatively, after AS-layer connection establishment, the L-UE ID and UE Group ID may be obtained by the M-UE 406 over the PC5-RRC interface.

To enable the L-UE 402 (UE 502) to perform local RRM tasks (i.e. local resource allocation, measurement configuration), the L-UE ID/UE Group ID and its corresponding authorization should be visible to the RAN and M-UE(s) 406 at the AS-layer. Since the selection and configuration of the L-UE 402 is handled at the higher layer (i.e. NAS or Application), the higher layer context which include the L-UE ID and UE Group ID may be provided by the CN function 504 (interfaced to the application function managing the UE group) to the RAN during initial registration. Note that the higher layer context provided to RAN may also include other UE group operation authorizations (e.g. UE group merging and splitting) which can be used in the AS-layer (i.e. RAN and sidelink) to support equivalent UE group operations, such as RP reconfiguration. Based on the higher layer context, the RAN may either reuse the same L-UE ID/UE Group ID in the AS-layer or assign another AS-layer ID (with one-to-one mapping between the CN's L-UE ID/UE Group ID and RAN's L-UE ID/UE Group ID) for handling the UE group context and any UE group related RRC signaling. The RAN also forwards the NAS message received from the CN functions 504 (containing the higher layer L-UE ID/UE Group ID) and indicates the corresponding AS-layer L-UE ID/UE Group ID to the registering UE in RRC configuration message. It is possible that the RAN may not select/authorize the same L-UE, for example UE 502, as that selected by the higher layers for the UE group for RAN related RRM and AS-layer purposes. It is also possible that the RAN may select/authorize multiple L-UEs in a UE group for RRM/AS-layer purposes, where multiple RRC connections to the RAN may be supported. For example, in the 5G critical control system illustrated in FIG. 2A (e.g., vehicle platooning system), the selected higher layer L-UE may be the front-most UE 206 in the vehicle platoon 202 while the L-UE(s) selected by the AS-layer may be the UE in the middle of the vehicle platoon 202, for example 208, or at the end of the vehicle platoon 202, for example UE 210, of the vehicle platoon 202 (for providing better transmission/reception coverage). The mapping of the L-UE context (AS-layer L-UE(s) ID to higher layer L-UE ID) is managed at gNB 214. In some embodiment, the selected/authorized UE(s) (i.e. L-UE(s), M-UE(s)) may be called a second UE.

The UE group context will now be discussed.

The UE group context maintained and managed at L-UE 402, which may be but need not be UE 502, can be categorized into two groups, namely higher layer context and AS-layer context. The higher layer context may comprise both user plane NAS (configured by the CN) and application layer parameters, which may include L2 IDs (service ID, cast/connection type), QoS (QoS-flow indicator (QFI)/PQI) profile, UE group ID, L-UE ID, M-UEs IDs, communications pattern (timing, order, direction), M-UE location, UE group service class (class ID, group velocity, group size {distance between UEs}, group QoS requirements {reliability, throughput, latency}, group priority) and security keys.

The AS-layer context can, in-turn, be divided into the UP and CP contexts. The AS UP context may include the SL-RB configuration profile (i.e. mapping between L2 sublayers, Logical Channel IDs, logical channel prioritization (LCP), logical channel group (LCG), service data adaptation protocol (SDAP) mapping profile, Packet Data Convergence Protocol (PDCP) ciphering keys and L1/L2 configuration parameters (e g channel state information (CSI)/CBR thresholds for activating/deactivating packet duplication (PD)).

The AS CP context may include UE ID, UE group ID, L-UE ID, allowed group operations (e.g. merging, splitting), allowed geo-area IDs and SL RP zone IDs (e.g. for geo-fencing), resource configuration (Tx resource pool, Rx resource pool, SL configured grants) and configured SL carriers.

The enhancement to the L2 protocol stack will now be discussed.

Figure 6:
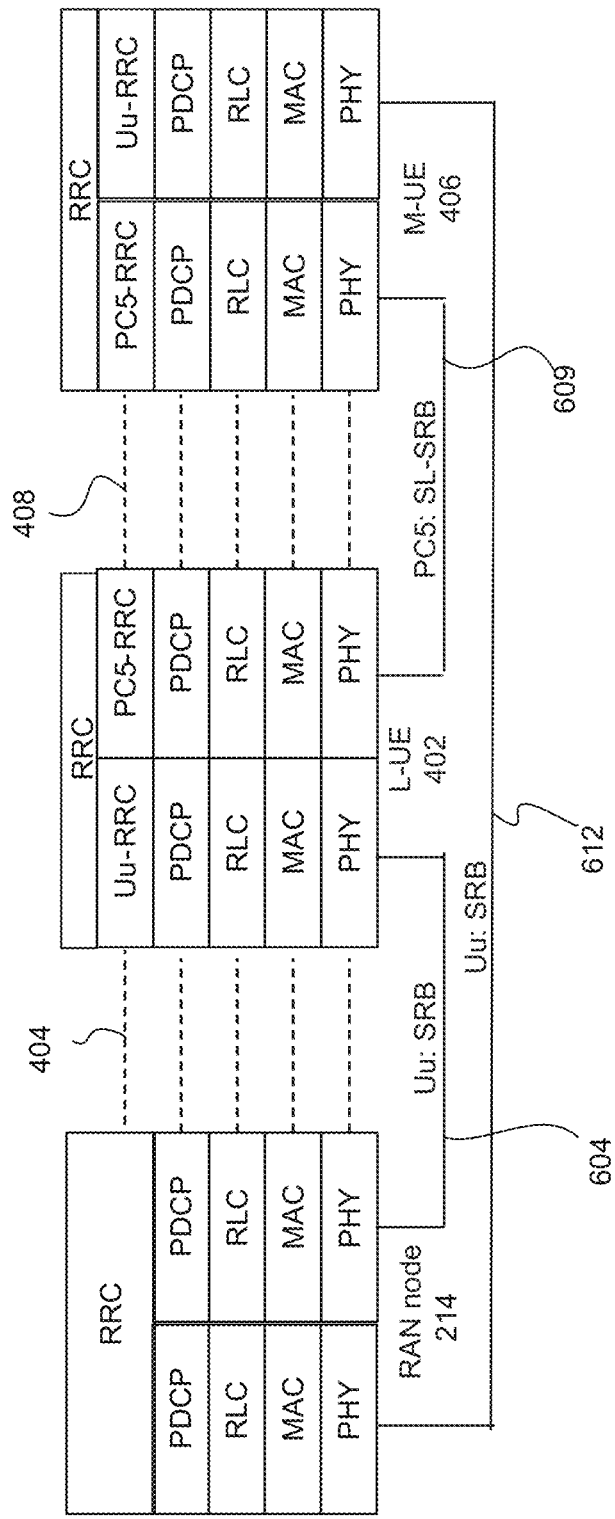
FIG. 6 is an illustration of an AS-layer control plane (CP) L2 protocol stack for a Mode 1 L-UE and a mode 1 M-UE, according to an embodiment of the present disclosure.
Figure 7:
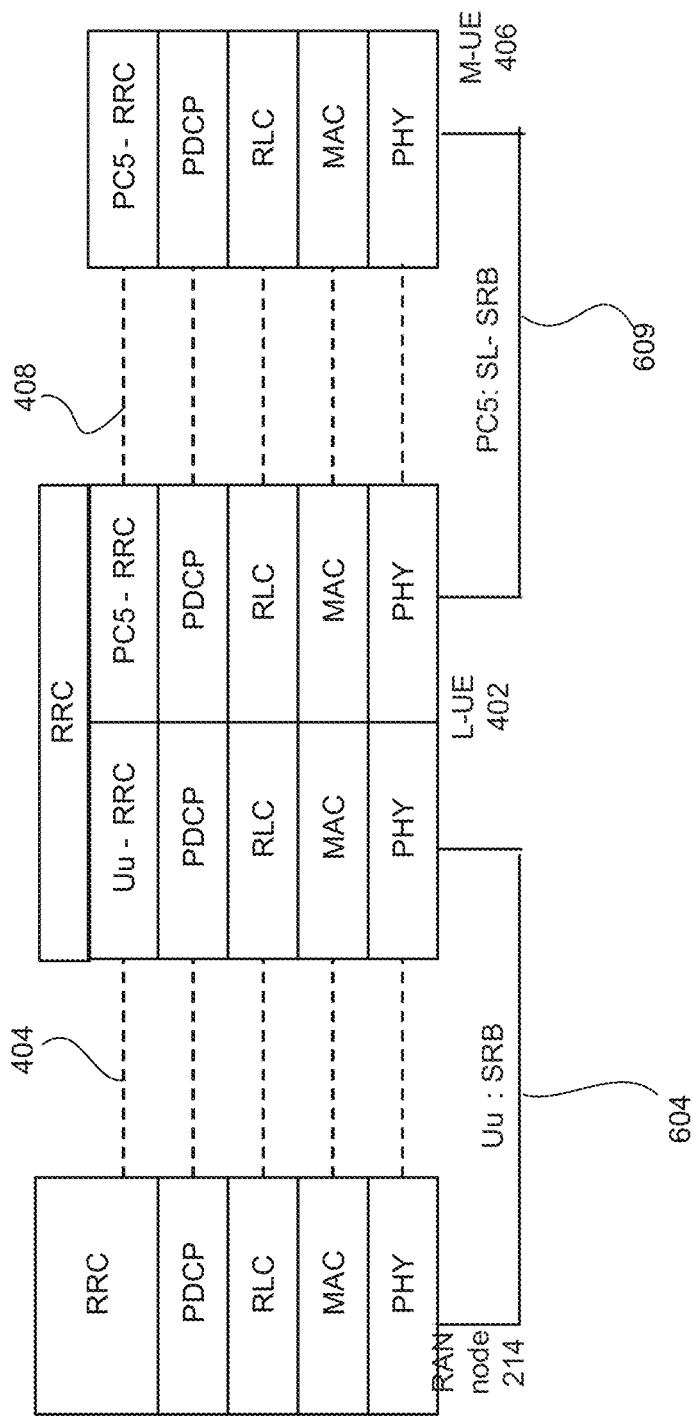
FIG. 7 is an illustration of an AS-layer CP L2 protocol stack for a mode 1 L-UE and a mode 2 M-UE, according to an embodiment of the present disclosure.

The CP (RRC) L2 protocol stacks supported in RAN, L-UE 402 (in Mode 1) and M-UE 406 (in Mode 1 and Mode 2) are shown in FIG. 6 and FIG. 7. FIG. 6 is an illustration of an AS-layer CP L2 protocol stack for Mode 1 L-UE and Mode 1 M-UE, according to an embodiment of the present disclosure. FIG. 7 is an illustration of an AS-layer CP L2 protocol stack for Mode 1 L-UE and Mode 2 M-UE, according to an embodiment of the present disclosure.

Referring to FIG. 6, L-UE 402 and M-UE 406 are both in Mode 1, and accordingly, both L-UE 402 and M-UE 406 may communicate with gNB 214 via Uu: SRB (Uu-RRC) 604 and 612 respectively. Further, L-UE 402 may communicate with the M-UE 406 via the PC5 RRC 408.

Note that in the case when L-UE 402 is in Mode 1 and M-UE is in Mode 2, as shown in FIG. 7, the gNB 214 may relay the RRC configuration (AS-layer configuration) intended for the M-UE 406 via the L-UE 402. The gNB 214 may communicate with L-UE 402 via the Uu: RRC 404, and the L-UE 402 may communicate with the M-UE 406 via PC5-RRC connection 408. When the L-UE 402 functions in Mode 2 while M-UE 406 is in Mode 1, the AS-layer CP L2 protocol stack of L-UE 402 and M-UE 406, as shown in FIG. 7, are swapped, where the M-UE 406 would be connected to the gNB 214 via RRC (SRB on Uu) and the L-UE 402 would be connected to the M-UE 406 via PC5-RRC connection 408 (SL-SRB).

The enhancements made in AS-layer CP L2 protocol stack allows extending the RRM and AS-layer capabilities from the RAN to UE groups, hence, enabling a local RRM entity 421 (above RRC) to operate at an authorized L-UE 402. Specifically, the enhanced AS-layer CP L2 protocol stack enables the L-UE 402 to dynamically form UE groups (with RAN interaction) and perform resource configuration (e.g. SPS RP) via RRC and dynamic activation/deactivation of resource configuration (Tx RP, Rx RP) via PC5-RRC 408. Additionally, the L-UE 402 may support data analytics locally by interacting with the RAN via RRC 404 for AS-layer RRM (and DRM) and by interacting with CN functions 504 and AFs (e.g. mobile edge computing (MEC) node) via UP (DRB) 410 for higher layer RRM assistance. Additional CP functions that may be supported at L-UE 402 include: configuring M-UEs 406 to make SL measurements and report position/location information; facilitating AS-layer UE context management and coordinating/negotiating non-interfering RP(s) in potential interference scenarios.

In the SL, the PC5-RRC connection can be established during PC5-Signalling (PC5-S) connection establishment procedure and can be used in unicast transmissions between any two UEs to exchange AS-layer configuration (i.e. L2 ID, UE ID, SL-RB configuration) and UE capability information (e.g. configured SL carriers). PC5-RRC type messages can be transmitted via an SL-SRB which is configured during connection establishment with an L2 protocol stack (comprising SDAP, PDCP, RLC, MAC and PHY sublayers) and corresponding parameters (e.g. security keys, packet duplication, RLC (acknowledged mode (AM), unacknowledged mode (UM)) mode, LCG, prioritization, LCID) in both the Tx UE and Rx UE.

In UE group scenario, the PC5-RRC connection 408 may be extended to perform groupcast transmissions (i.e, L-UE 402 to all M-UEs 406) after initial synchronization and connection establishment. This can be done by the L-UE 402, by ensuring that all M-UEs 406 are configured with the same SL-SRB parameters and use the same security keys (ciphering/integrity protection) when receiving and decoding the groupcast PC5-RRC messages. Once the groupcast PC5-RRC connection is supported, it can be used for the following: transmission of system information parameters (e.g. SL bandwidth, frame/subframe number, synchronization information), configuration of RPs (for Tx and Rx); configuration of configured grants (i.e. for use on contention basis in SL); mitigation and recovery from RLF conditions; provisioning of configuration information for channel/interference sensing and congestion/loading monitoring; provisioning of configuration information for QoS reporting; and transmission of UE group contexts (e.g. UE group ID).

Figure 8A:
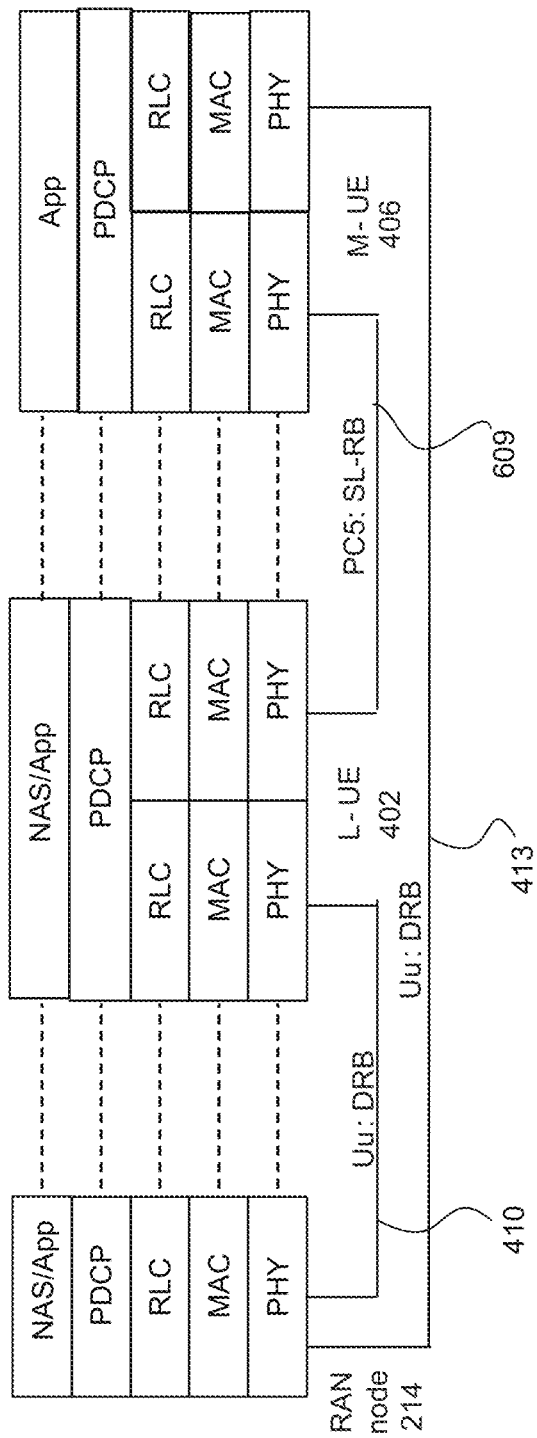
FIG. 8A is an illustration of (option 1) an AS-layer UP L2 Protocol Stack with groupcast/multicast DRB at a RAN node and a unicast/groupcast SL-RB via an L-UE for a Mode 1 M-UE, according to an embodiment of the present disclosure.
Figure 8B:
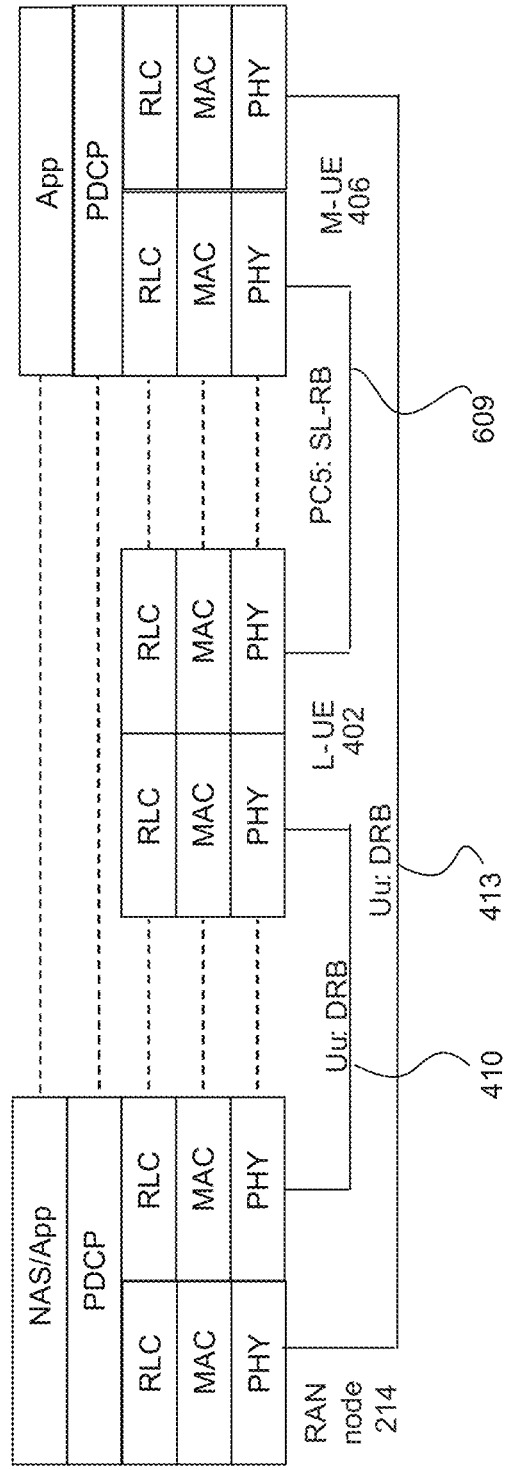
FIG. 8B is an illustration of (option 2) an AS-layer UP L2 Protocol Stack with unicast/groupcast DRB at a RAN node and a unicast/groupcast SL-RB via a L-UE for a Mode 1 M-UE (using RLC layer relaying), according to an embodiment of the present disclosure.
Figure 8C:
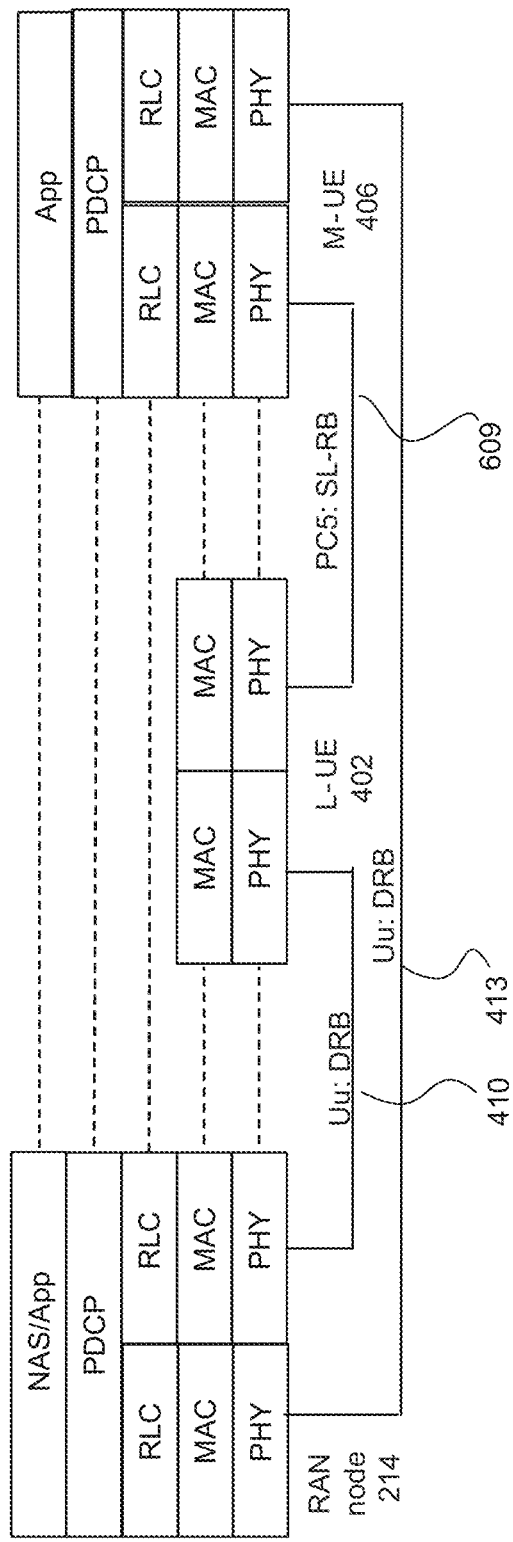
FIG. 8C is an illustration of (Option 3) an AS-layer UP L2 Protocol Stack with unicast/groupcast DRB at a RAN node and a unicast/groupcast SL-RB via a L-UE for a Mode 1 M-UE (using MAC layer relaying), according to an embodiment of the present disclosure.
Figure 8D:
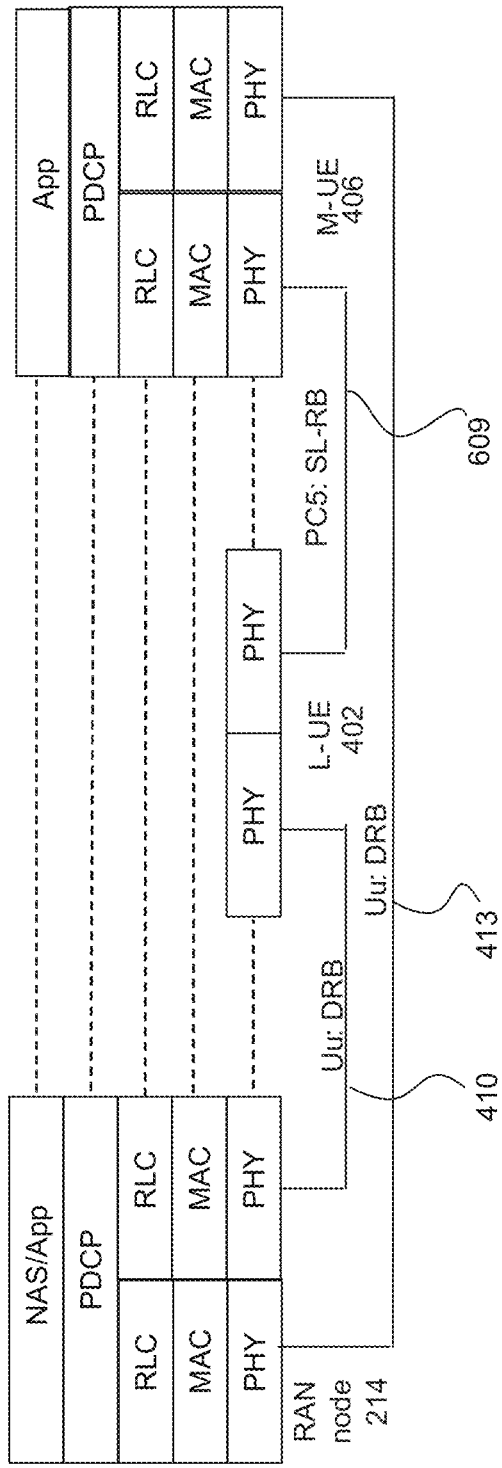
FIG. 8D is an illustration of (Option 4) an AS-layer UP L2 Protocol Stack with unicast DRB at a RAN node and a unicast/groupcast SL-RB via a-L-UE for a Mode 1 M-UE (using PHY layer relaying), according to an embodiment of the present disclosure.
Figure 9:
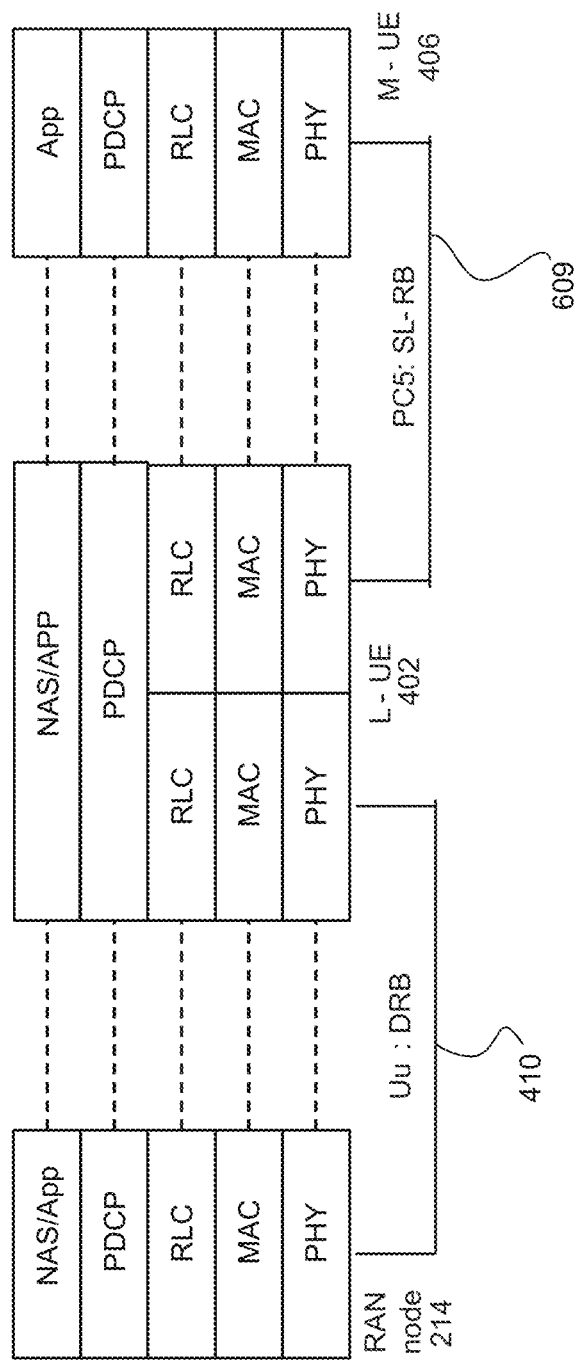
FIG. 9 is an illustration of an AS-layer UP L2 Protocol Stack for a Mode 1 L-UE and a Mode 2 M-UE, according to an embodiment of the present disclosure.

The UP L2 protocol stacks supported in RAN, L-UE (in Mode 1) and M-UE (in Mode 1 and Mode 2) are shown in FIGS. 8A-D and FIG. 9. FIG. 8A is an illustration of (option 1) AS-layer UP L2 Protocol Stack with groupcast/multicast DRB at RAN node and unicast/groupcast SL-RB via L-UE for Mode 1 M-UE, according to an embodiment of the present disclosure. FIG. 8B is an illustration of (option 2) AS-layer UP L2 Protocol Stack with unicast/groupcast DRB at RAN node and unicast/groupcast SL-RB via L-UE for Mode 1 M-UE (using RLC layer relaying), according to an embodiment of the present disclosure. FIG. 8C is an illustration of (Option 3) AS-layer UP L2 Protocol Stack with unicast/groupcast DRB at RAN node and unicast/groupcast SL-RB via L-UE for Mode 1 M-UE (using MAC layer relaying), according to an embodiment of the present disclosure. FIG. 8D is an illustration of (Option 4) AS-layer UP L2 Protocol Stack with unicast DRB at RAN node and unicast/groupcast SL-RB via L-UE for Mode 1 M-UE (using PHY layer relaying), according to an embodiment of the present disclosure. FIG. 9 is an illustration of AS-layer UP L2 Protocol Stack for Mode 1 L-UE and Mode 2 M-UE, according to an embodiment of the present disclosure.

The enhanced UP capabilities supported in UE groups include the use of groupcast/multicast DRB 413 at gNB 214 for direct downlink transmissions of data to the UE group for M-UEs 406 in Mode 1 (FIGS. 8A-8D) and the use of L-UE 402 to relay the previously received DL data or send new data to M-UEs 406 in Mode 2 (FIG. 9). The UP protocol stack supported at the gNB 214, L-UE 402 and M-UE 406 may comprise a user plane non-access stratum (NAS) or application (App) layer and the SL-RB in the AS (L2) layer (including of PDCP, RLC, MAC and PHY). Note that when multiple NAS/App layers and multiple SL-RBs are supported, the SDAP sublayer may be configured above the PDCP sublayers to perform the mapping between the NAS/App and SL-RBs. The same UP protocol stack configuration (including SDAP) may apply in all relaying scenarios shown in FIG. 8A-D and FIG. 9. When the L-UE 402 functions in Mode 2 while M-UE 406 is in Mode 1, the UP protocol stack of L-UE 402 and M-UE 406, as shown in FIG. 9, are swapped where the M-UE 406 is connected to the gNB 214 via DRB on Uu 413 and the L-UE 402 is connected to the M-UE 406 via PC5 SL-RB 609. For Mode 1 L-UE 402 and M-UE 406 in Option 1 in FIG. 8A, the gNB 214 supports groupcast/multicast DRB 410 and 413 for direct DL transmissions to both L-UE 402 and M-UE 406. The L-UE 402 can either relay the data packets received from gNB 214 or send different data packets to M-UE 406 via PC5 SL-RB 609. Alternatively in Option 2-4 in FIGS. 8B-D, the gNB 214 supports unicast/groupcast/multicast DRBs 410 and 413 to both L-UE 402 and M-UE 406. The L-UE 402 acts as a forwarding node to relay the data packets to M-UE 406 via PC5-SL-RB 609. Note that the transmission over PC5 can be performed using either unicast or groupcast SL-RB where the L-UE 402 can send the data packets to either one or multiple M-UEs 406 in UE group. For Mode 2 M-UEs 406 in UE group (in FIG. 9), the L-UE 402 either relays the packets from gNB 214 or sends different data packets to M-UE 406 via PC5 SL-RB 609 (unicast or groupcast).

The combined radio bearers used for relaying may comprise the DRB and SL-RB (shown in FIG. 8B-8D), that span between gNB 214 and M-UE 406 via L-UE 402 can be considered as a single new type of a relaying data radio bearer (R-DRB). The R-DRB may comprise a full protocol stack (HL and AS L2 layers) at both the gNB 214 and M-UE 406, and a partial configurable protocol stack (i.e. L2 up to RLC, L2 up to MAC or PHY only) at L-UE. The R-DRB can be established and configured by the RRC in gNB 214 in both the M-UE 406 and L-UE 402. In some embodiments the R-DRB can be configured by the RRC in gNB 214 with the RRC Connection Reconfiguration procedure. The R-DRB can be used to send UP data (UP/CP NAS and Application) between the gNB 214 and M-UE 406. The establishment and configuration of the R-DRB may be done either in a single step where the gNB 214 configures the corresponding R-DRB component segments/links (DRB and SL-RB) in both M-UE 406 and L-UE 402 at the same time (single procedure), or, in two steps, where binding and configuration of the individual R-DRB component segments/links may be done after the configuration of individual segments/links. After the configuration of the R-DRB, the UP data may be sent using RRC-Uu and PC5-RRC interfaces, from the gNB 214 to M-UE 406 via L-UE 402 in downlink and from the M-UE 406 to gNB 214 via L-UE 402 in uplink. During the transmission of the UP data using the R-DRB, the L-UE 402 may only relay the UP data in DL and UL without deciphering the data at its PDCP sublayer, and the ciphering keys corresponding to the R-DRB may only be available at the gNB 214 and M-UE 406 and not provided to/be available at the L-UE 402. Additionally, after the establishment and configuration of the R-SRB, the UP data can be sent between gNB 214 and M-UE 406 either directly via Link 1 using Uu interface (gNB 214 and M-UE 406) or indirectly via Link 2 using Uu (gNB 214 and L-UE 402) and PC5-U (L-UE 402 and M-UE 406) interfaces.

In Options 1-4 (FIGS. 8A-D), the AS layer configuration (i.e. DRB and SL-RB) along with the resources (dynamic grants or configured grants) for both DL transmission (on Uu) and SL transmission (on PC5) may be determined and configured by the gNB 214. The AS layer configuration may include the cast type supported by the DRB and SL-RB (i.e. unicast, groupcast/multicast), Uu and SL resource grants, and the destination identifiers (i.e. UE ID, Group ID). When providing resources to the UEs in dynamic grants, the gNB 214 may indicate the grants in downlink control information (DCI) for, first, decoding the data, and second, relaying/retransmitting the data to the intended UE(s) over the PC5 interface. In this case the DCI may contain: the identifier of the UEs (UE ID or Group ID); a first grant for decoding the DL data, and a second grant for relaying the data over SL, where the relaying can be performed in the next transmission opportunity (after one or multiple SL subframes). Since both L-UE 402 and M-UE 406 are in Mode 1, either one of the UEs indicated in the first grant of the DCI may decode the data received in the DL. Next, the relaying over SL is performed only by the UEs indicated in the second grant of the DCI.

When the resources provided are configured grants (CGs), the gNB 214 may configure, in RRC, the first CG for decoding the DL data and second CG for retransmitting over SL. The intended UE identifiers of the first CG may be provided in RRC, while the intended UE identifiers of the second CG for SL relaying may be provided either in RRC or in DCI. Alternatively, the gNB 214 may send a CG activation message in a DL MAC CE or DCI containing the UE identifiers of the selected UEs to use the second CG for SL retransmissions. The selection of the UEs for SL retransmissions may be done at the gNB 214 based on the reception of an ACK/NACK message, sent by the UEs to indicate the successful/unsuccessful decoding of the DL data. If the provided resource grants are to be used for groupcast transmission in SL, then the same resources are used to transmit simultaneously for all intended M-UEs in a groupcast SL-RB. The relaying UE may indicate the identifier (i.e. UE ID or Group ID) in the SCI to enable the receiving UE(s) to decode the data. When SL relaying is supported, the receiving UE may either select the best received data (from either DL or SL) or combine the data received from both the gNB 214 in DL and L-UE 402 in SL to achieve higher reliability.

In the relaying scenarios, as shown in FIGS. 8B-D, the gNB 214 may relay the downlink UP data intended for the M-UE 406 via the L-UE 402. The multiple types of relaying modes supported include: RLC-layer relaying (for large payload sizes) as shown in FIG. 8B; decode-and-forward relaying at MAC layer as shown in FIG. 8C; and amplify-and-forward relaying (for low latency relaying) at PHY layer as shown in FIG. 8D. Additionally, the SL-RB used for relaying from L-UE 402 to M-UE(s) 406 may be configured either as a unicast SL-RB or groupcast SL-RB. For each relaying mode, the SL resources for supporting relay transmissions from L-UE 402 to M-UE 406 are either provided by the gNB 214 to the L-UE 402 in the DCI (includes SL-RB ID, SL-RB cast type, M-UE ID(s)) as dynamic grants or in RRC as configured grants. If the relaying SL resources are provided as configured grants, the activation indication of the grants (including the SL-RB ID, SL-RB cast type, M-UE ID(s)) are provided to the L-UE 402 either in RRC or in DCI.

The different relaying options, shown in FIGS. 8B-8D for UP data relaying, can also be applied for CP RRC message relaying where the RRC sublayer replaces the NAS/App sublayer at the gNB 214 and M-UE 406 in the new relaying signaling radio bearer (R-SRB). The R-SRB may comprise a full protocol stack (RRC and AS L2 layers) at both the gNB 214 and M-UE 406 and a partial configurable protocol stack (i.e. L2 up to RLC, L2 up to MAC or PHY only) at L-UE 402. The R-SRB can be established and configured by the RRC in gNB 214 in both the M-UE 406 and L-UE 402. In some embodiments the R-SRB can be configured by the RRC in gNB 214 with the RRC Connection Reconfiguration procedure. The establishment and configuration of the R-SRB may be done either in a single step where the gNB 214 configures the corresponding R-DRB component segments (SRB and SL-SRB) in both M-UE 406 and L-UE 402 at the same time (single procedure), or, in two steps, where binding and configuration of the individual R-SRB component segments/links may be done after the configuration of individual segments/links. In this case, once the R-SRB is established and configured by the gNB 214 in the M-UE 406 and L-UE 402, the RRC messages may be sent using RRC-Uu and PC5-RRC interfaces, from the gNB 214 to M-UE 406 via L-UE 402 in downlink and from the M-UE 406 to gNB 214 via L-UE 402 in uplink. During the transmission of the RRC messages using the R-SRB, the L-UE 402 may only relay the RRC messages in DL and UL without deciphering the data at its PDCP sublayer and the ciphering keys corresponding to the R-SRB may only be available at the gNB 214 and M-UE 406 and not provided to/be available at the L-UE 402. Additionally, after the establishment and configuration of the R-SRB, the gNB 214 may maintain the RRC state of the M-UE 406 in the RRC Connected state, enabling the RRC messages to be sent between gNB 214 and M-UE 406 either directly via Link 1 using RRC-Uu interface (gNB 214 and M-UE 406) or indirectly via Link 2 using RRC-Uu (gNB 214 and L-UE 402) and PC5-RRC (L-UE 402 and M-UE 406) interfaces. In the event when either one of the links (Link 1 or Link 2) fail due to blockage or when UE moves out of coverage, RLF is not declared and the UE's RRC state is still maintained as RRC Connected. RLF is declared only when both links (Link 1 and Link 2) fail and the reestablishment of the connections may be attempted with a certain priority order (e.g. Link 1 followed by Link 2).

The resource allocation modes in UE groups will now be discussed.

Figure 10:
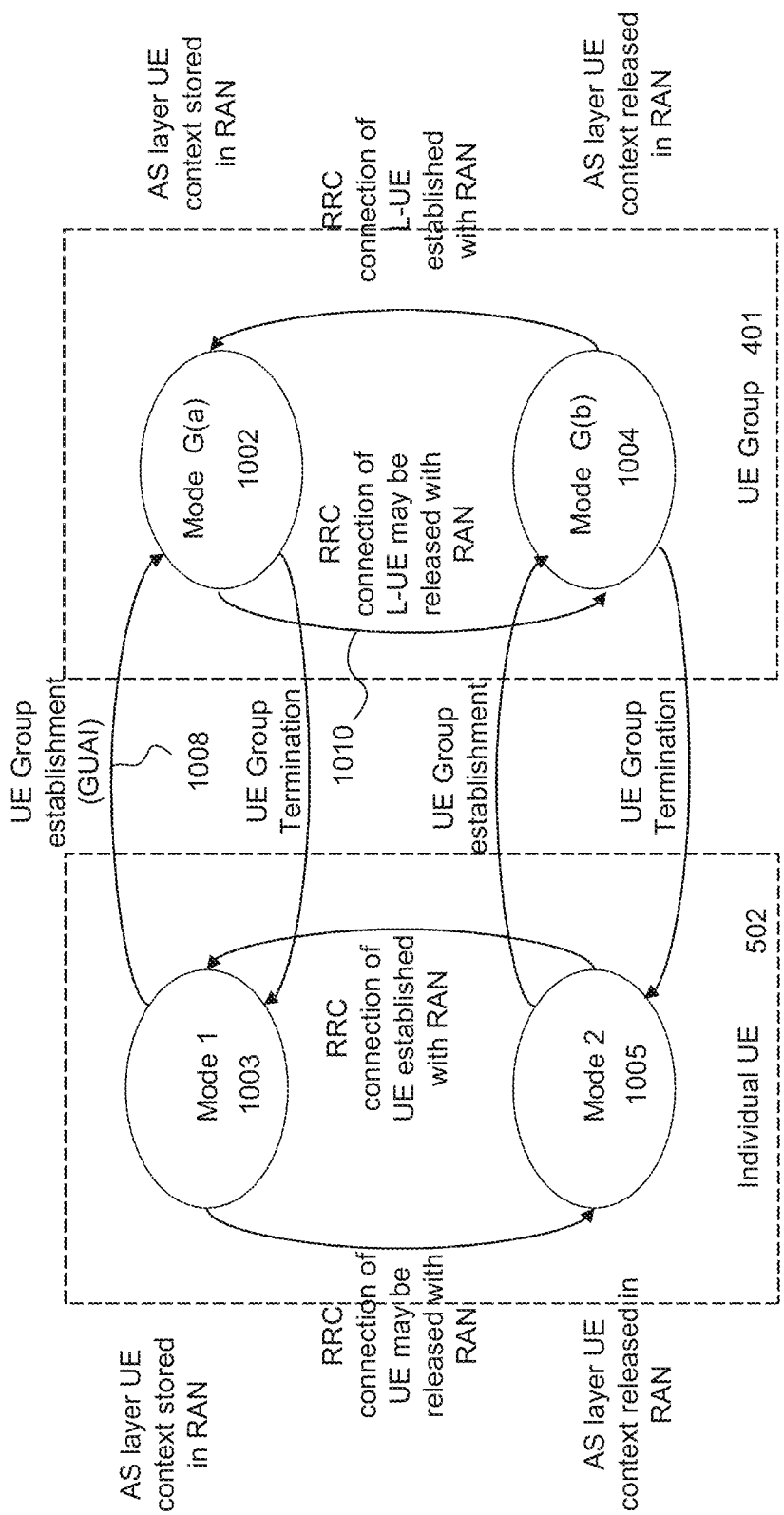
FIG. 10 is an illustration of resource allocation modes in UE groups, according to an embodiment of the present disclosure.

As an enhancement from the existing Mode 1 and Mode 2 for SL transmissions, the resource allocation modes for UE group and AS-layer context management is described in the following. FIG. 10 is an illustration of resource allocation modes in UE groups, according to an embodiment of the present disclosure. For UE Group resource allocation, Mode G(a) 1002 represents the equivalent of Mode 1 1003 (i.e. RAN based resource allocation) and Mode G(b) 1004 represents the equivalent of Mode 2 1005 (UE based autonomous resource allocation). A Mode 1 UE 502, in its role as an L-UE 402, may switch to Mode G(a) after the UE group establishment 1008 and sending of the Group UE Assistance Information (GUAI) message in RRC to the RAN node 214. In Mode G(a) 1002 the L-UE 402 may maintain the RRC connection with the RAN node 214 (i.e. for AS-layer configuration and resource allocation) while the RAN node 214 may store and manage the UE group context. If the RRC connection between the UE group 401 and RAN is released 1010 (e.g. due to RAN instructed Mode switching), the UE Group 401 transitions to Mode G(b) 1004 and the resources for SL transmissions within the UE group 401 is determined autonomously.

The RAN may retain the UE group 401 in a Group RRC-Connected or Group RRC Inactive state in Mode G(a) 1002 where the UE group context is stored at RAN. When the UE group 401 transitions into Group RRC-Idle state in Mode G(b) 1004 the UE group context may be released at RAN.

Within a UE group 401, once the PC5-RRC connection is configured and the AS-layer context is established, the UEs are considered to be in the PC5-RRC Connected state. The L-UE 402 in the PC5-RRC Connected state can manage the UE group context, make changes at AS-layer and determine resource configuration, while the M-UEs 406 can be either in PC5-RRC Connected state/Inactive state. If the M-UE(s) 406 transitions to idle/inactive state, where SL transmissions are not performed beyond a certain activity timer or when discontinuous reception (DRX) is configured, the L-UE 402 may send a groupcast SL paging message via the PC5-RRC interface to the M-UE(s) 406. Also in the UE group case, it should be possible for the RAN to page a UE in Mode 2 and in PC5-RRC idle/inactive state via an L-UE 402. In this case, the RAN may send a paging message to a set of L-UEs 402, if the location of the M-UE 406 is not known to the RAN and the M-UE 406 is not accessible via normal RAN paging.

When supporting UE group operations, where 2 UE groups are merged into a single group, the terminating L-UE may transfer the UE group context to the retaining L-UE. Also, the terminating L-UE may transition to an M-UE and can change its state to PC5-RRC inactive/idle. In RAN, the UE group context is updated with the merged context. Likewise, in the case when a single UE group splits into multiple groups, the L-UEs in PC5-RRC Connected state are distributed with the decomposed UE group contexts. In all intra-group and inter-group operation scenarios, the UE group contexts may be transferred either between L-UE (over PC5-RRC), via the UE itself (over PC5-RRC) or via RAN (over RRC).

The measurement and reporting in UE Groups for RRM will now be discussed.

The allocation of the SL resources (i.e. RP(s), SL-carriers, SL subchannels) in UE groups may be supported by the RAN (with RRM) or L-UE (with local RRM, for example 421 in FIG. 4). Within each UE group, the local RRM 421 at L-UE 402 may access: AS-layer transmission pattern (Tx timing, periodicity) of L-UE 402 and M-UE(s) 406; measurement and sensing results of L-UE 402 and M-UE(s) 406; and higher layer information (M-UE 406 geo-position, communications pattern (timing, order, direction), mobility attributes. At RAN, the RRM (interfaced to DRM) may access: AS-layer (aggregated) transmission pattern (periodicity, duration); measurements and sensing results of all UEs and UE groups (L-UE 402+M-UEs 406); resource reservation and sensing results of other Mode 1/2 UEs; and aggregated higher layer information of all UEs and UE groups. The SL measurement and sensing parameters reported to the RRM entities may include: UE/UE group identifiers, AS-layer parameters such as SL channel (i.e. SL-RSRP, SL-RSSI), and loading (CBR, CoR); and higher layer parameters such as QoS reports (unicast, groupcast), UE geo-location. Based on AS-layer and higher layer awareness, the RAN/L-UE can: determine resource allocation (SL/SPS grants) to Mode 1 UEs; update SIB to indicate resource usage to Mode 2 UEs; and exchange SL resource/loading information for inter-gNBs coordination.

Figure 11:
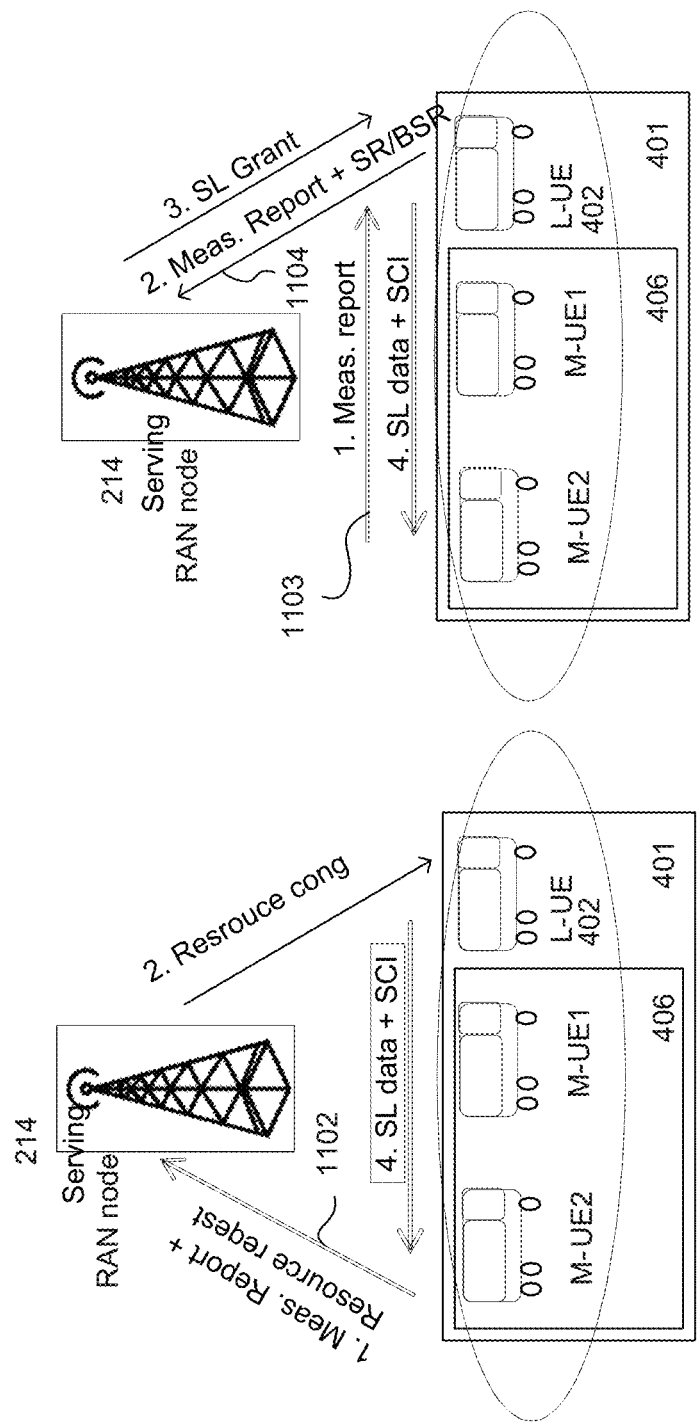
FIG. 11A is an illustration of measurement and direct reporting to a RAN node for Mode 1 M-UE, in UE Groups, according to an embodiment of the present disclosure.
FIG. 11B is an illustration of measurement and indirect reporting to a RAN node for Mode 2 M-UE, in UE Groups, according to an embodiment of the present disclosure.

FIG. 11A is an illustration of Measurement and direct reporting to RAN for Mode 1 M-UE, in UE Groups, according to an embodiment of the present disclosure. FIG. 11B is an illustration of Measurement and indirect reporting to RAN for Mode 2 M-UE, in UE Groups, according to an embodiment of the present disclosure.

In the case when both L-UE 402 and M-UE(s) 406 are in Mode 1, the RAN node (gNB 214) may use the RRC connection to configure measurement/reporting in L-UE 402 and M-UE(s) 406. M-UE 406 can either report the measurements directly to RAN (1102 in FIG. 11A) or indirectly via L-UE 402 using PC5-RRC (1103 and 1104 in FIG. 11B). When at least one of the UEs is in Mode 1 (either L-UE 402 or M-UE 406) and others in Mode 2, the RAN node 214 may use the RRC connection to configure measurement/reporting for the UE group via the Mode 1 UE. This enables the Mode 2 UE to be configured by the Mode 1 UE and report the measurements (to RAN 214) indirectly via the Mode 1 UE using PC5-RRC. When all UEs in the UE group are in Mode 2, the RAN node 214 may configure the UEs during registration, and while in the coverage case, sense, store and report measurement results as accumulated statistics.

In the case when both L-UE 402 and M-UE(s) 406 are in Mode 1, the interference mitigation and congestion control are handled by RAN for both L-UE 402 and M-UE(s) 406 as part of the resource allocation procedure, with the awareness of UE group context (i.e. sent in Group Assistance Information in RRC) which may include attributes such as the location/position of UE in the UE group and transmission timing. In the case when at least one of the UEs in the UE group is in Mode 1 and others in Mode 2, interference and congestion are mitigated by both the RAN and the Mode 1 UE for UE group based on coordination via RRC and PC5-RRC with the awareness of UE group context. When all UEs in UE group are in Mode 2, interference and congestion control are handled by both the L-UE 402 and M-UE 406 based on sensing and local coordination via PC5-RRC.

Resource allocation in UE Groups will now be discussed.

Figure 12:
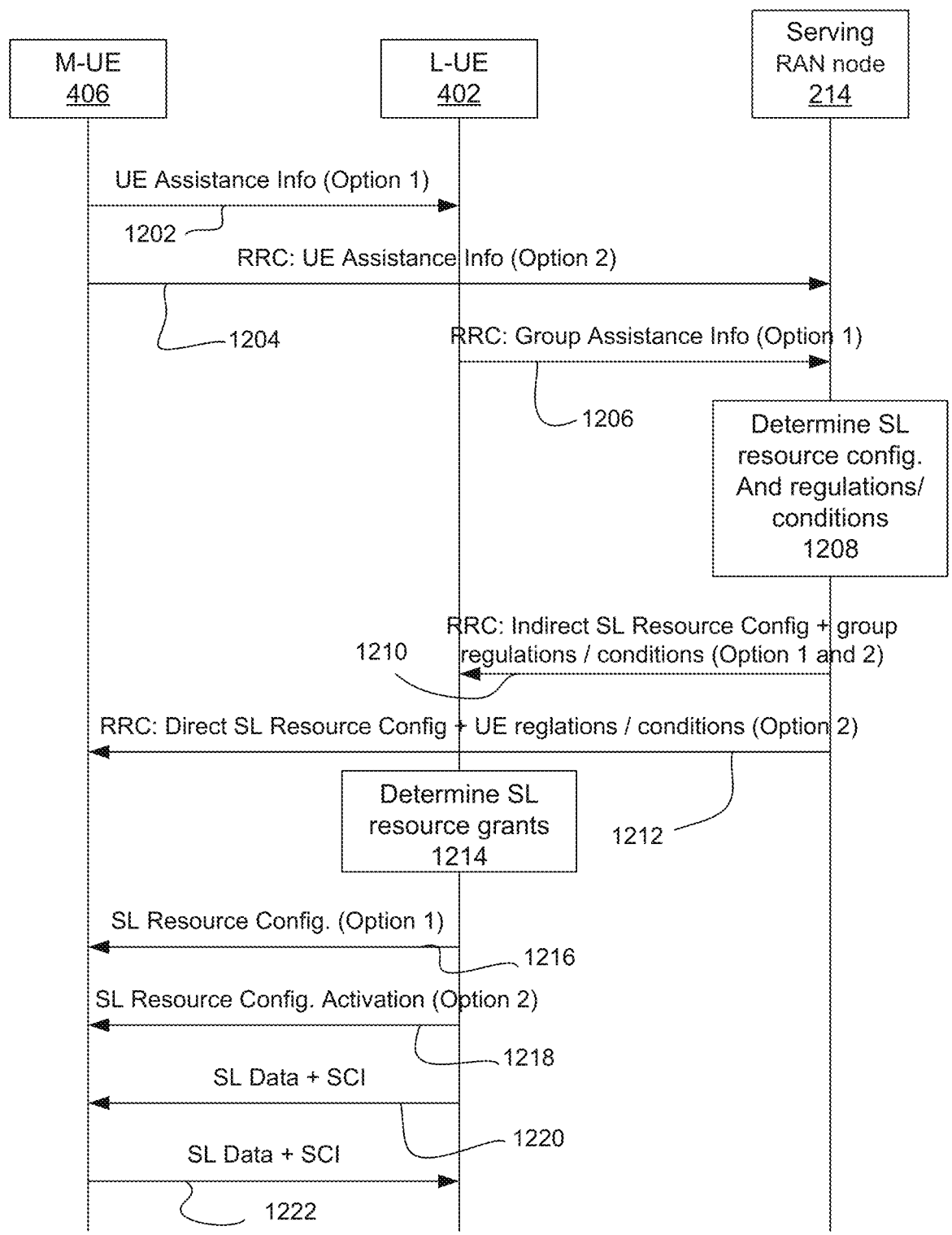
FIG. 12 is an illustration of a procedure for Mode G(a) resource allocation, according to an embodiment of the present disclosure.

The SL resources (i.e. RP(s), SL-Carriers, SL subchannels, configured grants (CG)) for usage within the UE group 401 can be supported in Mode G(a) 1002 (Equivalent of Mode 1) or in Mode G(b) 1004 (equivalent of Mode 2). FIG. 12 is an illustration of the procedure for Mode G(a) resource allocation, according to an embodiment of the present disclosure. The procedure for Mode G(a) 1002 resource allocation at L-UE 402 comprises of the following. The L-UE 402 receives UE assistance information (UAI) 1202 from each M-UE 406 in UE group 401, where the UAI may contain the resource request for configured grant (i.e. payload, duration, periodicity, QoS). The L-UE 402 may update the UE Group context, which can include determining the aggregated communication pattern and resource usage information. The L-UE 402 sends the Group Assistance Info (GAI) 1206 to gNB 214, where the GAI is determined based on UE Group context and may contain the aggregated resource request from all UEs in UE group. The serving gNB 214 determines 1208 SL resource configuration and regulations or conditions. The L-UE 402 receives the resource configuration, including regulated (conditional) resource grants 1210 for UE group usage from gNB 214, where the regulations or conditions may include thresholds for activating/deactivating the resource grants (e.g. SL-RSSI, CBR) and time duration or geo-area usage restrictions. The L-UE 402 determines 1214 the resource grants for usage in UE group according to the provided regulations/conditions and UE Group context. The L-UE 402 then sends 1216 or activates 1218 the configured resource grants intended for the M-UEs 406 for intra-UE group transmissions, where the activation message 1218 to the M-UE(s) 406 may be sent in PC5-RRC or in SCI or in a MAC CE. Note that the resources for the UE group may be received from the RAN node 214 by the Mode 1 UE in DCI as dynamic grants, which are subsequently relayed by the Mode 1 UE to other Mode 2 UEs in SCI.

The assisted resource allocation scenario, where the L-UE 402 assists the resource allocation for M-UE(s) 406 in UE group, may apply when the L-UE 402 is in Mode 1 and the M-UE(s) 406 are in Mode 2. The same procedure also applies when at least one of the M-UE(s) 406 in the UE Group is in Mode 1 and the L-UE 402 is in Mode 2. If the resources obtained from gNB 214 are dynamic resource grants, the authorized Mode 1 UE may apply L1 techniques, such as power control and adaptive MCS, based on the SL channel/loading information, when indicating the dynamic resources to the Mode 2 UEs in SCI. If the resources are configured grants (CGs), based on the UE group context (e.g. transmission periodicity), the gNB 214 configures the CGs intended for the UE Group to the Mode 1 UE in RRC. Subsequently, the Mode 1 UE may configure the CGs in Mode 2 UEs via PC5-RRC or MAC CE, followed by transmission of the message to activate/deactivate the CG via PC5-RRC or MAC CE or in SCI. In the case when both L-UE 402 and M-UE(s) 406 are in Mode 1, the CGs intended for the UE group may be provided to either one of the Mode 1 UEs, with the awareness of the UE group context (i.e. UE Group ID) and SL channel/loading information. Subsequently, the gNB 214 may send the CG activation/deactivation message directly to the UEs in RRC or DCI or MAC CE in the Uu interface.

An alternative method for Mode G(a) resource allocation is for the individual M-UE(s) 406 in Mode 1 with RRC connection to gNB 214 to directly provide the UAI (containing request for configured grant) and group association context (i.e. Group ID and L-UE ID) to the gNB 214 in RRC message 1204. Based on the resource request, the gNB 214 may provide the configured resource grants (CGs) directly 1212 to the M-UE(s) 406 while the regulations/conditions to activate/deactivate the resource grants may be given to the L-UE 1210. An M-UE 406 in a UE group may be configured with multiple RPs for Tx and Rx in SL. The L-UE 402 may evaluate the conditions based on the measurement reports provided by the M-UEs 406 and local sensing, prior to sending the trigger message to the M-UE(s) 406 to activate/deactivate the previously configured resource grants. Additionally, each of the configured resource grants (for RPs) may be associated with a timer to indicate the validity of the activated RP such that the RP is deactivated automatically after timer expiry. Similar triggering mechanism to rapidly switch between different configured RPs by activating/deactivating the configured resource grants may be performed by the RAN node 214 for Mode 1 UEs. In this case, the trigger message (containing the RP identifier) may be sent by the RAN node 214 to M-UE 406 either in RRC signaling, DCI or in a MAC CE (for M-UEs 406 with DRB). However, if the L-UE 402 is also configured to send the trigger message to M-UE 406, the RAN may either have to indicate to the L-UE 402 the updated RP activation/deactivation status or provide a criteria to the M-UE 406 (during RP configuration) to locally make RP usage decision by combining the trigger messages received from both L-UE 402 and RAN node 214. The combining of the trigger messages may be performed based on a set of rules (e.g. AND rule, OR rule, XOR rule). For example, when following the 'AND' rule, the activate message ('1') from RAN and activate message ('1') from L-UE 402 for RP (ID) A will be combined to activate the resource from RP A. Likewise, the activate message ('1') from RAN and deactivate message ('0') from L-UE 402 for RP (ID) A will be combined to deactivate the resource from RP A. Alternatively, when following the 'OR' rule, the activate message ('1') from RAN and activate message ('1') from L-UE 402 for RP (ID) B will be combined to activate the resource from RP B. Likewise, the activate message ('1') from RAN and deactivate message ('0') from L-UE for RP (ID) B will be combined to activate the resource from RP B.

Figure 13:
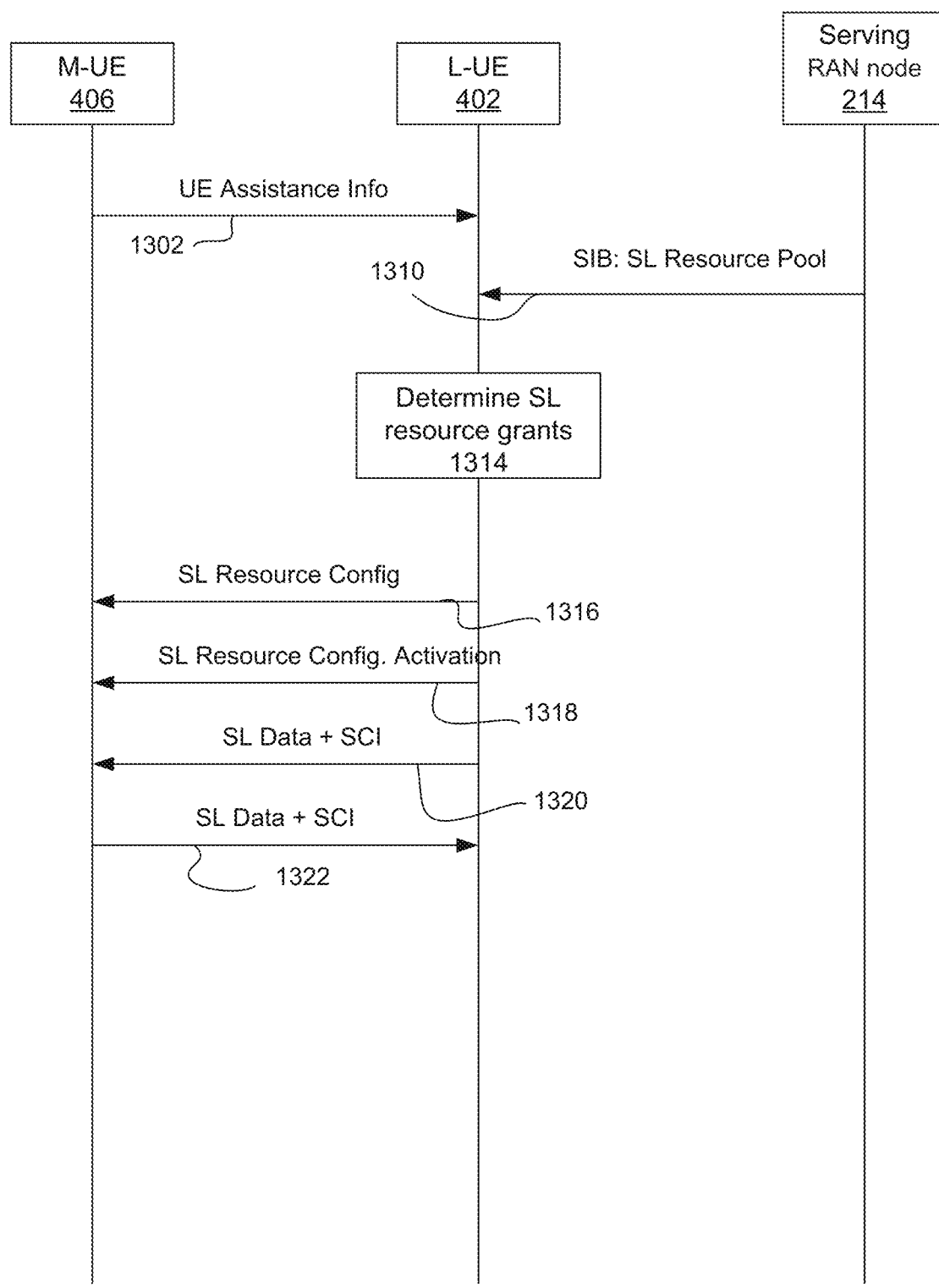
FIG. 13 is an illustration of a procedure for Mode G(b) resource allocation according to an embodiment of the present disclosure.

FIG. 13 is an illustration of the procedure for Mode G(b) resource allocation according to an embodiment of the present disclosure. In the case when all UEs in the UE group are in Mode 2, then either L-UE 402 or M-U(s) 406 may identify the SL RPs from SIBs (in coverage) or pre-configured RPs (in out-of-coverage) and perform sensing to determine SL resources for UE group. The procedure for Mode G(b) resource allocation, applicable when all UEs are in Mode 2, at L-UE 402, may comprise of the following. The L-UE 402 may receive UE assistance information (UAI)

1302 from each M-UE 406 in UE group, where the UAI may contain the resource request for configured grant (i.e. payload, duration, periodicity). The L-UE 402 may update UE Group context, which can include aggregated communication pattern and resource usage information. The serving gNB 214 sends the SIB, which may comprise the SL resource pool 1310 to L-UE 402. The L-UE 402 may access the SIB transmitted by gNB 214 to identify the regulated resource pool for UE group usage. The L-UE 402 may determine resource grants for usage in UE group according to the provided regulations and UE group context. The L-UE may send the resource grants 1316 and activation 1318 intended for the M-UEs 406 for intra-UE group transmissions.

The SL resource allocation using configured Geo-areas/zones will now be discussed.

An alternative SL resource allocation method involves the RAN configuring/dimensioning different SL resource zones, which can then be allocated or preconfigured in the individual UE, for example UE 502, or UE Groups, for example UE groups 401, based on the UE's/UE group's service attributes such as UE location, UE velocity, UE mobility pattern and QoS requirements. The method for using configured geo-area/zone for SL resource allocation applies for individual UEs 502 (in Mode 1 and Mode 2) and UE groups 401 in all scenarios where the UEs in UE groups can be all in Mode 1, Mode 2, or at least one of them in Mode 1 and the others in Mode 2.

The configured geo-area/zone for SL resource allocation or equivalently known as the configured SL map, applies in the same manner as SL configured grant, where the UE is provided with a set of resources/RPs that can be used for SL transmission for a validity time duration longer than that of the dynamic grant. However, in addition to the validity time duration, the configured SL map may also comprise a validity (geographic) location associated with one or many RPs. Once the UE is provided with the configured SL map by the RAN, indicating the mapping between the UE's location-time and resources/RPs, the UE may operate without relying on RAN for determining the resources for SL transmissions. The configured SL map may be supported in 2 scenarios, namely a dedicated SL map and common SL map. In other words, the SL map includes validity conditions include conditions for using sidelink resources of the sidelink resource grant based on a validity time duration and a validity location area. Accordingly, a UE can utilize the SL resources of the sidelink resource graph provided the current time and the location of the UE area are valid (i.e, satisfy the conditions contained within the SL map).

In the dedicated SL map scenario, applicable for Mode 1 UEs/UE groups, the UE may be provisioned via RRC with a configured SL map which may comprise a set of non-overlapping and non-interfering time-frequency resources/RPs dedicated only to the requesting UE (or equivalently UE group). The UE may determine the resources for performing SL transmissions from the configured SL map based on its current location and time. The UE may also follow the rules/regulations/conditions configured along with the SL map in cases when the Uu connection is unavailable (out-of-coverage) or during RLF. The RAN may determine the mapping between location-time and SL resources/RPs based on the UE's AS-layer traffic attributes (e.g. traffic volume, periodicity) provided in UE assistance information (during RRC resource request) and other higher layer information (e.g. expected UE mobility path and trajectory). The RAN may also update the configured SL map at any given time via RRC if the RAN becomes aware of new AS layer information (e.g. change in load, channel conditions or interference) or HL layer information (e.g. change in mobility path) that may affect the UE.

In the common SL map scenario, applicable for Mode 2 UEs/UE groups, the SL map (common to all UEs) may either be indicated in the SIB or pre-configured in the UEs. In this scenario, the same/common SL map will be used by either one or many UEs, resulting a potential contention for the same set of resources/RPs. To resolve the contention, the UE may need to perform sensing and reservation of the resources/RPs (similar to Mode 2 operation), either autonomously or with assistance from RAN or other UEs, prior to performing SL transmission. However, since the sensing/reservation is localized to the current geo-area/zone, the time duration required for sensing and resolving the contention can be much shorter than the conventional Mode 2 operation.

A cell under the control of a gNB 214 can be configured with multiple SL geo-areas/zones (Area IDs), where the dimensions and shape of each SL geo-area is up to the RAN to configure. For example, a geo-area with a circular/hexagonal shape can be configured based on: the coordinates of the center, and the radius. A square/rectangular geo-area may be configured based on the coordinates of the vertices and length of edges. In this case, the mapping function (e.g. modulo operation) to map from the location of the UE (coordinates determined based on RAN assisted positioning or GNSS) to the geo-area ID may be provided by the RAN to the UE during initial registration.

Each geo-area can be associated with one or multiple resource pools (RPs). A cluster of adjacent geo-areas can be combined into a SL RP Zone and associated with one or multiple RPs. Each SL RP Zone may be provided to different UEs/UE groups corresponding to its service class based on the service attributes.

Figure 14:
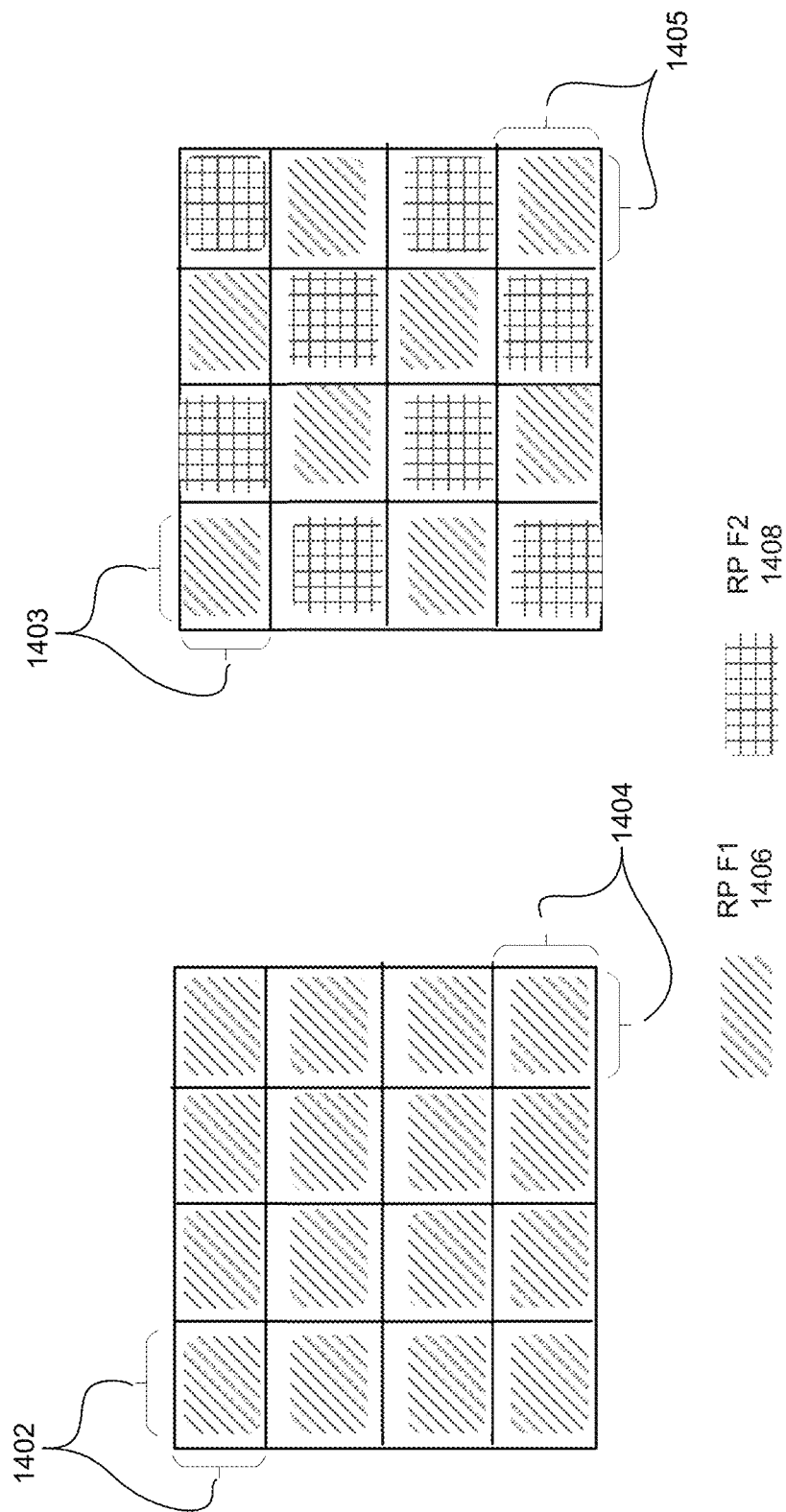
FIG. 14A is an illustration of a multi-zone RP with a reuse factor of 1 and 1 geo-areas per RP zone (Option 1(a)), according to an embodiment of the present disclosure.
FIG. 14B is an illustration of a multi-zone RP with a reuse factor of 2 and 1 geo-areas per RP zone (Option 1(b)), according to an embodiment of the present disclosure.

FIG. 14A is an illustration of a multi-zone RP with a reuse factor of 1 and 1 geo-areas per RP zone (Option 1(a)), according to an embodiment of the present disclosure. FIG. 14B is an illustration of a multi-zone RP with a reuse factor of 2 and 1 geo-areas per RP zone (option 1(b)), according to an embodiment of the present disclosure. The following options describe different SL RP zone dimensioning options.

In Option 1, referring to FIG. 14A and FIG. 14B, each SL RP zone 1402 and 1403 may be associated with one or a small number of fixed size geo-areas 1404. The assignment of Option 1 may be suitable for small-sized UE groups with low mobility. However, given the small size for the RP zone 1404 and/or 1405, a mobile UE group has to undergo high number of resource pool reselection events, involving updating the sensing result (for Mode 2) and resource re-allocation (for Mode 1). Option 1(a), FIG. 14A, uses a high frequency reuse factor of 1, thereby provides high area spectral efficiency. Since the same set of RP(s) 1406 are reused more frequently in small coverage areas 1404, Option 1(a) is appropriate for UE groups with small dimensions where the UEs are located in close proximity (e.g. industrial robots). However, given the high reuse factor, the interference from nearby RP zones may also be high, which may be mitigated via RRC for UE groups in Mode 1. As an alternative, UE groups requiring higher reliability may be configured with Option 1(b), FIG. 14B, which mitigates interference by increasing the RP reuse factor at the expense of reduced area spectral efficiency.

A second option, having large SL RP Zone dimensioning will now be discussed.

Figure 15:
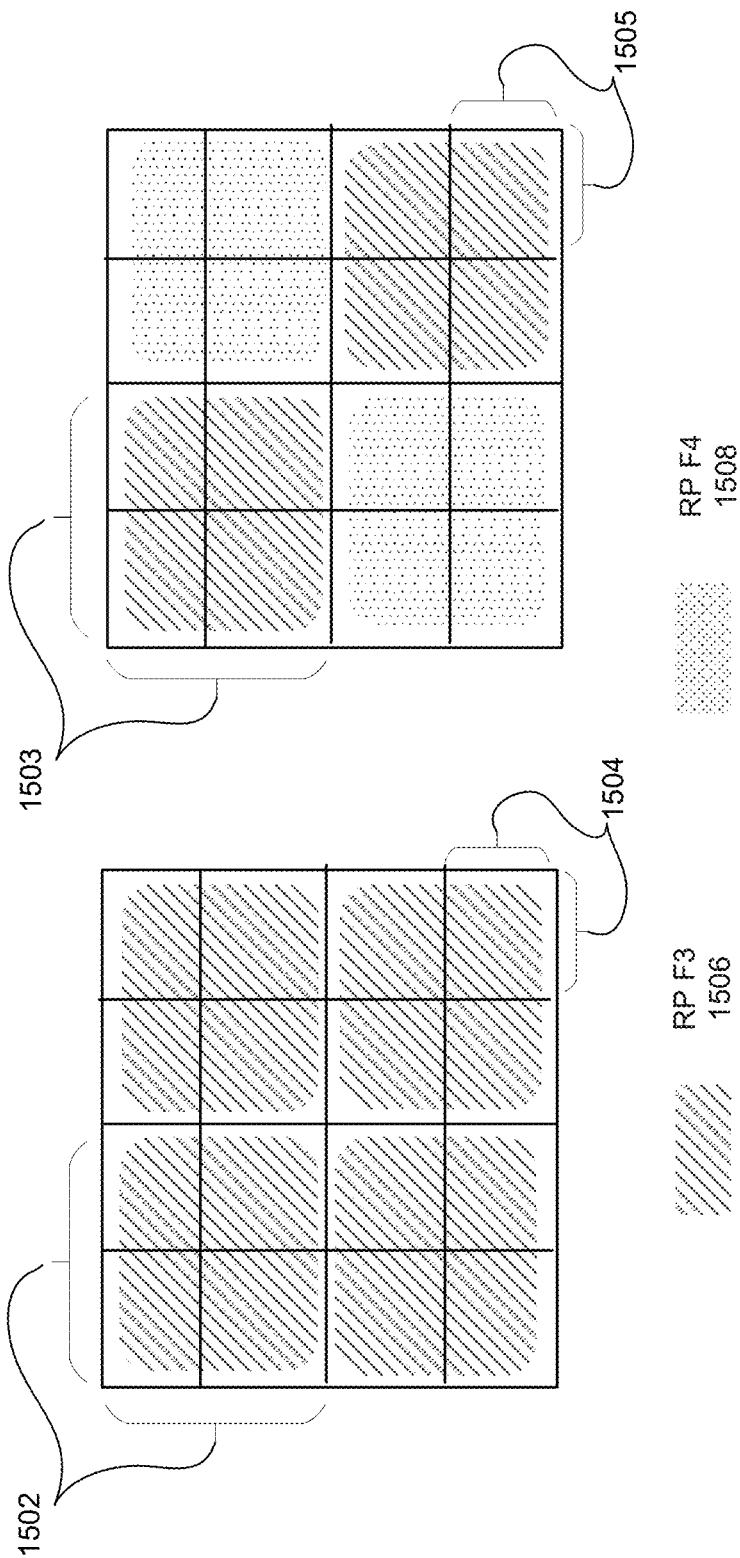
FIG. 15A is an illustration of a multi-zone RP with a reuse factor of 1 and 4 geo-areas per RP zone (option 2(a)), according to an embodiment of the present disclosure.
FIG. 15B is an illustration of a multi-zone RP with a reuse factor of 2 and 4 geo-areas per RP zone (option 2(b)) according to an embodiment of the present disclosure.

FIG. 15A is an illustration of a multi-zone RP with a reuse factor of 1 and 4 geo-areas per SL RP zone (option 2(a)), according to an embodiment of the present disclosure. FIG. 15B is an illustration of a multi-zone RP with a reuse factor of 2 and 4 geo-areas per SL RP zone (option 2(b)) according to an embodiment of the present disclosure.

In Option 2, referring to FIG. 15A and FIG. 15B, each SL RP zone 1502 and 1503 may be associated with high number of fixed size geo-areas 1504 and 1505. The assignment of Option 2 may be suitable for either small-sized UE groups with high mobility or large-size UE groups with low mobility. Given the large size for the SL RP zone 1502 and 1503, a mobile UE group need not undergo high number of resource pool reselection events, for both Mode 1 and Mode 2 UEs. In Option 2(a), referring to FIG. 15A, high frequency reuse factor of 1 provides high area spectral efficiency. However, the interference from large size or fast moving UE groups in adjacent RP zones may also be high. In this case to mitigate interference, the UE groups may be assisted by RAN via RRC to reselect the resource pool 1506 or perform resource coordination (via PC5-RRC) by locally activating/deactivating configured RPs. As an alternative, Option 2(b), referring to FIG. 15B may be applied for UE groups requiring higher reliability by increasing the RP reuse factor and reducing potential interference, at the expense of reduced area spectral efficiency.

Figure 16:
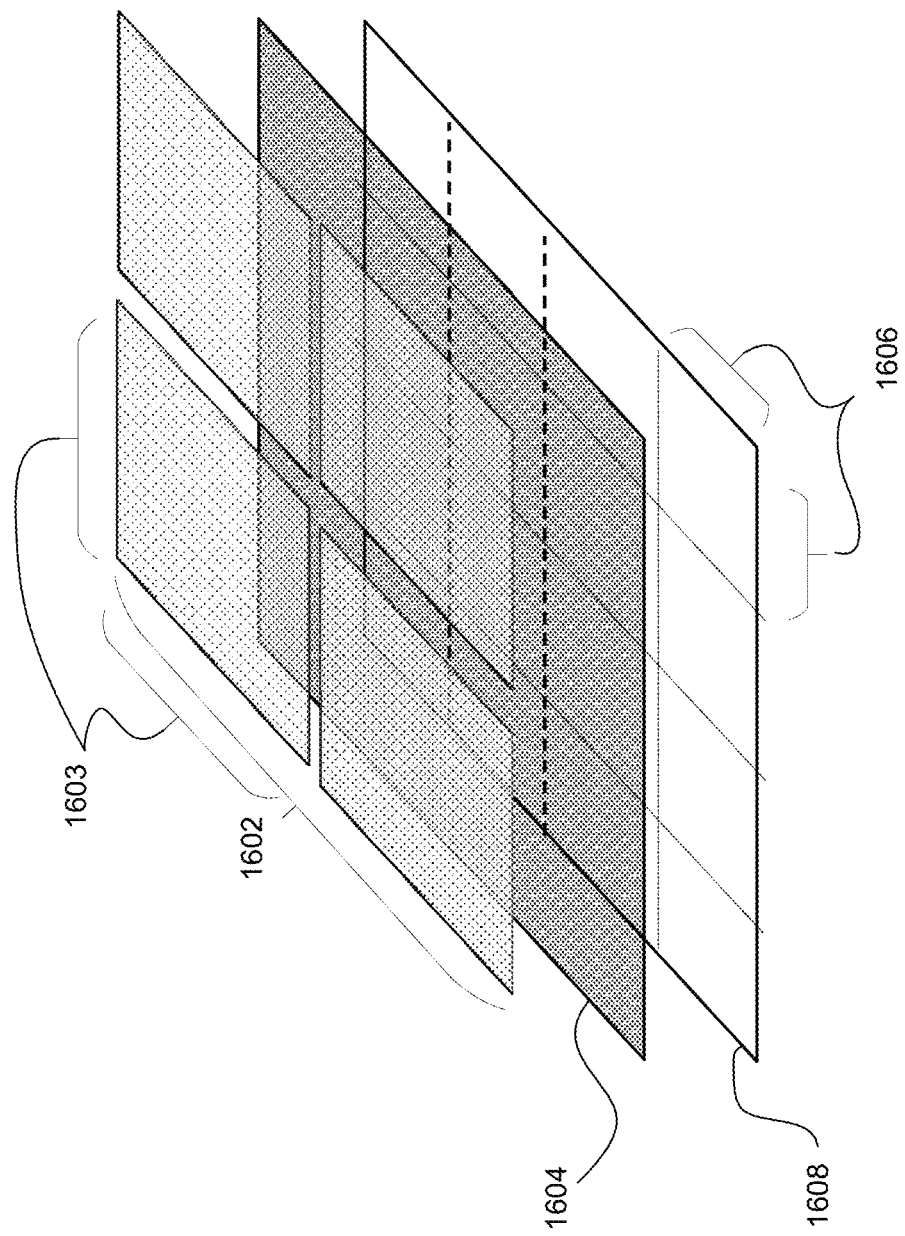
FIG. 16 is an illustration of support for multiple overlaid SL RP zones with different zone RP reuse factor, according to an embodiment of the present disclosure.

FIG. 16 is an illustration of support for multiple overlaid SL RP zones with different zone RP reuse factor, according to an embodiment of the present disclosure. As an example illustrated in the FIG. 16, the top layer 1602 indicates a RP zone 1: with a reuse factor of 1 with 4 geo-areas 1603 per RP zone, the middle layer 1604 indicates a RP zone 2: with a reuse factor 1 with 16 geo-areas 1606 per zone, and bottom layer 1608 is the base geo-area grid, according to an embodiment of the present disclosure.

In regards to SL RP zones, each zone 1602, 1604 may be dimensioned and customized to support certain UE group service class (identified by UE group ID or service class ID) or use case scenario. The general design principles for SL RP zone include: supporting simultaneously multiple overlaid RP zones 1602, 1604 over a grid of fixed sized geo-areas 1603 and 1606 and customizing the size and shape of SL RP zones based on higher layer (e.g. service class ID, L2 ID, HL/CN UE Group ID) and AS-layer attributes (AS-layer/RAN UE Group ID). The UE group higher layer (service) attributes include: the group size, velocity, group QoS, priority; and while the AS-layer attributes include loading conditions (CBR), channel conditions, UE/UE group's resource allocation mode (Mode 1 and Mode 2). The following Table 3 illustrates the mapping between the UE group service classes to the SL RP zone attributes. In this case, a UE group may indicate its service class ID/L2 ID in RRC (in Mode 1) to RAN or pre-configured (in Mode 2) in UE for determining the assigned SL RP zone configuration (in dedicated RRC for Mode 1 and in SIB for Mode 2).

scenario, an L-UE (e.g. L-UE 402) may need to determine the RPs for the UE group 401 based on local loading. Regulating/conditioning the use of RP by controlling the association between RPs and geo-areas can be useful for improving spectral efficiency and minimizing interference in SL.

With a regulated/conditional RP, a UE/UE group (e.g. UE group 401) can be scheduled such that it transmits or receives in the RPs that are valid only within a certain active frequency range, time duration or geo-area range. The UE/UE group may be configured with multiple RPs for transmission and reception in SL. After providing the RP configuration, the RAN or an L-UE (e.g. L-UE 402) may send activation/deactivation messages to its M-UEs (e.g. M-UEs 406) to rapidly switch between the RPs. A UE/UE group may select the SL (Tx or Rx) RP(s) based on the geo-area where it is located. A Tx UE shall not transmit in the SL UP and CP channels (PSCCH or PSCCH) outside an active RP and geo-area and likewise, an Rx UE is not expected to receive in SL UP and CP channels (PSSCH, PSCCH) outside an active RP and geo-area. A UE/UE group may be configured to perform RRM measurements or send beacon/SRS outside of its active RP when configured by RAN or an L-UE capable of configuring the UE/UE group as discussed herein. Since each regulated RP may also be associated with certain channel condition thresholds and loading thresholds, a UE determines the corresponding Tx/Rx parameters based on the measured channel/loading conditions associated with its geo-area ID and RP(s).

Dynamic resource map design will now be discussed.

The Dynamic Resource Map (DRM) is a network function that is maintained and managed by the RRM entity, either in RAN (for example DRM 420) or in an L-UE such as L-UE 402 (for example L-DRM 422) in a UE group 401, and interacts with a machine learning (ML) agent to provide SL resource pool (RP) attributes based on usage location and time duration. Typically, the DRM can be structured to indicate all of the accessible RPs in an area-time grid and contains the SL sensing/measurement information of all UEs in a particular cell. Within the DRM, an RP X={$x_1$ . . . $x_i$, . . . $x_n$} can be accessed with the following tensor structure:

X=f(geo-area ID, Time duration, L2 ID, Tx/Rx), where each RP attribute X, $x_1$ may represent: PRB set (subchannel) {start, end} for data and SCI; time slots {start, end}; periodicity; power limit; and numerology.

Additionally, the state of an RP can be accessed with the following tensor structure:

Y=f(X, geo-area ID, Time duration), where the attributes of Y, $y_i$ are: Channel state (SNR, CSI, SL-RSSI, SL-RSRP) and Loading state (CBR, CoR).

TABLE 3

Mapping between service class ID and attributes to SL RP zone configuration.

| Service Class | Resource Pools | Geo-Areas per zone | Reuse factor | Priority | Reliability | Mobility (Speed) | Suitable RA Mode | Configuration |
|---|---|---|---|---|---|---|---|---|
| 0 (default) | R1 | 1 | 1 | 0 | 0 | Low | 1 | Option 1(a) |
| 1 | R1, R2 | 1 | 2 | 1 | 1 | Low | 1 | Option 1(b) |
| 2 | R3 | 4 | 1 | 2 | 2 | High | 2 | Option 2(a) |
| 3 | R4, R5 | 4 | 2 | 3 | 3 | High | 2 | Option 2(b) |

Each RP, 1406, 1408, 1506, 1508, in a given SL RP zone, 1402, 1403, 1502, 1503, can be reserved for certain duration on a per-UE or per-UE group basis for different connections (i.e. L2 IDs) and service attributes (i.e. priority). The number of RP(s) associated with a SL RP zone may not be equal and can be modified based on loading conditions. In UE group FIG. 17 is an illustration of dynamic resource map attributes according to an embodiment of the present disclosure.

The DRM may be accessed by all Mode 1 UEs in via RRC and Mode 2 UEs via (on-demand) SIB while in coverage. The DRM can be used as tool for supporting the configured SL map based resource allocation. In UE group scenario, an M-UE, such as an M-UE 406, may access the DRM via its L-UE, such as L-UE 402 over PC5-RRC. When accessing the DRM, a Tx UE can send a 'get' operation message, containing the input attributes and obtain the RP X to be used for transmission. Likewise, an Rx UE can send the input attributes in a get operation message and obtain RP X to be used for reception. For populating the DRM, the RAN or L-UE 402 can configure other UEs to make measurements and sense particular RPs in different areas (area IDs) and time durations. The measurement and sensing reports can then be sent to the DRM, via RAN node or L-UE 402, as a 'put' operation message. Additionally, the DRM may interact with RAN/L-UE 402 to configure probing messages for determining the resource usage, reservation and reliability of the channels and connections.

Figure 17:
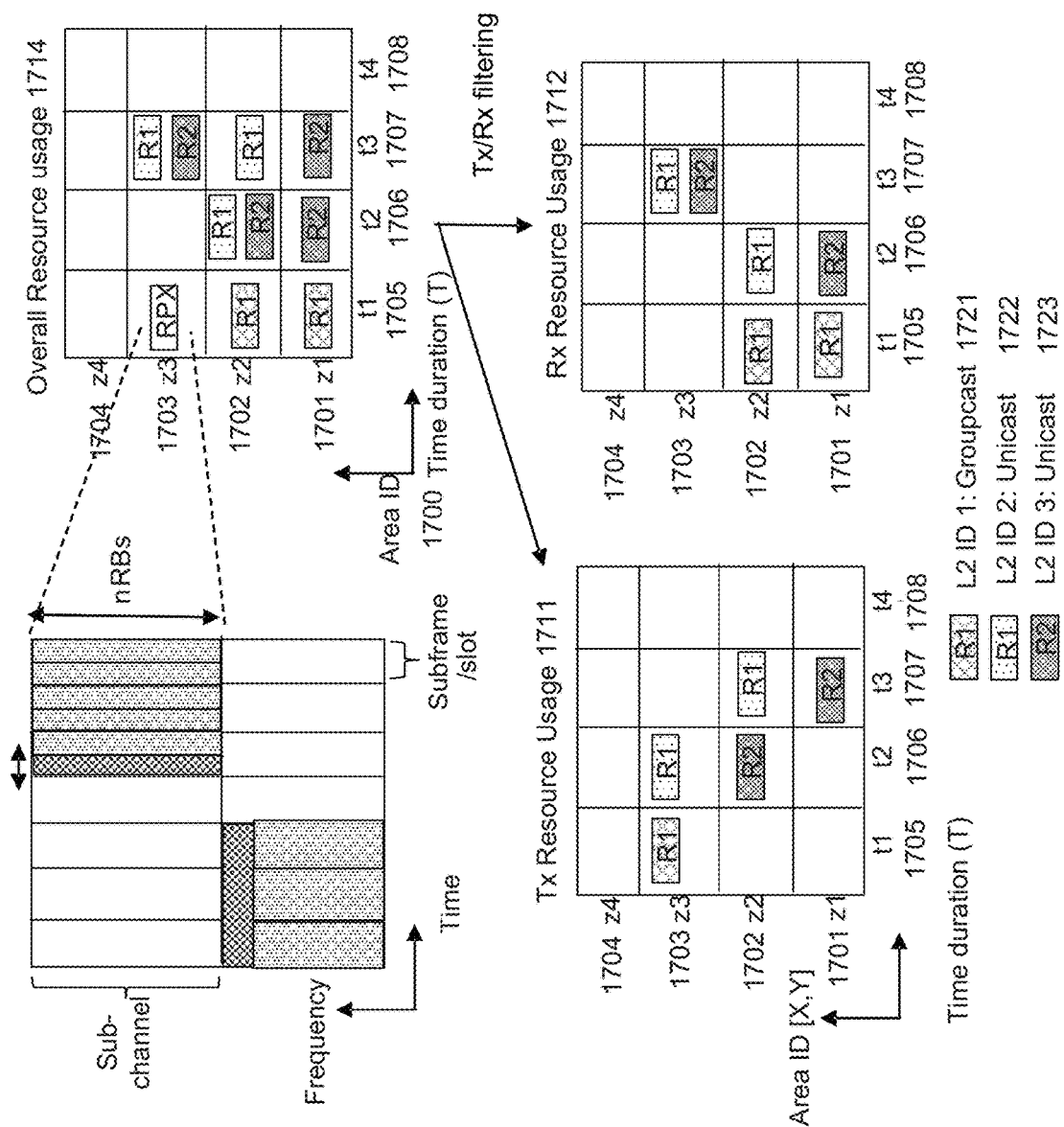
FIG. 17 is an illustration of dynamic resource map attributes, according to an embodiment of the present disclosure.

FIG. 17 provides a map that illustrates an overall resource usage of a Tx and Rx UEs in a location and time domain, as indicated by the Area ID and Time duration scale 1700. The area ID may comprise of 4 zones, z1 1701, z2 1702, z3 1703, and z4 1704, and 4 times t1 1705, t2, 1706, t3 1707, and t4 1708. The overall Resource Usage 1714 illustrates the Tx Resource usage 1711 and Rx Resource Usage 1712 for each Area ID and Time Duration. The map attributes further may comprise the RP for specific L2 ID and cast transmissions 1721, 1722, 1723.

The benefits of enhancing the capability of the RRM entities in RAN and L-UE 402 with DRM include providing assistance with resource allocation/forwarding, congestion control, mitigating interference on SL, minimizing signaling by incorporating data analytics and ML techniques, eliminating hidden node issues, and minimizing sensing for Mode 2 UEs.

To have accurate RP information at the cell/zone level (i.e. all area IDs managed in cell) related to channel and loading conditions, the DRM may have awareness of all existing UEs camping in the RP zone, new UEs entering RP zone and existing UEs leaving the RP zone. For these 3 UE sets, the DRM may also access, directly or indirectly, the higher layer information related to communication patterns (i.e. transmission range, timing), location of UEs (at the granularity of geo-area ID), mobility information (i.e. direction, velocity) and QoS requirements to determine and predict the expected resource usage, loading and potential interference conditions at future time durations. In the direct access case, the DRM may interact with higher layer functions (in CN) and application function to determine the higher layer attributes. In the indirect case, data analytics and ML techniques may be applied to estimate the higher layer attributes based on training and observation of AS-layer attributes. In the case when the UE is to traverse between multiple RP zones within a cell, the higher layer UE group context can be used to request and determine the RPs to use in the new RP zone. This capability can also be extended in mobility scenarios to provide support for advanced SL resource reservation or delayed SL resource release to L-UE 402/UE when crossing from the source cell to target cell.

Figure 18:
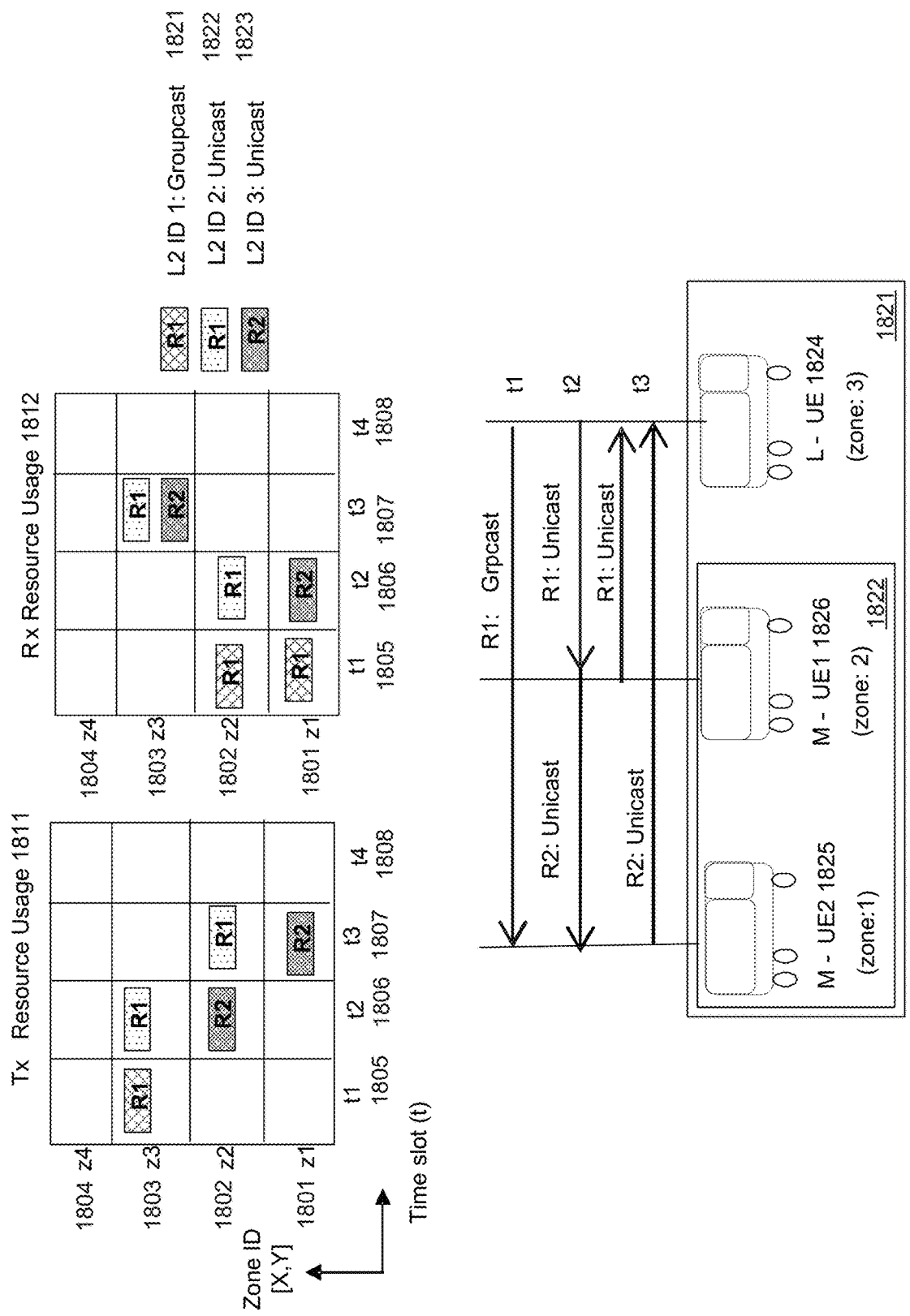
FIG. 18 is an illustration of a scenario (scenario 1) showing the usage of a DRM to support Tx/Rx RP indication for Vehicle Platooning, according to an embodiment of the present disclosure.
Figure 19:
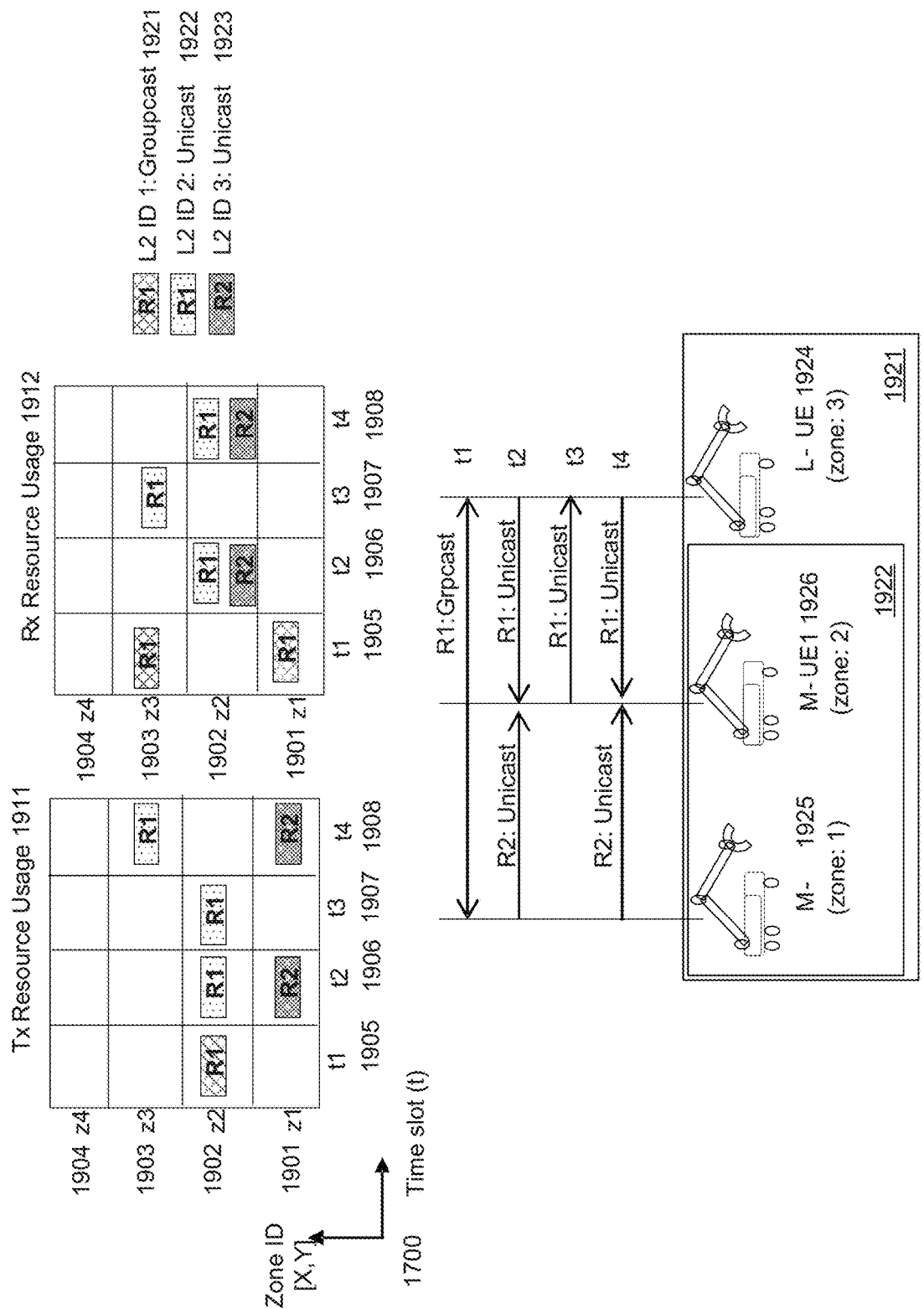
FIG. 19 is an illustration of a scenario (scenario 2) showing the usage of a DRM to support Tx/Rx RP indication for Autonomous Robots, according to an embodiment of the present disclosure.

FIG. 18 is an illustration of a scenario (scenario 1) showing the usage of DRM to support Tx/Rx indication for Vehicle Platooning, according to an embodiment of the present disclosure. FIG. 19 is an illustration of a scenario (scenario 2) showing the usage of DRM to support Tx/Rx RP indication for Autonomous Robots, according to an embodiment of the present disclosure. Referring to FIG. 18 and FIG. 19, the resource usage for both Tx 1811, 1911 and Rx 1812, 1912 comprising the RP for the L2 ID and cast types, 1821, 1822, and 1823 in FIGS. 18 and 1921, 1922, and 1923 in FIG. 19 are illustrated. The resource usage 1811, 1812 are based on the zone ID's 1801, 1802, 1803, 1804 and corresponding times t1 1805, t2 1806, t3 1807 and t4 1808. Further the Resource usage 1811 and 1812 are based on the UE group 1821 resource usage (the UE group 1821 comprising L-UE 1824 (which may be similar to L-UE 402) and M-UEs 1822 (which may be similar to M-UE 406). Similarly, the resource usage 1911, 1912 are based on the zone ID's 1901, 1902, 1903, 1904 and corresponding times t1 1905, t2 1906, t3 1907 and t4 1908. Further the Resource usage 1911 and 1912 are based on the UE group 1921 resource usage (the UE group 1921 comprising L-UE 1924 which may be similar to L-UE and M-UEs 1922, which may be similar to M-UE.

At the UE group level, any change in the UE group structure due to inter-group or intra-group operation may result in the DRM managed at the L-UE 402, for example L-DRM 422, (whether in a platoon L-UE 1824, scenario 1, as referred in to FIG. 18 or autonomous robots, L-UE 1924 scenario 2, in FIG. 19) to dynamically expand, contract and move with the UE group during mobility. The updates in the local DRM at L-UE 402, for example L-DRM 422, to reflect the change in the group's RP usage may be synchronized with the central DRM in RAN, for example DRM 420, in order to determine both short term and long-term resource usage at the cell level. The FIGS. 18 and 19 illustrate the RP information that can be derived from the DRM for different scenarios.

When ML-based data analytics is applied in DRM for predicting the SL resource usage, the update to the entries in the area-time tensor can be performed on the basis of a learning area where accuracy of learning within the area improves with higher amount of reported data. Since the UEs also provides its current location and the location of Tx UEs when reporting the sensing data to RRM (via RAN or L-UE 402), the DRM may store the interference and loading patterns based on UE's location and update the data with adjustments based on the L-UE's (e.g. lead UE or RSU) own measurement/sensing information. Additionally, the DRM may apply adjustments to the SL channel measurements (RSSI) such that a projected channel/interference condition can be determined for another UE at a different location based on its own location and measurements.

In another embodiment, the DRM can be used to extend the validity of the sensing information in UE groups. The sensing information (i e channel and loading conditions) acquired by all M-UEs 406 and L-UE 402 in a UE group has certain validity space pertaining to the time duration and geo-area where the sensing information is applicable. However, if the UE group were to move away from the validity space, then, either the sensing has to re-performed in the M-UE 406 or the L-UE 402 has to interact with another network entity (e.g. RAN node or other L-UEs) which has valid sensing information.

The sensing information may be stored at and managed by the DRM and accessed via RAN or L-UE 402. In order to support the interaction between the entities which maintain the sensing information, signaling to indicate the validity space (i.e. time duration and geo-area) when referring to the sensing result may be necessary. For example, when requesting for the sensing result, the requesting UE may provide the validity attributes (e.g. area ID, time duration) to the entity managing the sensing result. Likewise, the DRM may respond with the same validity attributes when responding.

As a way to eliminate sensing and to minimize the signaling for interacting with DRM, machine learning technique may be used such that an L-UE 402 may apply the existing sensing data and make changes to the validity attributes by extrapolation of the validity space. The task of machine learning technique here may include determining the states and the transition probabilities, particularly related to interference and loading information in a given set of time duration and geo-areas. Using ML techniques, such as supervised learning it should be possible to predict with certain accuracy the loading in a set of channels/RPs using the sensing data for other similarly applied channels/RPs. The learning tasks may be performed by inferring from higher layer information (e.g. road traffic info and time of day) to predict the CBR at new locations and by obtaining assistance from other RSU/UEs who have previous sensing information. In this approach, learning attributes may be transferred to other UEs/L-UEs that enter into the sensing zone and thereby allowing the L-UE 402 to augment the learning area and validity space. Similar learning techniques may also be used for determining the SL channel or configured resource to activate for transmitting or when making decisions locally at L-UE 402 for activating/deactivating packet duplication.

Also during mobility, the DRM maintained by L-UE 402 can be updated by exchanging the RP related information between L-UEs in different UE groups via PC5-RRC or PC5-S. When undergoing HO, the L-UE 402 as well as M-UEs 406 in Mode 1 may obtain the RPs attributes from the DRM via RRC. For Mode 2, the UEs may autonomously derive the RP information based on the UE location (geo-area IDs) and RP indications provided in SIBs (based on UE group service class to RP mapping).

UE group operations will now be discussed.

In general, the UE group operations can be divided into two categories: intra-group operations (e.g. joining, leaving, selection of L-UE, transferring L-UE role) and inter-group operations (e.g. merging, splitting). All UE group related operations are typically handled and managed at the higher layers (NAS in CN or application). For example, a vehicle platoon can merge into another existing platoon if certain higher layer UE group attributes are harmonized (e.g. both UE groups are travelling to the same geographical location). Likewise, a vehicle platoon may split if certain higher layer attributes diverge. Even in the case of inter group operations, a UE intending to join or leave a UE group should be initially authorized at the higher layers prior to applying the necessary AS-layer configuration such as providing/releasing the SL-RB configuration and resource grants. The modifications at the higher layer group attributes and topological changes may be reflected in equivalent change at the AS-layer (RAN and L-UE 402/M-UEs 406) to ensure that there is no interruption in the UE group resource management and group communications structure. The operations that are required to be performed at the AS-layer in response to higher layer group operations may include performing resource reconfiguration over PC5-RRC and determining new UE group context at the L-UE 402. For example, if an existing UE group is to merge with another UE group, the AS-layer UE group contexts may be transferred and merged at the new L-UE that handles the existing and merged UE groups. Likewise, when supporting a UE group splitting operation, the existing AS-layer UE group context is split and divided between the newly formed UE groups.

In order to support the AS-layer modifications, a procedure similar to the procedure used for making the higher layer selection and authorization of the L-UE visible to the AS-layer based on the service/L-UE ID may be used, whereby, the higher layer UE group operations may also be made visible to the AS-layer. In this case, if the higher layer UE group operation message is sent over the PC5-S interface by the initiating UE, an equivalent message may also be generated at the receiving UE and sent over the PC5-RRC interface to the initiating UE to realize the intended operation at the AS-layer (e.g. resource reconfiguration, UE group context transfer).

After the initial establishment of the PC5-RRC connection between the UEs, the higher layer UE group operation message at the initiating UE can be sent to the receiving UE either as an equivalent PC5-RRC message (first scenario) or in a PC5-RRC container (second scenario).

In the first scenario, the higher layer (NAS or application) in the initiating UE is required to trigger and map the higher layer message to an equivalent PC5-RRC message. To enable this, a NAS layer in the user plane may be used between the Application and L2 protocol stack (AS-layer) in the initiating UE that translates from the higher layer message (e.g. group operation instruction) to a PC5-RRC message. The NAS layer can be configured by CN during initial registration procedure to support certain marking/coding rules to indicate in the packet header with markings. The markings can then be used at the RAN configured PC5-RRC layer to translate the higher layer packet to an equivalent PC5-RRC message. At the receiving UE, the PC5-RRC layer and NAS layer configured with the same mapping rules can map the received PC5-RRC message to the equivalent AS-layer and higher layer message. Since the same PC5-RRC message is received and decoded at the PC5-RRC and application of the receiving UE, a single message can be used to make the modifications both at the AS-layer and higher layer.

In the second scenario, the higher layer message may be sent by the initiating UE as a bit-string in a PC5-RRC container, where the message is appended to a PC5-RRC packet header. At the receiving UE, the message is sent to the higher layer after removing the header at PC5-RRC layer. This is then followed by interaction between higher layer and AS-layer at the receiving UE to perform the corresponding UE group operation.

Figure 20:
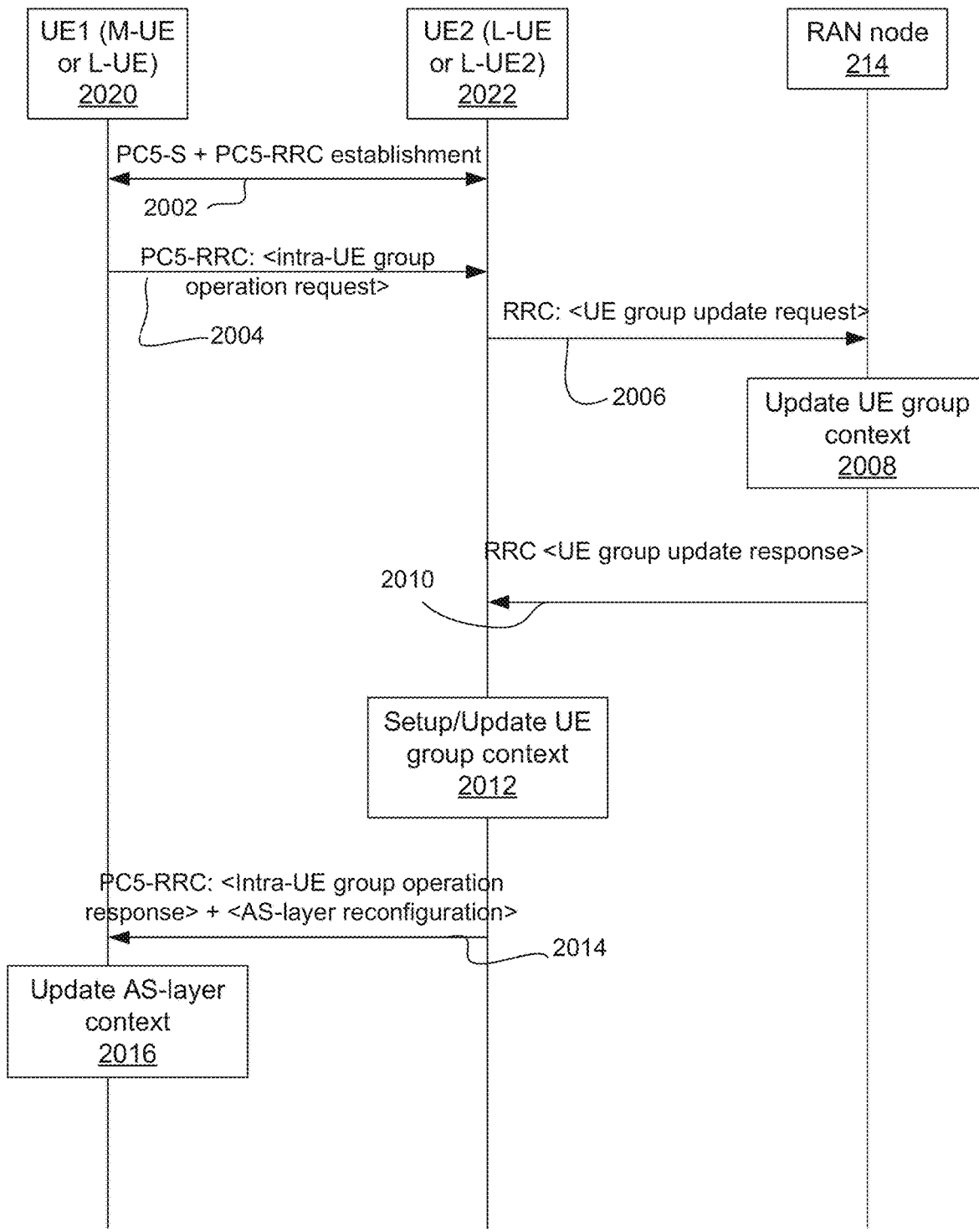
FIG. 20 is an illustration of a procedure for supporting UE group operation (intra-group and inter-group), according to an embodiment of the present disclosure.

FIG. 20 is an illustration procedure for supporting UE group operation (intra-group and inter-group), according to an embodiment of the present disclosure. The procedure for supporting UE group operation (intra-group and inter-group), referring to FIG. 20, is as follows. The procedure applied at the L-UE 2022 comprises, initially receiving a UE group operation request message 2004 (after establishing the PC5-S and PC5-RRC 2002) from a UE 2020 (which may be an M-UE 406 or an L-UE 402), where the UE group operation message can be an intra-UE group operation for a UE join request or a UE leave request or an inter-UE group operation for a UE group merge request or a UE group split request. The UE group operation request message can be sent via PC5-S interface or PC5-RRC interface 2002. Next, the L-UE 2022 may perform the corresponding AS-layer UE group operation, where the AS-layer operation can be determined based on interaction with RAN node 214 on Uu interface and the AS-layer operation include updating AS-layer UE group context. The L-UE 2022 sends the UE group update request 2006 via RRC to the serving gNB 2014. The L-UE 2022, receives the UE group update response 2010 via RRC from gNB 214, after the gNB 214 updates the UE group context 2008. The L-UE 2022 then sets up/updates the UE group context 2012, and sends the UE group response message 2014 to UE 2020, where the UE group response message can be for an intra-UE group operation or inter-UE group operation. The UE group response message includes AS-layer reconfiguration and updated AS-layer UE context, which can be sent via PC5-S or PC5-RRC. The UE 2020 then updates the AS-layer context 2016.

Figure 21:
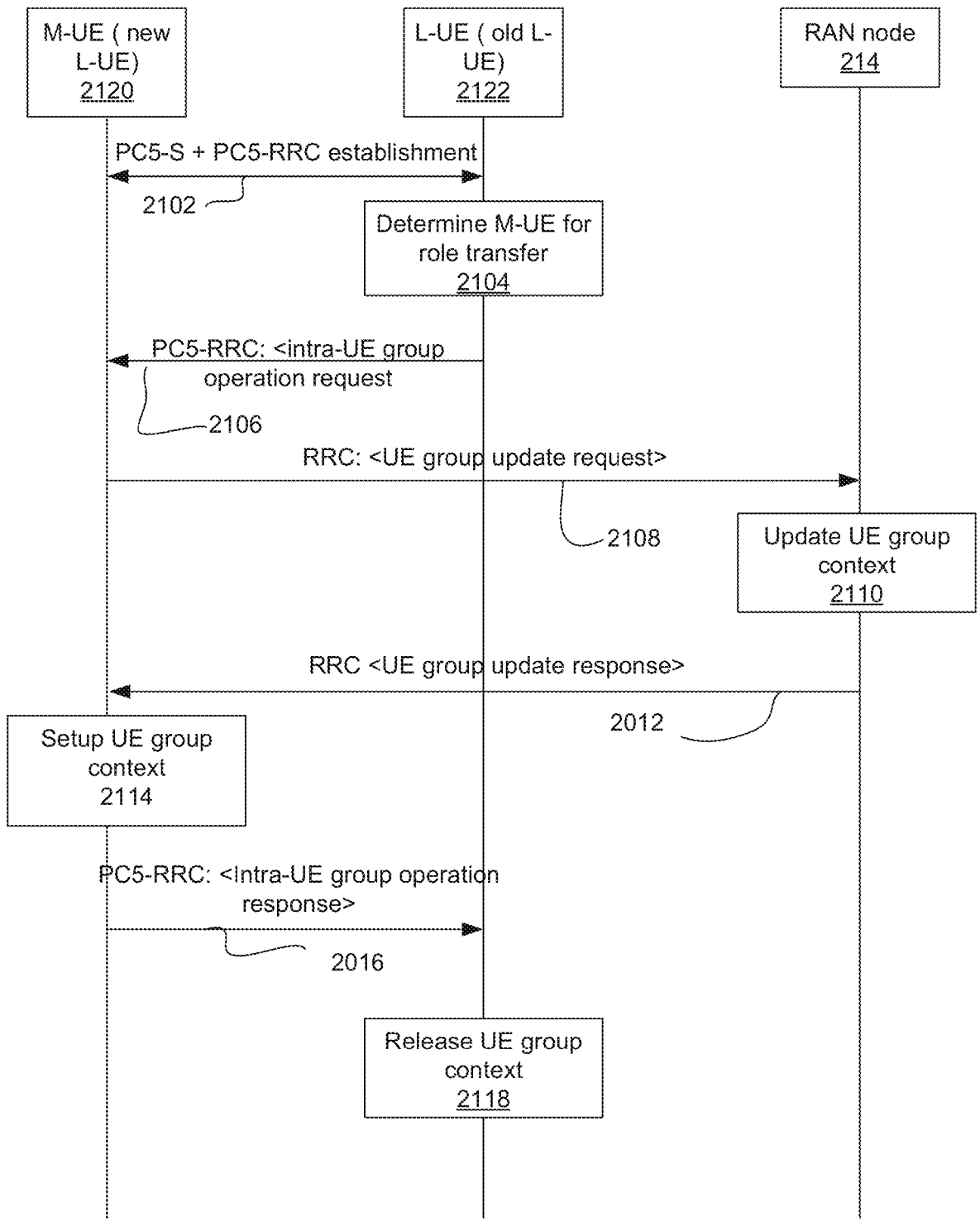
FIG. 21 is an illustration of a procedure for transferring the L-UE role to an M-UE as an intra-group operation, according to an embodiment of the present disclosure.

FIG. 21 is an illustration Procedure for transferring the L-UE role to an M-UE as an intra-group operation, according to an embodiment of the present disclosure. The procedure for transferring the L-UE 2122 (old L-UE) role to M-UE 2120 as an intra-group operation, referred to FIG. 21, is as follows. The intra-group operation involving the L-UE role transfer can be applied when an existing L-UE 2122 experiences RLF or leaves the UE group and, as a result, the RRC connection with the RAN may need to be transferred from the L-UE 2122 to an M-UE 2120. After establishing the PC5-S and PC5-RRC connections 2102 between the existing L-UE 2122 and an M-UE 2122, the L-UE 2122 determines 2104 the M-UE 2120 for L-UE role transfer. The M-UE 2120 receives an intra-UE group operation request 2106 for L-UE role transfer from L-UE 2122 in PC5-RRC, where the intra-UE group operation request may contain the required authorization parameters and UE capability information to operate as L-UE and UE group context. Next, the M-UE 2120 performs the AS-layer reconfiguration and establishes the UE group context, where the parameters for AS-layer reconfiguration and UE group context can be determined based on interaction with RAN node on Uu interface via RRC signaling. The M-UE 2120 sends the UE group update request 2108 via RRC to the RAN node gNB 214, where the gNB 214 updates 2110 the UE group context, and sends the UE group update response 212 via RRC to the M-UE 2120. The M-UE 2120 then sets up 2114 the UE group context, and in the final step 2016, the M-UE 2120 sends the intra-UE group response message to L-UE 2122 in PC5-RRC. The old L-UE 2122 then releases 2118 the UE group context.

Note that the intra-group operation procedure for transferring the L-UE role can be performed during a UE group mobility scenario, where an existing RRC connection between L-UE and gNB 214 can be handed over to an M-UE. This is to ensure that the RRC connection is maintained and extended when the L-UE is leaving RAN coverage area or changes to Mode 2. The PC5-RRC connection between L-UE and M-UE can then be used to provide the UL grant in the SL HO command message to the M-UE, once the SL HO request (sent by L-UE to RAN node) is allowed by the gNB.

In addition, the HO of M-UEs between two UE groups can involve transferring the UE context from one L-UE to another. This is similar to transitioning of an L-UE to an M-UE and the previous context is transferred without having to re-select the L-UE. The transfer of context can be supported indirectly via RAN forwarding (new L-UE retrieves the M-UE context from RAN) or directly via the L-UE (old L-UE provides M-UE's context to new L-UE) or the M-UE sends its context directly to new L-UE.

In the case of an inter-group operation during mobility, the RAN may indicate to an L-UE the other UEs/L-UEs who may also be using the same RP within the gNB's cell coverage area so that the different mobile L-UEs can coordinate over PC5-RRC to mitigate interference when the UE groups are in overlapping zones.

Figure 22:
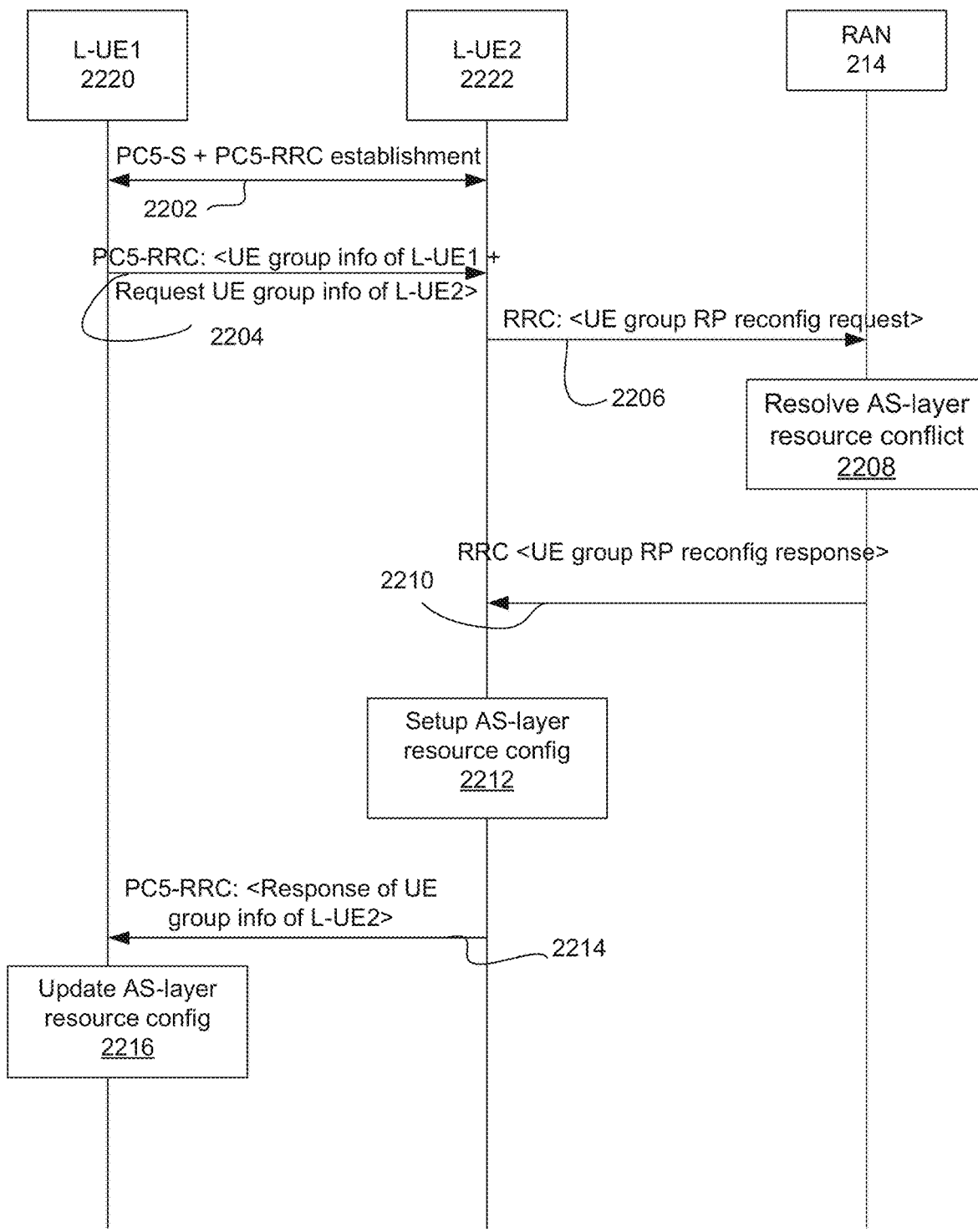
FIG. 22 is an illustration procedure for mitigating interference with RP(s) usage coordination between two L-UEs, according to an embodiment of the present disclosure.

FIG. 22 is an illustration procedure for mitigating interference with RP(s) usage coordination between two L-UEs, according to an embodiment of the present disclosure. Referring to FIG. 22, the procedure for mitigating interference with RP(s) usage coordination between two standalone UEs or L-UES 2220 and 2222 of two UE groups is as follows. After establishing the PC5-S and PC5-RRC connections 2202 between an L-UE2 2222 and an L-UE1 2220, the L-UE2 2222 receives a UE group operation request message 2204 for UE group information from a requesting L-UE1 2220 in PC5-RRC, where the UE group operation request can contain the AS-layer resource configuration of requesting UE group and resource usage parameters (i.e. time duration, geo-area IDs). Based on the received request, the L-UE2 2222 may determine the AS-layer configuration such as the RPs used by the UEs in the UE Group and UE group context. The parameters for AS-layer configuration and UE group context can be determined based on interaction with RAN node 214 on Uu interface via RRC signaling. The L-UE2 2222 sends a UE group RP reconfiguration request 2206 via RRC to RAN 214. The RAN 214 resolves 2208 the AS-layer resource conflict, and sends a UE group RP reconfiguration response 2210 via RRC to L-UE2 2222. The L-UE2 2222 sets up 2212 the AS-layer resource configuration, and sends the UE group response message 2214 to the requesting L-UE, L-UE1 2220 in PC5-RRC, where the UE group operation response can contain the updated AS-layer resource configuration of UE group and resource usage parameters (i.e. time duration, geo-area IDs). The L-UE1 2220 updates 2216 the AS-layer resource configuration, accordingly. Note that the updated resource configuration may be determined based on the priority indicator of the service access associated with the UE group. As an example, the UE/UE group with higher priority indicator may continue using the existing RPs while the UE/UE group with the lower priority indicator may need to temporarily refrain from using the existing RPs and transition to a non-interfering RP until the potential interference scenario is resolved.

Alternatively, the UE/UE group with lower priority indicator may be dynamically triggered to activate the exceptional RPs, for its use, prior to encountering a potential RP interference scenario, and the UE/UE group may be triggered to deactivate the use of the exceptional RPs after resolving the interference scenario. The use of the exceptional RP requires configuring of the exceptional RPs along with the RP usage restrictions in the UEs by RAN via RRC and followed by sending of the exceptional RP triggering indicator. The triggering indicator for activating/deactivating the use of the exceptional RPs for the UE/UE group may be provided in PC5-RRC or in a SL MAC CE by an (authorized) L-UE or in RRC or in a DL MAC CE by the RAN node. In another embodiment, the exceptional RP may be set in a default activated state in the UE when initially configured via RRC and deactivated, either, after sending an exceptional RP de-configuration RRC message or after an expiry of a timer.

UE group mobility will now be discussed.

During mobility, communication interruption may occur when a vehicle moves from one cell to another because different cells may be associated with different RP configurations. In Mode 1 and Mode 2, the UE is required to perform measurement/sensing of the RPs in the target cell (Tcell) under the control of a target gNB prior to changing to the new RP during HO. To prevent transmission interruptions in SL, the source cell (Scell), under the control of a source gNB, may provide an updated RP (e.g. exceptional RPs) to the UE via RRC for Mode 1 UEs. For Mode 2 UEs, the updated RPs may be determined by the Mode 2 UEs by accessing the SIBs in the Scell and Tcell when crossing the cell boundary.

Use of coordinated SL resource allocation technique in UE group during mobility will now be discussed.

In the case of a UE group, when both the L-UE and M-UE(s) operate in Mode 1, the UE group mobility may be supported with coordinated SL resource allocation technique, with the assistance from RAN. The SL resource allocation technique involves a RAN node configuring either an exceptional RP, a new RP or a regulated RP with usage restrictions (time duration and location range restrictions) in the UEs via RRC, in a dedicated RRC message (i.e. RRC-ConnectionReconfiguration), on-demand RRC/SIB or a common RRC (i.e. accessible via SIBs). The assistance from RAN also includes the serving RAN node (source cell/gNB) providing an advanced indication of the RPs to be used in the subsequent target RAN nodes (target cells/gNBs) while still associated with the serving RAN node (i.e. in the coverage of source cell). The next step may involve sending an activation/deactivation indication message either by the RAN node (in RRC or DL MAC CE or in DCI) or by another authorized UE in SL (in PC5-RRC or SL MAC CE or SCI). Similar RAN assisted SL resource usage coordination technique may be applied in the cases when at least one of the UEs in the UE group is in Mode 1 and others in Mode 2. In this case, the UE in Mode 2 (L-UE or M-UE) is configured by RAN or an authorized UE with the RPs prior to HO, and the RPs may be triggered (activated/deactivated) with an activation/deactivation indication message sent by an authorized Mode 1 UE (e.g. L-UE) in the UE group in the SL via PC5-RRC, SL MAC CE or in SCI during HO.

In the case when all UEs in the UE group are in Mode 2, the usage conditions for exceptional RPs during HO may be preconfigured in the UEs during initial registration or when the UEs are able to access the network when in coverage. The usage conditions may include the locations of the UEs in the UE group, higher layer service attributes (e.g. priority) along with other SL channel/load measurement and sensing thresholds to be used when crossing over different cells. For a UE group with all UEs in Mode 2, the determining of the RPs during mobility may be handled by the L-UE and the corresponding usage of the RPs (i.e. location range and time duration) may be communicated with the other M-UEs via PC5-RRC. Similar technique for determining the RPs based on pre-configuration may be applied when all UEs in the UE group transition to RRC Inactive state. In this case, the RAN may send a RAN paging message to at least one of the UEs in the UE group in the event that the previously configured RPs to be used during mobility requires to be updated.

The mobility of a UE group may be supported with the SL resource usage coordination technique in the following scenarios: limited-mobility (semi-static), where the mobility of L-UE and M-UEs are restricted to one or a small number of geo-area IDs; and full mobility, where the mobility of L-UE and M-UEs are not restricted and can extend across multiple geo-areas and cells/RP zones.

In the case of a semi-static mobility, the capabilities supported at an L-UE (e.g. RSU) may include: dynamically forming UE groups by establishing PC5-RRC connection with other Mode 2 UEs and using the PC5-RRC connection for providing resource configuration (e.g. dynamic SL grants, SL configured grants); configuring other UEs to perform channel measurements, reporting of position/location information; and facilitating AS-layer UE context retrieval and transfer for Mode 2 UEs entering or leaving the coverage area of the static L-UE (RSU). The UE contexts can be either accessed directly from the UE or indirectly from RAN and other static L-UEs (e.g. RSU) based on AS layer UE ID. Note that the UE location can be either relative positioning information based on reference signal measurements or the UE's identification of its currently located geo-area.

In addition to the capabilities in semi-static mobility scenarios, the L-UE in the case of full-mobility scenarios may also be able to perform inter-group signaling over PC5-RRC to coordinate and negotiate non-interfering resource usage in potential interference scenarios where the same RP is used by multiple UE groups in the same/overlapping area and time duration. In this case, if interference is anticipated at a certain location and time (when exchanging the AS-layer UE group context) then either new resources are requested from the gNB via RRC or a dynamic RP resolution protocol is used among the L-UEs to select non-overlapping RPs (e.g. dynamically activate/deactivate from a set of preconfigured RPs).

The options available to the RAN for supporting SL resource coordination during HO are: coordination between the RAN nodes (over Xn interface) to exchange resource usage and SL channel information to ensure proper resources are used by UE/UE group during HO; loose coordination between RAN nodes with less overhead signaling and with assistance from L-UE to manage interference and perform RP switching locally; and no coordination between RAN nodes, where L-UE mitigates interference and transitioning of RPs on its own while interacting only with serving cell.

Figure 23:
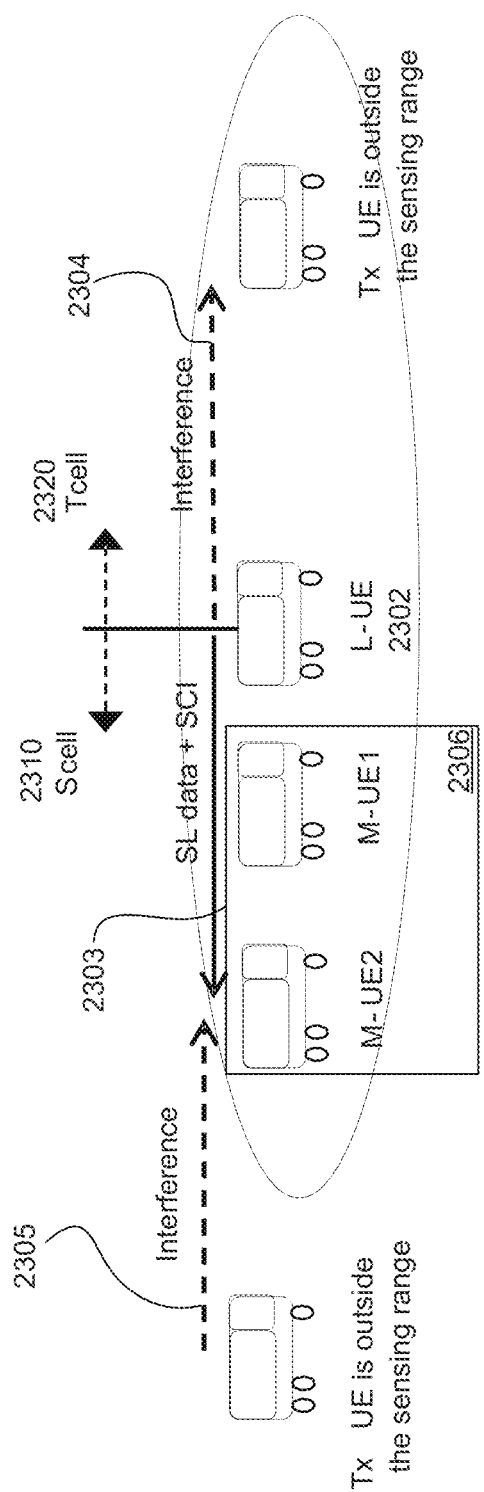
FIG. 23 is an illustration of (scenario 1) interference due to transmission of L-UE to M-UE(s), according to an embodiment of the present disclosure.
Figure 24:
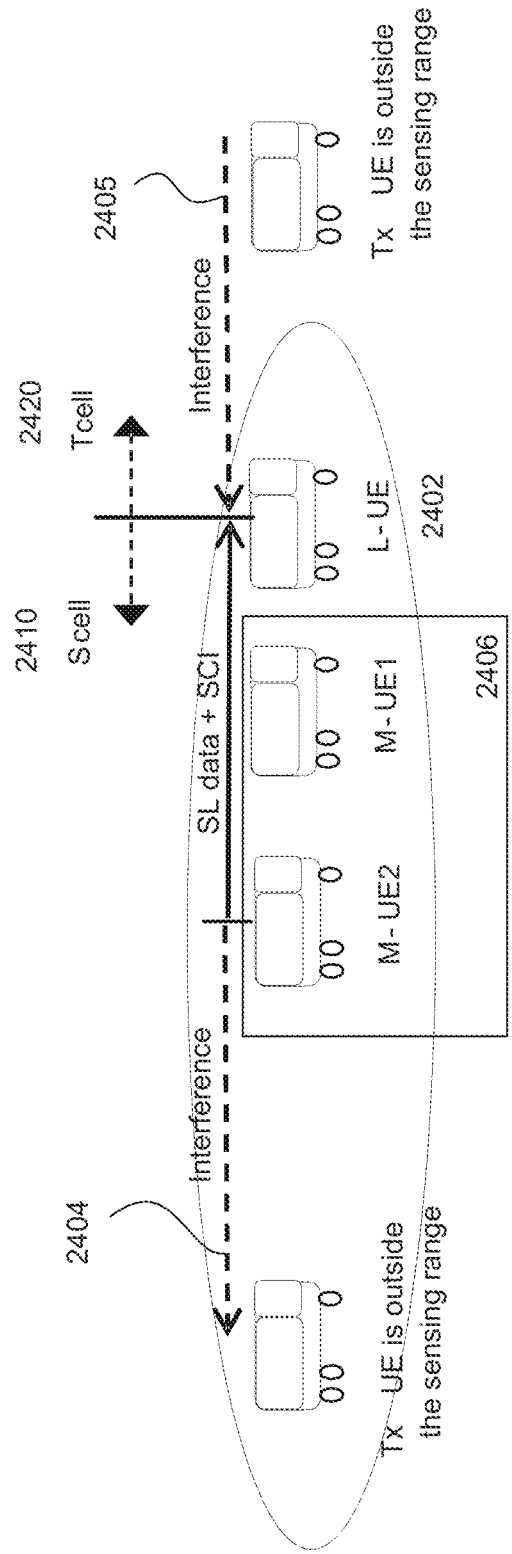
FIG. 24 is an illustration of (scenario 2) interference due to transmission of M-UE to L-UE, according to an embodiment of the present disclosure.

The potential interference experienced by the UEs in the UE group and the interference caused by a UE Group to other external UEs are illustrated in FIG. 23 and FIG. 24.

FIG. 23 is an illustration of (scenario 1) interference due to SL transmission of L-UE to M-UE(s), according to an embodiment of the present disclosure. FIG. 24 is an illustration of (scenario 2) interference due to SL transmission of M-UE to L-UE, according to an embodiment of the present disclosure.

In Scenario 1, referring to FIG. 23, the transmissions 2303 from L-UE 2302 to M-UE(s) 2306 in Scell 2310 may cause interference 2304 to other Mode 2 UEs in Tcell 2320 using the same (Rx) RP used by the (Tx) L-UE 2302. Likewise, other Mode 2 UEs in SCell 2310 using the same (Tx) RP used by (Tx) L-UE may cause interference 2305 at M-UE(s) 2306.

In Scenario 2, referring to FIG. 24, the bidirectional transmissions from M-UE 2406 to L-UE 2402 in Scell may cause interference 2404 to other Mode 2 UEs in Scell 2410 using the same (Rx) RP used by (Tx) M-UE. Likewise, other Mode 2 UEs in TCell 2420 using the same (Tx) RP used by (Tx) M-UE(s) 2406 may cause interference 2405 at L-UE 2402.

Use of regulated SL resource allocation technique in UE group during mobility will now be discussed.

To mitigate interference in RP usage for a UE group during a HO from an Scell to a Tcell, the Scell may provide the SL RP usage regulations/conditions after coordinating with Tcell. The RP usage regulation/conditions may contain AS-layer restrictions (i.e. geo-area ID range, time duration, channel condition thresholds and loading condition thresholds) for which the allocated RPs are valid.

Figure 25:
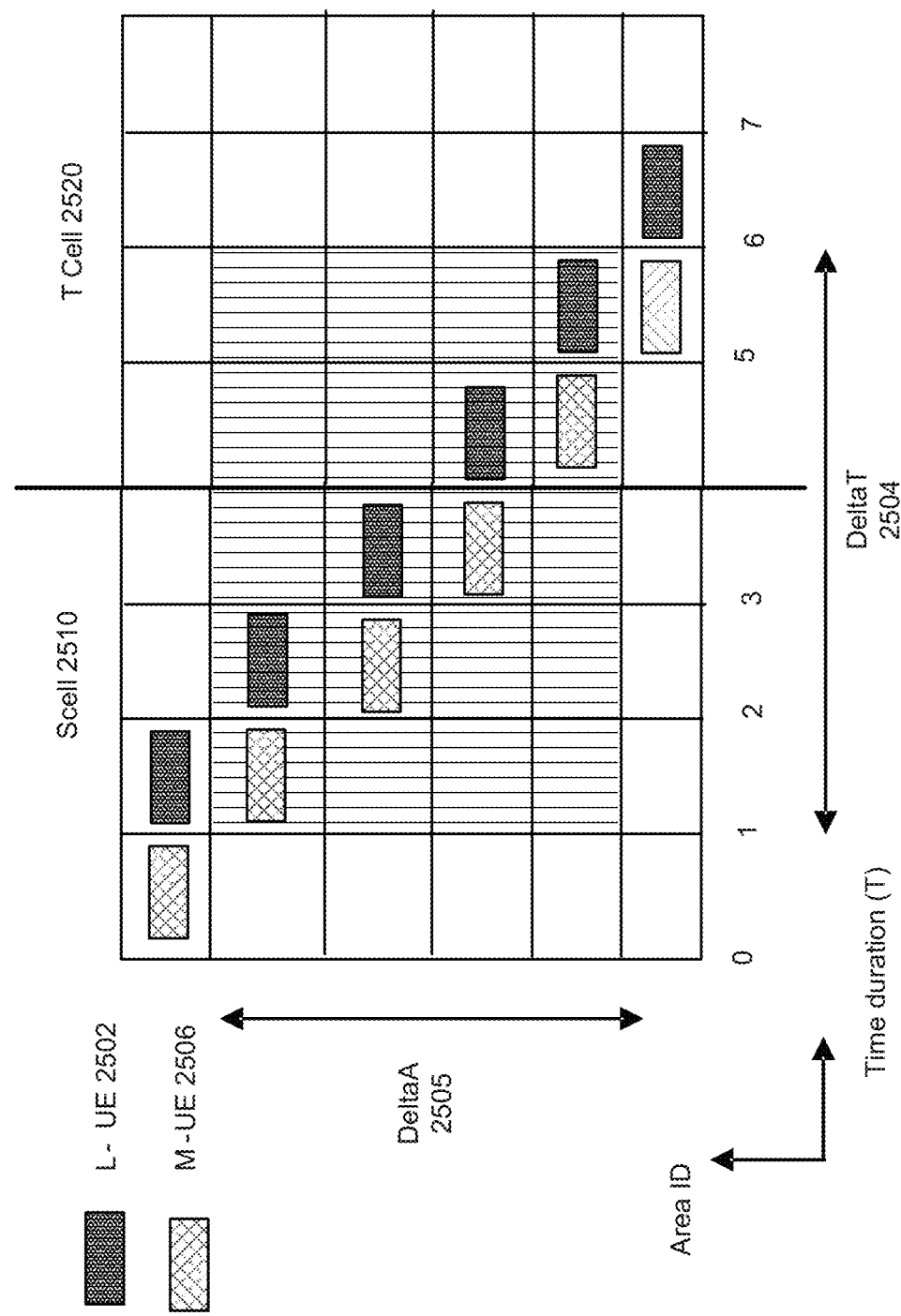
FIG. 25 is an illustration of the RP usage regulations/conditions indicated by an Scell to a UE group during HO, according to an embodiment of the present disclosure.

FIG. 25 is an illustration of RP usage regulations/conditions indicated by an Scell to a UE group during a HO, according to an embodiment of the present disclosure.

In FIG. 25, a UE Group may be allocated with RP X with the following regulations/conditions: Time duration, $\Delta T$ (DeltaT 2504)=t6−t1, Geo-Area range, $\Delta A$ (DeltaA 2505)=A4−A1, SL channel (SL-RSSI) constraints, and Loading (CBR) constraints. Additionally, the regulations or conditions for using RP X may include a set of starting and termination conditions, where RP X is used in UE group if the starting conditions are satisfied and released if the termination conditions are satisfied. The start conditions for using RP X may be indicated as: F-UE/M-UE 2506 is in A4 and t>Tmin, Tmin=1, CBR in A4<CBR_threshold1, and SL-RSSI in A4<SL-RSSI_threshold1. The termination conditions for releasing RP X may be indicated as: L-UE 2502 is in A1 and t<Tmax, Tmax=6, ii) CBR(A1)<CBR_threshold2 and iii) SL-RSSI(A1)<SL-RSSI_threshold2.

In order to ensure high reliability when performing SL transmissions during mobility, the use of the RPs in a UE group may be regulated with RAN assistance. The following options may be used to minimize communications interruptions in a UE group when undergoing HO.

Figure 26:
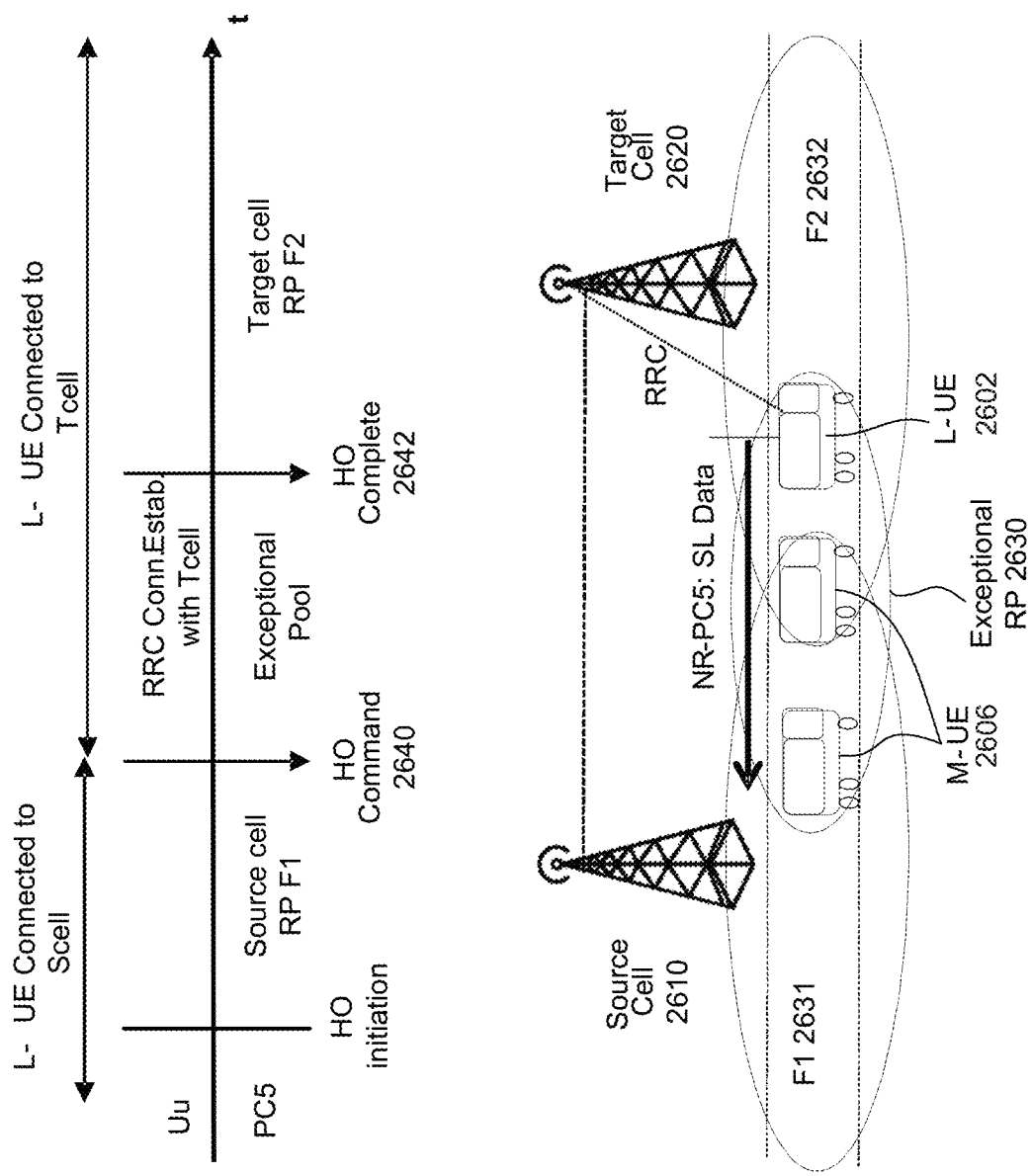
FIG. 26 is an illustration of one option (option 1) for UE group HO using Exceptional resource pool, according to an embodiment of the present disclosure.

FIG. 26 is an illustration of one option (option 1) for a UE group HO using an Exceptional Resource Pool, according to an embodiment of the present disclosure. Referring to FIG. 26, The L-UE 2602 may use an exceptional RP 2630 signaled in the HO command to determine RP usage in the UE group. The Exceptional RP 2630 may be configured via RRC before activating the Exceptional RP 2630 configuration in HO command. While the L-UE 2602 is connected to SCell 2610, the L-UE may be connected to SCell RP F1 2631, prior to the HO command 2640. After the HO command and prior to HO complete 2642 the L-UE may use the Exceptional resource pool 2630, while establishing RRC connection with Tcell. After the HO complete 2642, the L-UE may use the Tcell RP F2 2632. The Scell 2610 may provide regulation or conditions to L-UE 2602 when using the Exceptional RP 2630.

Figure 27:
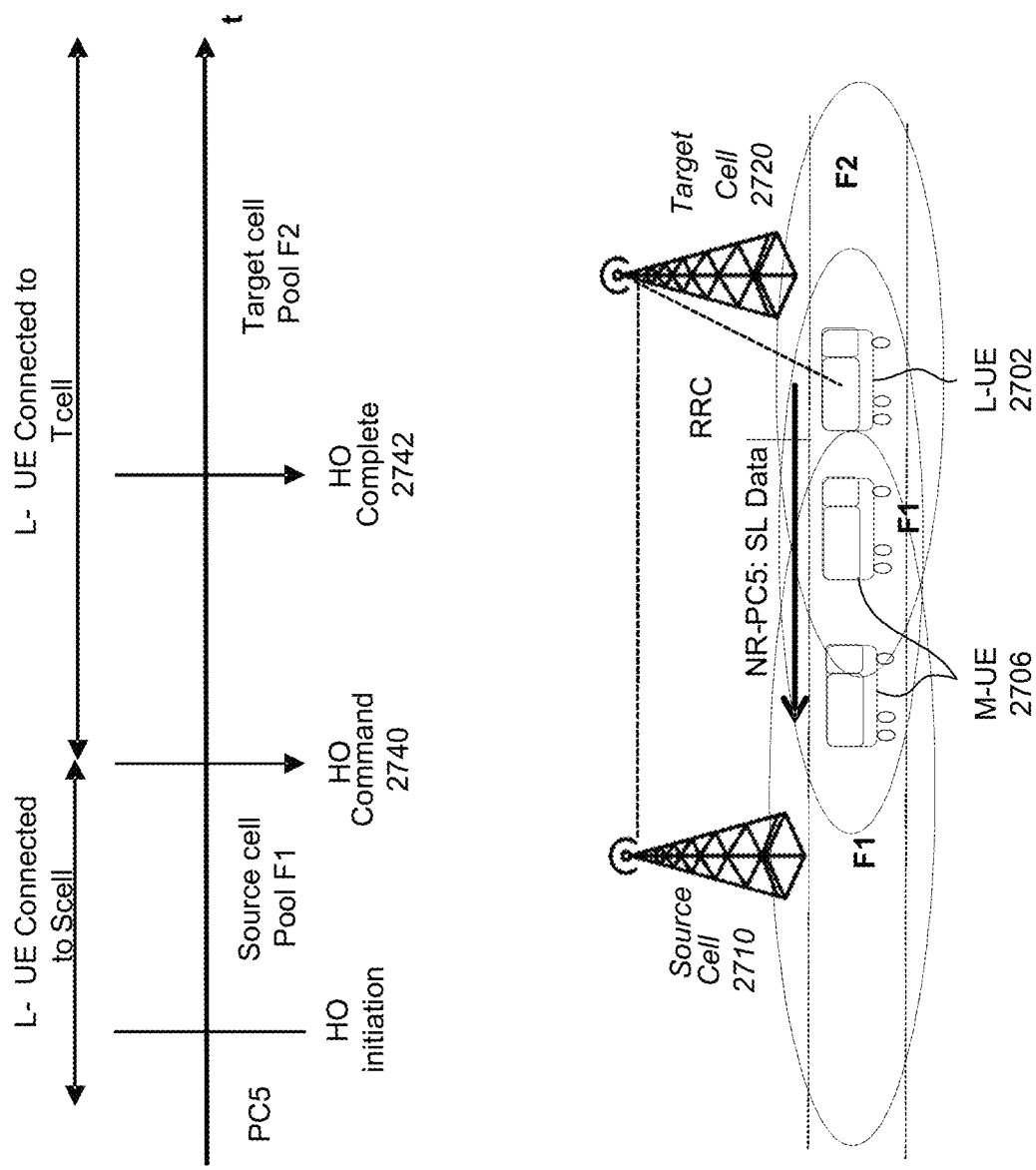
FIG. 27 is an illustration of a second option (option 2) for UE group HO using late Scell's RP release, according to an embodiment of the present disclosure.

FIG. 27 is an illustration of a second option (option 2) for a UE group HO using late Scell's RP release, according to an embodiment of the present disclosure. In this embodiment, the L-UE 2702 continues to uses Tx RP of Scell 2710 after receiving HO command 2740 until a criteria is satisfied. Tcell 2720 is aware of the duration and range of UE group's resource usage. The RP activation/switching criteria after the HO can be provided in the HO command 2740.

Figure 28:
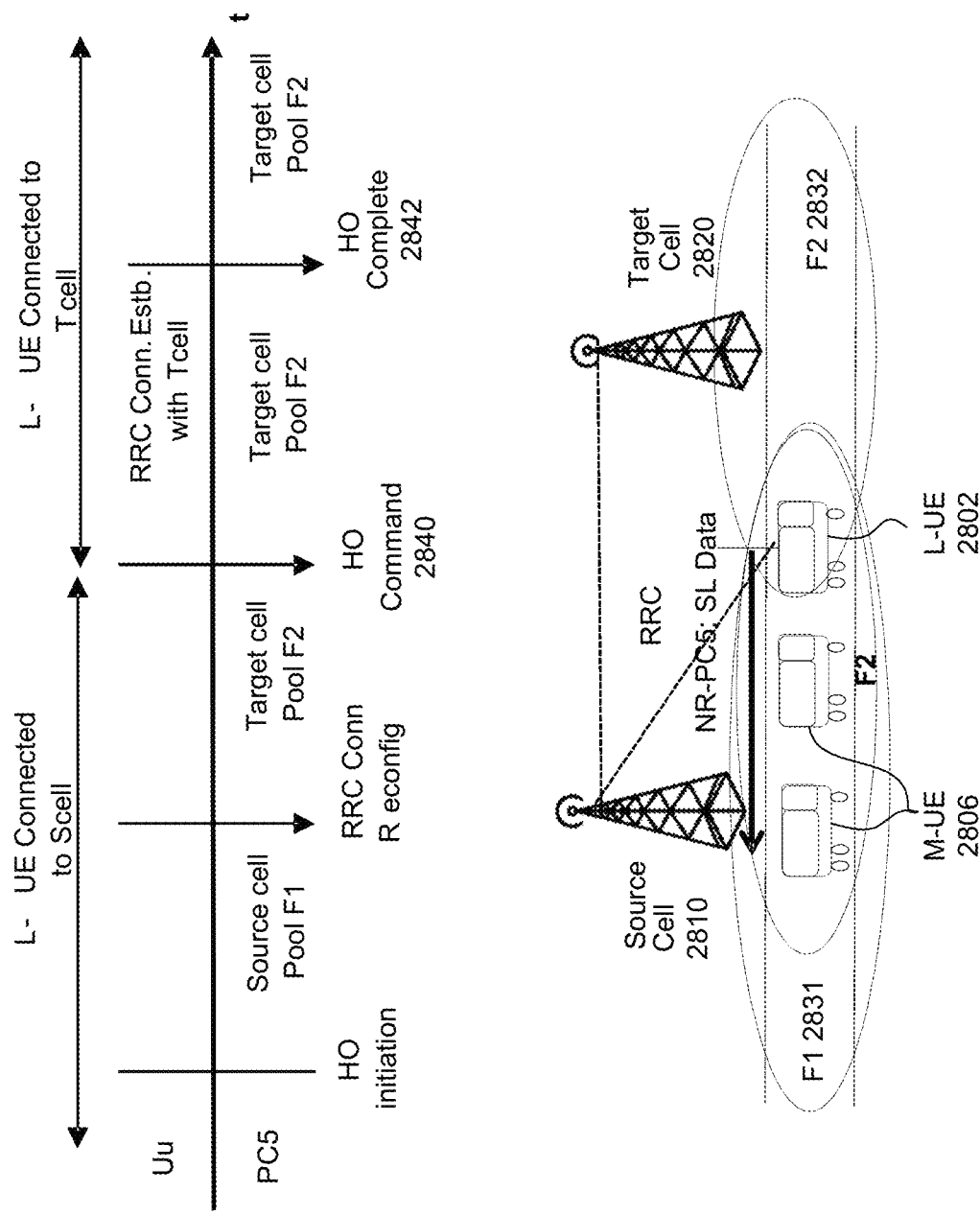
FIG. 28 is an illustration of a third option (option 3) for UE group HO via early usage of Tcell-allocated RPs, according to an embodiment of the present disclosure.

FIG. 28 is an illustration of a third option (option 3) for a UE group HO via early usage of Tcell-allocated RPs, according to an embodiment of the present disclosure. In this embodiment, the L-UE 2802 obtains and uses a Tx RP 2832 of a Tcell 2820 before receiving a HO command 2840. The Scell 2810 may provide regulation or conditions for restricting usage of Tcell's RP 2832 in Scell coverage area. The L-UE 2802 sends a HO complete message 2842 to the Tcell 2820 after a threshold (e.g. trigger from last M-UE 2806).

For supporting a UE Group handover between an Scell and a Tcell as discussed herein, the Source gNB may provide the updated regulated SL RP(s) before the HO command in an RRC reconfiguration message, where the updated RP(s) indicated can be either the exceptional RP(s) (Option 1 in FIG. 26), existing Scell RP(s) (Option 2 in FIG. 27) or new Tcell RP(s) (Option 3 in FIG. 28).

Figure 29:
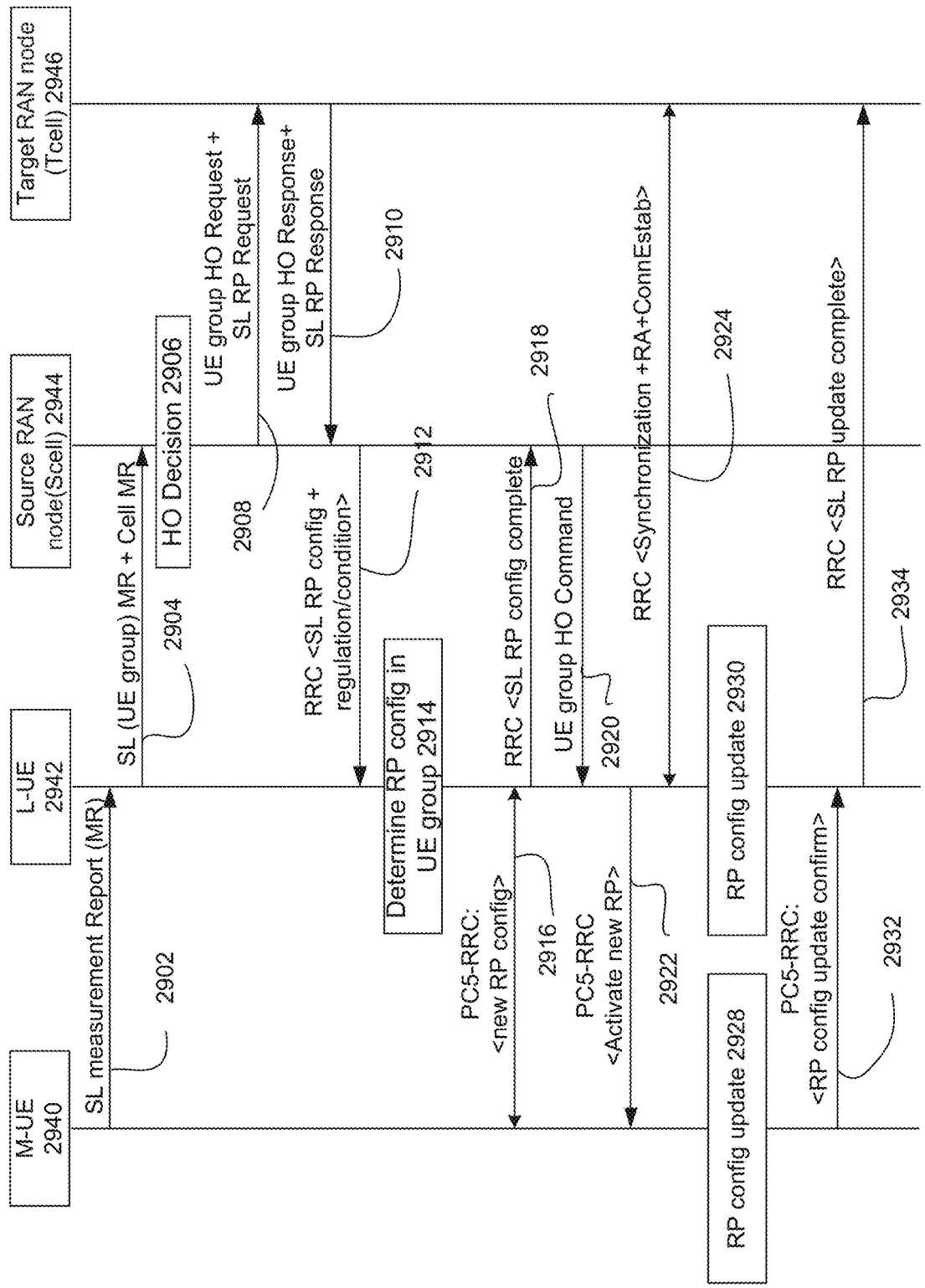
FIG. 29 is an illustration of a procedure for performing UE group HO, according to an embodiment of the present disclosure.

FIG. 29 is an illustration of a procedure for performing a UE group HO, according to an embodiment of the present disclosure. Referring to FIG. 29, the M-UE 2940 of a UE group may send an SL measure report (MR) 2902 to the L-UE 2942 of the UE group. The L-UE 2942, after receiving measurement report on configured SL channels from each M-UE 2940 on PC5-RRC, transmits an aggregated measurement report 2904 of all configured SL channels in the UE group to Scell 2944 via RRC. The L-UE 2942 may also transmit the neighbor cell measurements made on Uu interface in the aggregated measurement report 2904. The Scell 2944 determines an HO decision 2906 and sends a UE group HO request and SL RP request to the Tcell 2946. The Tcell 2946 sends a UE group HO response and SL RP response 2910 to Scell 2944. Next, the L-UE 2942 receives an early RRC reconfiguration message 2912 from Scell 2944. The RRC reconfiguration message 2912 may contain a SL resource configuration (i.e. updated SL RP(s)) and corresponding regulations (i.e. RP validity duration, geo-areas restrictions and channel/load measurement constraints). The L-UE 2942 determines 2914 RP configuration in UE group and establishes 2916 new RP configurations with M-UE(s) 2940 via PC5-RRC. The L-UE 2942 may send an RRC reconfiguration complete message 2918 to Scell 2944 after performing SL resource configuration update in UE group. In the next step, the L-UE 2942 may receive a UE group HO command 2920 and performs the corresponding UE group HO operation. The UE group HO operation may comprise the L-UE 2942 sending an activation message 2922 to M-UEs 2940 via PC5-RRC to activate the SL resource configuration. The L-UE 2942 may then establish 2924 an RRC connection with the Tcell 2946 via Uu interface. Accordingly, the L-UE 2942 and M-UE 2940 may update the RP configuration, respectively 2930 and 2928. The M-UE 2940 may then send an RP configuration update confirmation 2932 to L-UE 2942, and the L-UE 2942 may send an HO complete message 2934 comprising SL update complete indication to the Tcell 2946 in RRC.

In some embodiments, the early configuration for updated RP, for example 2912, provided via RRC (in RRC reconfiguration message) by the gNB associated with the Scell 2944 to the L-UE 2942 may be based on neighbor cell measurement reports (determined over Uu) and SL measurements reports 2904 sent by the L-UE 2942. Note that the L-UE 2942 may send the measurement reports (indicated with the UE group identifier) for multiple potential Tcells and RPs. The measurement reports for RPs may include those RP(s) configured within the Scell 2944 as well as those in neighboring Tcells. Based on the reports, the Scell 2944 may provide one or multiple RRC re-configuration messages for early HO, each corresponding to a different Tcell along with set of regulations and conditions for i) establishing RRC connection with a selected Tcell and ii) using the RPs corresponding to the selected Tcell. The Scell 2944 may determine the regulations/conditions based on interaction with one or many Tcells over the Xn interface while ensuring that the resource requirements for UE group are satisfied and interference is mitigated when the UE group is undergoing HO. Note that the regulations and conditions are intended to control the behavior of the L-UE 2942 and UEs, for example M-UE(s), in the UE group during HO. The regulations for establishing RRC connection with a Tcell on Uu may include the Uu channel thresholds (e.g. RSRP>RSRP_threshold, validity time duration for establishing RRC connection<time_duration threshold, geo-area locations of L-UE and M-UEs is within a geo-area range {geo-area ID x to x+k}). Similarly, the regulations on SL for using the updated RPs may include the channel (SL-RSSI), loading (CBR) thresholds along with geo-area and time duration restrictions. Based on the received early HO messages and the evaluation of multiple regulations/conditions, the L-UE 2942 may select the most appropriate Tcell along with the updated RP(s) for usage in the UE group during HO. Note that for selecting the Tcell, the criteria set by the regulations and conditions on both the Uu and SL interfaces have to be satisfied. However, if only the criteria on the Uu is satisfied but not that of the SL, then L-UE may either i) transition to Mode 2 to determine the RPs autonomously or ii) provide a feedback message in RRC containing the updated RP measurement report to RAN (Scell or Tcell) and request for a different RP set. Likewise, if the criteria on SL is satisfied but not that of the Uu (e.g. RLF on Uu), then the L-UE may transition to Mode 2 for using the provided updated RP(s) and establish a connection to a selected Tcell after recovery of the Uu link.

For supporting URLLC requirements on SL during mobility, it is may be necessary to support Oms interruption time on both SL UP and CP during HO. In the UE group mobility scenario, the RRC connection with the network can be handed over from a Source gNB to a Target gNB using an existing HO procedure. However, since only one RRC connection is maintained with the network, any failure in the link can trigger RLF. On the SL UP, there may also be an interruption due to updating of the configuration provided by the Target gNB in the HO Command. In this regard, the basic HO procedure is inadequate to satisfy the URLLC requirements on SL UP. The CP interruption due to RRC reestablishment can be minimized by using the make-before-break (MBB) technique. In this case, the initial RRC connection to the Source gNB is transferred from an L-UE of the UE group to an M-UE of the UE group. Next, while maintaining the RRC connection between the M-UE and the Source gNB, another RRC connection may be established between the L-UE and the Target gNB. However, on the SL UP, there may still be an interruption due to updating of the configuration provided by the Target gNB in both the L-UE and the M-UE, during which the SL Data cannot be transmitted. In this case, the MBB mechanism can be used in combination with packet duplication for SL transmission. This approach enables to minimize the CP interruption time to Oms while improving the SL robustness during handover.

The usage of enhanced conditional HO (eCHO) technique in a UE group during mobility will now be discussed.

The existing conditional HO (CHO) technique applies for individual UEs during mobility. The technique applies where a serving RAN node may provide a CHO command, earlier than the normal HO command, to the UE based on neighboring cell measurements provided by the UE and the interaction with potential candidate target cells. The potential candidate target cells may have reserved radio resources for the UE after the HO. The CHO command may contain measurement threshold conditions which the UE is required to satisfy prior to establishing a connection with a target cell. While the existing CHO technique is intended for enabling UE controlled HO and minimizing HO related interruptions, certain enhancements may be made in order to apply CHO for supporting mobility of UE groups requiring the performance of SL transmissions during HO. The enhanced CHO (eCHO) technique for UE group mobility can be applied in scenarios when at least one of the UEs in the UE group is in Mode 1. Additionally, the enhanced CHO technique, which requires the UEs to evaluate the SL channel and loading measurements, may be used both during HO and in any scenario requiring the change of the currently used SL RPs and SL carriers.

For supporting UE group mobility, the CHO command provided by an Scell to a Mode 1 UE (for example, an L-UE) may be enhanced to include the following: SL channel and SL load measurements thresholds (i.e. SL RSRP, CBR); set of RPs configured in a target cell (Tcell) and the corresponding rules/conditions to activate/deactivate the RP/carriers if the measurement thresholds are satisfied (e.g. activate RP 1 in target cell A if CBR_RP1<CBR_threshold); validity timer and/or location range for using the indicated RPs. Since there may be multiple potential candidate Tcells to which the UE group may be handed over to during mobility, the Scell may either provide multiple eCHO commands, each containing the UE group identifier and associated with a potential Tcell, or a single eCHO command, containing the UE group identifier and the conditions and RPs attributed to multiple potential Tcells. Note that in order to ensure effective use of the RPs with minimal interference/congestion and interruption during mobility, the eCHO command may be provided by the Scell with the awareness of the UE group attributes such as the number of UEs in the group, aggregate SL traffic requirements and the group velocity. These are in addition to the SL channel and SL load measurements made by all UEs in the UE group and provided in RRC by at least one Mode 1 UE in the UE group. Based on the UE group attributes and measurement reports, the serving RAN node (for example, the Scell) may interact over the Xn interface with multiple potential target RAN nodes (Tcells) to determine the RP configuration assignment and the corresponding conditions to be provided in either a single eCHO command associated with multiple Tcells or multiple eCHO commands associated with individual Tcells to a Mode 1 UE in the UE group. As an extension, the initially provided eCHO command(s) may be set in a default (activated/deactivated) state followed by another RRC message (e.g. in a HO command) sent by the RAN node to the UE to either activate or deactivate or update the eCHO command. The second activation/deactivation message may be used to set a validity timer in the UE for the activated eCHO commands and as an instruction to discard the deactivated eCHO commands in the UE.

In addition to the RRC configurations of the potential target cells (required by Mode 1 UE in group for connection establishment) and the validity timer associated with the eCHO command(s), the eCHO command(s) may also include a mode switching instruction (MSI). The MSI can be provided for reducing HO interruption time and increasing connection robustness by either: instructing the existing Mode 1 UE to transition to Mode 2 when crossing over to the Tcell; or by instructing one or multiple UEs in the UE group to transition from Mode 2 to Mode 1 and retain the RRC connection to the Scell while the previous Mode 1 UE establishes a new RRC connection with the Tcell. The ability to maintain the RRC connection with the Scell from at least one of the UEs in the UE group during HO enables the Scell to provide an eCHO command update message (i.e. containing change in Tcell RP configuration or delta update in measurement thresholds) to update or discard the eCHO instructions, in the event of any updated information received at the Scell from the candidate Tcells or other UEs. After the reception of the eCHO command(s), the UEs in UE group may coordinate via PC5-RRC to collectively evaluate the fulfillment of the indicated measurement conditions and that the appropriate resource allocation modes and RPs are used when crossing the cell boundaries.

The usage of configured Geo-Areas/Zones technique in UE group during mobility will now be discussed.

When the Configured Geo-area/zone based SL resource allocation (i.e. configured SL map) technique is applied, the UE group may be configured by RAN with RPs, along with a validity zone composed of a number of geo-areas spanning one or multiple cells, based on the UE group mobility and other service attributes (e.g. group size, group priority, group reliability requirements). For instance, a UE group comprising of a high number of UEs or travelling with high velocity may be configured with a validity zone which spans multiple cells such that the need to undergo handover procedure for determining new SL RPs is minimized.

The configuration of RPs and the validity zone may be performed by RAN via RRC when at least one UE in the UE group is in Mode 1 or preconfigured in the UE during initial registration for Mode 2 operation. The UEs in the UE group may use the available positioning information (i.e. GNSS or RAN assisted positioning) to determine their location relative to the validity zone and the corresponding RPs to use for SL transmission and reception. Once the configuration of the validity zone to RP mapping is complete, the UEs in the UE group do not require performing the conventional HO procedure via RRC and may virtually operate in Mode 2 without any awareness of the cell boundaries, provided that they are mobile within the validity zone. In the case when the UE group approaches the boundary of the current validity zone, a different RP corresponding to the subsequent validity zone may be determined either from the preconfigured zone-to-RP mapping (for Mode 2) or by connecting with the RAN via RRC (for Mode 1). At any given time, the RAN may update the validity zone-to-RP(s) mapping in one of the UEs in the UE group by sending an RRC reconfiguration message, which may then be relayed to other UEs via PC5-RRC.

The usage of Machine Learning in SL resource allocation will now be discussed.

In typical control system use cases, a high degree of uncertainty exists in determining accurately certain SL attributes, which may include the variations in the SL radio channel conditions and the positions of all UEs in the UE groups. In these cases, predicting future higher layer and AS-layer attributes using limited historical measurement data samples may result in large inaccuracies and overprovisioning of resources. Additionally, having to send the measurement data frequently to the RRM entity in RAN for performing accurate data analytics may also lead to high computational complexity and increased amount of signaling on the Uu interface.

In these scenarios, a transfer learning approach may be used, where a RAN based model trained on long term data can be imported to a local L-UE to perform optimization over the previously trained model using more recent data. In essence, the DRM in combination with the ML agent in the RAN may implement a neural network architecture trained with the data containing the input attributes (AS-layer {SL-RSSI and CBR} and higher layer {UE positions, UE group mobility}) and output attributes (RP allocation, geo-area IDs, time duration). After training, the parameters of the neutral network may be transferred to the L-UE to re-train the locally maintained neural network using local data acquired more recently. The transfer learning approach can be used for determining accurate SL resource allocation in the UE group and can be implemented without having to perform complex centralized computation and high signaling with the RAN.

In another embodiment, the higher layer and AS-layer attributes which include interference level, channel conditions and resource requests/reservations can be used with the data analytics entities (DAE) in RAN and an L-UE of a UE group to opportunistically determine the SL resources for usage within the UE group with minimal assistance from RAN and with minimal or no sensing. The DAE at RAN, comprising of an ML agent, and the DRM implementing certain supervised/unsupervised learning algorithms, can assist a RAN node (i.e. a gNB) for making resource allocation decisions and determining the RP regulations (e.g. conditions and threshold). For example, the DAE may assist the RAN node to forecast that RP X is required at geo-area C and at time t+5 based on the current observation of a UE group at zone A and time t, as well as higher layer mobility attributes (e.g. UE group velocity, trajectory). Similarly, the RAN node, with assistance from DAE, may determine that a UE Y will experience interference at geo-area D at time t+4 from another UE Y', based on the current AS-layer attributes of UEs Y and Y'. At the L-UE, a local DAE may assist in deciding to re-allocate unused RPs to the M-UEs based on the detected resource usage information in the SCI sent by other UE groups in the vicinity. Additionally, if any of the transmission links in SL are blocked or anticipated to be blocked, the L-UE with support from local DAE may proactively activate an alternate link (either in SL or Uu) and may perform packet duplication to minimize potential link failure and interruption events. In the case when the alternate link is in SL (i.e. different connection or different RP), the L-UE may route the packets to the intended UE both via the existing and the alternate side-link. Otherwise if the alternate link is over Uu, the packets may be forwarded/relayed both directly via the SL and via the RAN node to the intended UE.

In another embodiment, the DAE (comprising a DRM and an ML agent) combined with machine learning techniques can be used to assist the RAN (for example a RAN node) to support the mobility of a UE Group travelling in a given path and detected by the RSUs (based on L-UE's PC5-D broadcast messages) and RAN (based on HO signaling over RRC). Using this information, the RAN may estimate, with a certain accuracy, the likelihood and the arrival time of the UE group at any given location. The RRM and DRM in RAN may also apply this information to identify advanced RP reservation and update the RP configuration to the UE group and other UEs/UE groups travelling in different directions based on the estimated mobility pattern. Additionally, the estimated higher layer attributes may also be used to determine the potential interference events at different locations based on the UEs' estimated arrival time and communications patterns. The reserved RP may be configured with validity attributes (i.e. time duration and geo-area limitations). The configuration may be performed via RRC by RAN and activated by an L-UE based on certain threshold sensing. If the RP is not activated (e.g. due to timer expiry and path change), the unused resources can be re-allocated to other UEs/UE groups in different geo-areas after expiry of validity attributes.

Another aspect of the disclosure provides a network node including at least one network interface, at least one processor, and a non-transient computer readable memory for storing instructions which when executed by the at least one processor configure the network node to execute the methods described here. For example, such a network node is configured to receive, from a radio access network (RAN) node, a resource configuration message including information for sidelink resources indicated by a sidelink resource grant and regulations for using sidelink resources of the sidelink resource grant. The network node is further configured to send, to at least one UE in the UE group, an activation message comprising the sidelink resources to be used for sidelink transmissions of at least one UE in the UE group according to the regulations and UE group context.

Another aspect of the disclosure provides for a method of performing user equipment (UE) group handover (HO), by a UE. The method includes receiving, from a source radio access network (RAN) node, a first UE group HO message including configuration information for sidelink resources indicated by an updated sidelink resource grant and conditions for using sidelink resources of the updated sidelink resource grant. The method further includes sending, to the source RAN node, a response message indicating completion of sidelink configuration update in the UE group. The method further includes receiving, from the source RAN node, a second UE group HO RRC message including a command for activating at least a portion of the updated sidelink resource grant. The method further includes sending, to at least one UE in the UE group, an activation indicator to activate at least a portion of the determined sidelink resources based on the first and second UE Group HO messages. The method further includes sending, to a target RAN node, an HO complete message. In some embodiments the step of: receiving, from a source radio access network (RAN) node, a first UE group HO message including configuration information for sidelink resources indicated by an updated sidelink resource grant and conditions for using sidelink resources of the updated sidelink resource grant includes sending, to the RAN node, a message including a measurement report, the measurement report including aggregated measurements of configured sidelink channels from the at least one UE in the UE group. In some embodiments, the measurement report further includes measurements of SL channels from at least one neighbor cell. In some embodiments, the first UE Group HO message is sent using Radio Resource Control (RRC) signaling. In some embodiments, the HO complete message is sent using RRC signaling.

Another aspect of the disclosure provides a network node including at least one network interface, at least one processor, and a non-transient computer readable memory for storing instructions which when executed by the at least one processor configure the network node to execute the methods described here. For example, such a network node is configured to receive, from a source radio access network (RAN) node, a first UE group HO message including configuration information for sidelink resources indicated by an updated sidelink resource grant and conditions for using sidelink resources of the updated sidelink resource grant. The network node is further configured to send, to the source RAN node, a response message indicating completion of sidelink configuration update in the UE group. The network node is further configured to receive, from the source RAN node, a second UE group HO RRC message including a command for activating at least a portion of the updated sidelink resource grant. The network node is further configured to send, to at least one UE in the UE group, an activation indicator to activate at least a portion of the determined sidelink resources based on the first and second UE Group HO messages. The network node is further configured to send, to a target RAN node, an HO complete message.

Although the present disclosure has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method, performed by a first user equipment (UE) in a UE group, the method comprising:
receiving, from a radio access network (RAN) node, a first resource configuration message including configuration information for sidelink resources indicated by a regulated sidelink resource grant and threshold conditions for using sidelink resources of the regulated sidelink resource grant, wherein the threshold conditions indicate a usage area associated with a geographic area identifier (ID) range;
the receiving including:
sending, to the RAN node, a request message comprising UE assistance information (UAI), the UAI containing a UE communications pattern, an identifier of the UE group and a request for configured resource grant; and
receiving, from the RAN node, a response message comprising the first resource configuration message;
the method further comprising:
receiving, from a second UE of the UE group, a second sidelink resource configuration message, the second sidelink resource configuration message including an activation indicator to indicate at least a portion of the sidelink resources of the regulated sidelink resource grant to be activated; and
when the first UE is in the usage area, transmitting data using the portion of the sidelink resources that are activated based on the configuration information, the threshold conditions, and the activation indicator.

2. The method of claim 1, wherein the threshold conditions further comprise at least one of: time duration; channel condition thresholds; and loading condition thresholds.

3. The method of claim 1, wherein receiving, from the radio access network (RAN) node, the first resource configuration message including configuration information for the regulated sidelink resource grant and the threshold conditions for using the sidelink resources comprises receiving the first resource configuration message through Radio Resource Control (RRC) signaling.

4. The method of claim 1, wherein receiving, from the radio access network (RAN) node, the first resource configuration message including configuration information for the regulated sidelink resource grant and the threshold conditions for using the sidelink resources comprises receiving the first resource configuration message as part of a system information block (SIB) message.

5. The method of claim 1 wherein:
the second UE is at least one of a lead UE and an authorized UE; and
the UE group is a RAN UE group having a group identifier assigned by the RAN.

6. The method of claim 1 wherein the configuration information for sidelink resource grant includes at least one of:
a sidelink (SL) resource allocation mode, wherein the mode is one of Mode 1 and Mode 2;
a type of sidelink connection;
a SL radio bearer;
a logical channel; and
a SL radio bearer identifier.

7. The method of claim 1 wherein the activation indicator comprises an indication specifying the portion of the sidelink resources indicated by the regulated sidelink resource grant.

8. The method of claim 1 wherein the second sidelink resource configuration message including a deactivation indicator.

9. The method of claim 1, wherein the configuration information for sidelink resources indicated by the sidelink resource grant and the threshold conditions for using sidelink resources of the regulated sidelink resource grant comprises a configured sidelink map associated with a validity time duration and a validity location area.

10. The method of claim 9, wherein the configured sidelink map is a dedicated sidelink map comprising a set of non-overlapping and non-interfering resources for use by the UE.

11. The method of claim 9, wherein the configured sidelink map is a common sidelink map indicative of resources for use by the UE and other UEs;
the method further comprising performing sensing and reservation to resolve potential contention.

12. A first user equipment (UE) comprising:
at least one network interface;
at least one processor;
a non-transient computer readable memory for storing instructions which when executed by the at least one processor configures the first UE to operate as a UE of a UE group to:
receive, from a radio access network (RAN) node, a first resource configuration message including configuration information for sidelink resources indicated by a sidelink resource grant and threshold conditions for using sidelink resources of the sidelink resource grant, wherein the threshold conditions indicate a usage area associated with a geographic area identifier (ID) range;
to receive, the instructions when executed by the at least one processor configure the first UE to:
send to the RAN node, a request message comprising UE assistance information (UAI), the UAI containing a UE communications pattern, an identifier of the UE group and a request for configured resource grant; and
receive from the RAN node, a response message comprising the first resource configuration message;
the instructions when executed by the at least one processor further configure the first UE to:
receive, from a second UE of the UE group, a second sidelink resource configuration message, the second sidelink resource configuration message including an activation indicator to indicate at least a portion of the sidelink resources of the sidelink resource grant to be activated; and
when the first UE is in the usage area, transmit data using the portion of the activated sidelink resources that are activated based on the first and second sidelink resource configuration messages.

13. A method for sidelink radio resource allocation in a user equipment (UE) group, by a UE, the method comprising:
receiving, from a radio access network (RAN) node, a resource configuration message comprising configuration information for sidelink resources indicated by a regulated sidelink resource grant and threshold conditions for using sidelink resources of the regulated sidelink resource grant, wherein the threshold conditions indicate a usage area associated with a geographic area identifier (ID) range;
the receiving including:
sending, to the RAN node, a message comprising Group Assistance Information (GAI), the GAI comprising a request for aggregated configured sidelink resource grant for the UE group;
the method further comprising:
sending to at least one UE in the UE group, an activation message comprising the sidelink resources to be used for sidelink transmissions of the at least one UE in the UE group according to the threshold conditions and the UE group context, wherein the UE group context indicates that the at least one UE in the UE group is within the usage area.

14. The method of claim 13, wherein the resource configuration message is sent using Radio Resource Control (RRC) signaling.

15. The method of claim 13, wherein the information for sidelink resources indicated by the regulated sidelink resource grant and the threshold conditions for using sidelink resources of the regulated sidelink resource grant comprises a sidelink map associated with a validity time duration and a validity location area.

16. The method of claim 15, wherein the sidelink map is one of:
a dedicated sidelink map comprising a set of non-overlapping and non-interfering resources for use by the UE; and
a common sidelink map indicative of resources for use by the UE and other UEs, in which case the method further comprising the UE performing sensing and reservation to resolve potential contention.

17. The method of claim 15 further comprising: receiving, from the RAN node, an update to the sidelink map based on new information related to at least one of an access layer of the UE and a higher layer of the UE.

18. A user equipment (UE) comprising:
at least one network interface;
at least one processor;
a non-transient computer readable memory for storing instructions which when executed by the at least one processor configures the UE to operate as a UE of a UE group to:
receive, from a radio access network (RAN) node, a resource configuration message comprising configuration information for sidelink resources indicated by a regulated sidelink resource grant and threshold conditions for using sidelink resources of the regulated sidelink resource grant, wherein the threshold conditions indicate a usage area associated with a geographic area identifier (ID) range;
to receive, the instructions when executed by the at least one processor further configure the UE to:
send to the RAN node, a message comprising Group Assistance Information (GAI), the GAI comprising a request for aggregated configured sidelink resource grant for the UE group;
the instructions when executed by the at least one processor further configure the first UE to:
send to at least one UE in the UE group, an activation message comprising the sidelink resources to be used for sidelink transmissions of the at least one UE in the UE group according to the threshold conditions and the UE group context, wherein the UE group context indicates that the at least one UE in the UE group is within the usage area.

* * * * *

UNITED STATES PATENT AND TRADEMARK OFFICE
CERTIFICATE OF CORRECTION

PATENT NO. : 11,711,785 B2
APPLICATION NO. : 16/988409
DATED : July 25, 2023
INVENTOR(S) : Jaya Rao, Sophie Vrzic and Hang Zhang It is certified that error appears in the above-identified patent and that said Letters Patent is hereby corrected as shown below:

In the Specification

Column 43, Line 8:
"Oms" should read --0ms--

Column 43, Line 32:
"Oms" should read --0ms--

Signed and Sealed this
Twenty-seventh Day of February, 2024

Katherine Kelly Vidal
*Director of the United States Patent and Trademark Office*